US009194937B2

(12) United States Patent
Bahl et al.

(10) Patent No.: US 9,194,937 B2
(45) Date of Patent: Nov. 24, 2015

(54) COMPUTATIONAL SYSTEMS AND METHODS FOR LOCATING A MOBILE DEVICE

(75) Inventors: Paramvir Bahl, Bellevue, WA (US);
Douglas C. Burger, Bellevue, WA (US);
Ranveer Chandra, Kirkland, WA (US);
Matthew G. Dyor, Bellevue, WA (US);
William Gates, Redmond, WA (US);
Roderick A. Hyde, Redmond, WA (US);
Pablos Holman, Seattle, WA (US);
Muriel Y. Ishikawa, Livermore, CA (US); Jordin T. Kare, Seattle, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Craig J. Mundie, Seattle, WA (US);
Nathan P. Myhrvold, Bellevue, WA (US); Tim Paek, Sammamish, WA (US);
John D. Rinaldo, Jr., Bellevue, WA (US); Desney S. Tan, Kirkland, WA (US); Clarence T. Tegreene, Bellevue, WA (US); Charles Whitmer, North Bend, WA (US); Lowell L. Wood, Jr., Bellevue, WA (US); Victoria Y. H. Wood, Livermore, CA (US); Lin Zhong, Houston, TX (US)

(73) Assignee: Elwha LLC, Bellevue, WA (US)

( * ) Notice: Subject to any disclaimer, the term of this patent is extended or adjusted under 35 U.S.C. 154(b) by 148 days.

(21) Appl. No.: 13/340,531

(22) Filed: Dec. 29, 2011

(65) Prior Publication Data
US 2013/0165138 A1    Jun. 27, 2013

Related U.S. Application Data

(63) Continuation-in-part of application No. 13/337,085, filed on Dec. 24, 2011, now Pat. No. 9,031,584, which is a continuation-in-part of application No. 13/336,979, filed on Dec. 23, 2011.

(51) Int. Cl.
*H04W 24/00* (2009.01)
*G01S 5/02* (2010.01)
(Continued)

(52) U.S. Cl.
CPC ............. *G01S 5/0284* (2013.01); *G01S 5/0009* (2013.01); *G01S 5/0257* (2013.01); *H04W 64/00* (2013.01)

(58) Field of Classification Search
CPC ....... H04W 88/02; H04W 4/008; H04W 4/12; H04W 64/00; H04W 64/006
USPC .......................... 455/418, 419, 456.2, 556.1; 340/825.49, 540, 539.32, 686.1
See application file for complete search history.

(56) References Cited

U.S. PATENT DOCUMENTS 5,578,875 A    11/1996    Dormer et al.
6,259,367 B1    7/2001    Klein
(Continued)

*Primary Examiner* — Kwasi Karikari

(57) ABSTRACT

Systems and methods are described relating to detecting an indication of a person within a specified proximity to at least one mobile device; and presenting an indication of location of the at least one mobile device at least partially based on the indication of the person within the specified proximity. Additionally, systems and methods are described relating to means for detecting an indication of a person within a specified proximity to at least one mobile device; and means for presenting an indication of location of the at least one mobile device at least partially based on the indication of the person within the specified proximity.

38 Claims, 33 Drawing Sheets

(51) Int. Cl.
*G01S 5/00* (2006.01)
*H04W 64/00* (2009.01)

(56) References Cited

U.S. PATENT DOCUMENTS

| | | | |
|---|---|---|---|
| 6,385,454 | B1 | 5/2002 | Bahl et al. |
| 6,600,418 | B2 | 7/2003 | Francis et al. |
| 6,662,023 | B1 | 12/2003 | Helle |
| 6,711,408 | B1 | 3/2004 | Raith |
| 6,967,577 | B2 | 11/2005 | Taylor et al. |
| 7,002,489 | B1 | 2/2006 | Denker et al. |
| 7,089,012 | B2 | 8/2006 | Harris et al. |
| 7,369,845 | B2 | 5/2008 | Keohane et al. |
| 7,420,465 | B2 | 9/2008 | Ritter |
| 7,492,266 | B2 | 2/2009 | Bhavani |
| 7,787,409 | B2 | 8/2010 | Sanderford, Jr. |
| 7,881,710 | B2 | 2/2011 | Keohane et al. |
| 8,135,415 | B2 | 3/2012 | Malik et al. |
| 8,260,322 | B2 | 9/2012 | Allen et al. |
| 8,392,007 | B1 | 3/2013 | Izo et al. |
| 8,412,234 | B1 | 4/2013 | Gatmir-Motahari et al. |
| 8,477,028 | B2 | 7/2013 | Kuncl |
| 8,509,807 | B2 | 8/2013 | Brisebois et al. |
| 8,515,491 | B2 | 8/2013 | Das et al. |
| 8,644,204 | B2 | 2/2014 | Tao et al. |
| 8,644,884 | B2 | 2/2014 | Sheynblat et al. |
| 2002/0123329 | A1 | 9/2002 | Murray |
| 2003/0164772 | A1 | 9/2003 | Hall |
| 2003/0211853 | A1 | 11/2003 | Banno |
| 2004/0192341 | A1 | 9/2004 | Wang et al. |
| 2004/0242286 | A1 | 12/2004 | Benco et al. |
| 2005/0037730 | A1 | 2/2005 | Montague |
| 2005/0046580 | A1 | 3/2005 | Miranda-Knapp et al. |
| 2005/0255874 | A1 | 11/2005 | Stewart-Baxter et al. |
| 2005/0256720 | A1 | 11/2005 | Iorio |
| 2006/0017692 | A1 | 1/2006 | Wehrenberg et al. |
| 2006/0099940 | A1 | 5/2006 | Pfleging et al. |
| 2006/0121916 | A1 | 6/2006 | Aborn et al. |
| 2006/0166656 | A1 | 7/2006 | Klicpera et al. |
| 2006/0167623 | A1 | 7/2006 | Alexander |
| 2006/0181424 | A1 | 8/2006 | Graves et al. |
| 2006/0236761 | A1 | 10/2006 | Inoue et al. |
| 2007/0042749 | A1 | 2/2007 | Ben Ayed |
| 2007/0072625 | A1 | 3/2007 | Fournier et al. |
| 2007/0087736 | A1 | 4/2007 | Wilson et al. |
| 2007/0268246 | A1 | 11/2007 | Hyatt |
| 2008/0004041 | A1 | 1/2008 | Ahn et al. |
| 2008/0064446 | A1 | 3/2008 | Camp et al. |
| 2008/0132245 | A1 | 6/2008 | Snow et al. |
| 2008/0143482 | A1 | 6/2008 | Shoarinejad et al. |
| 2009/0058670 | A1* | 3/2009 | Sweeney et al. ........... 340/686.1 |
| 2009/0061903 | A1 | 3/2009 | Khokhar |
| 2009/0138194 | A1 | 5/2009 | Geelen |
| 2009/0186633 | A1 | 7/2009 | Yonker et al. |
| 2009/0187466 | A1 | 7/2009 | Carter et al. |
| 2009/0233589 | A1 | 9/2009 | Zohar |
| 2009/0278682 | A1 | 11/2009 | Liu |
| 2009/0325599 | A1 | 12/2009 | Vuori |
| 2009/0326815 | A1 | 12/2009 | Williamson et al. |
| 2010/0136957 | A1 | 6/2010 | Horodezky et al. |
| 2010/0173615 | A1 | 7/2010 | Harris |
| 2010/0184378 | A1* | 7/2010 | Wakefield .................... 455/41.2 |
| 2010/0207781 | A1* | 8/2010 | Shuster .................... 340/825.49 |
| 2010/0210240 | A1 | 8/2010 | Mahaffey et al. |
| 2010/0216446 | A1 | 8/2010 | Chang |
| 2010/0255856 | A1 | 10/2010 | Kansal et al. |
| 2010/0291952 | A1 | 11/2010 | Gosset et al. |
| 2010/0302032 | A1 | 12/2010 | Abed |
| 2010/0304754 | A1 | 12/2010 | Czompo et al. |
| 2010/0317368 | A1 | 12/2010 | Augst et al. |
| 2010/0323715 | A1 | 12/2010 | Winters |
| 2011/0009107 | A1 | 1/2011 | Guba et al. |
| 2011/0021234 | A1 | 1/2011 | Tibbitts et al. |
| 2011/0039573 | A1 | 2/2011 | Hardie |
| 2011/0111724 | A1 | 5/2011 | Baptiste |
| 2011/0221664 | A1 | 9/2011 | Chen et al. |
| 2011/0241988 | A1 | 10/2011 | Bensler |
| 2011/0256881 | A1 | 10/2011 | Huang et al. |
| 2012/0188083 | A1 | 7/2012 | Miller, II |
| 2012/0208491 | A1 | 8/2012 | Imming et al. |
| 2012/0258701 | A1 | 10/2012 | Walker et al. |
| 2012/0264446 | A1 | 10/2012 | Xie et al. |
| 2012/0276890 | A1 | 11/2012 | Raduchel |
| 2012/0317194 | A1* | 12/2012 | Tian ............................. 709/204 |
| 2013/0085861 | A1 | 4/2013 | Dunlap |
| 2013/0102328 | A1 | 4/2013 | Kalofonos et al. |

\* cited by examiner

FIG. 32

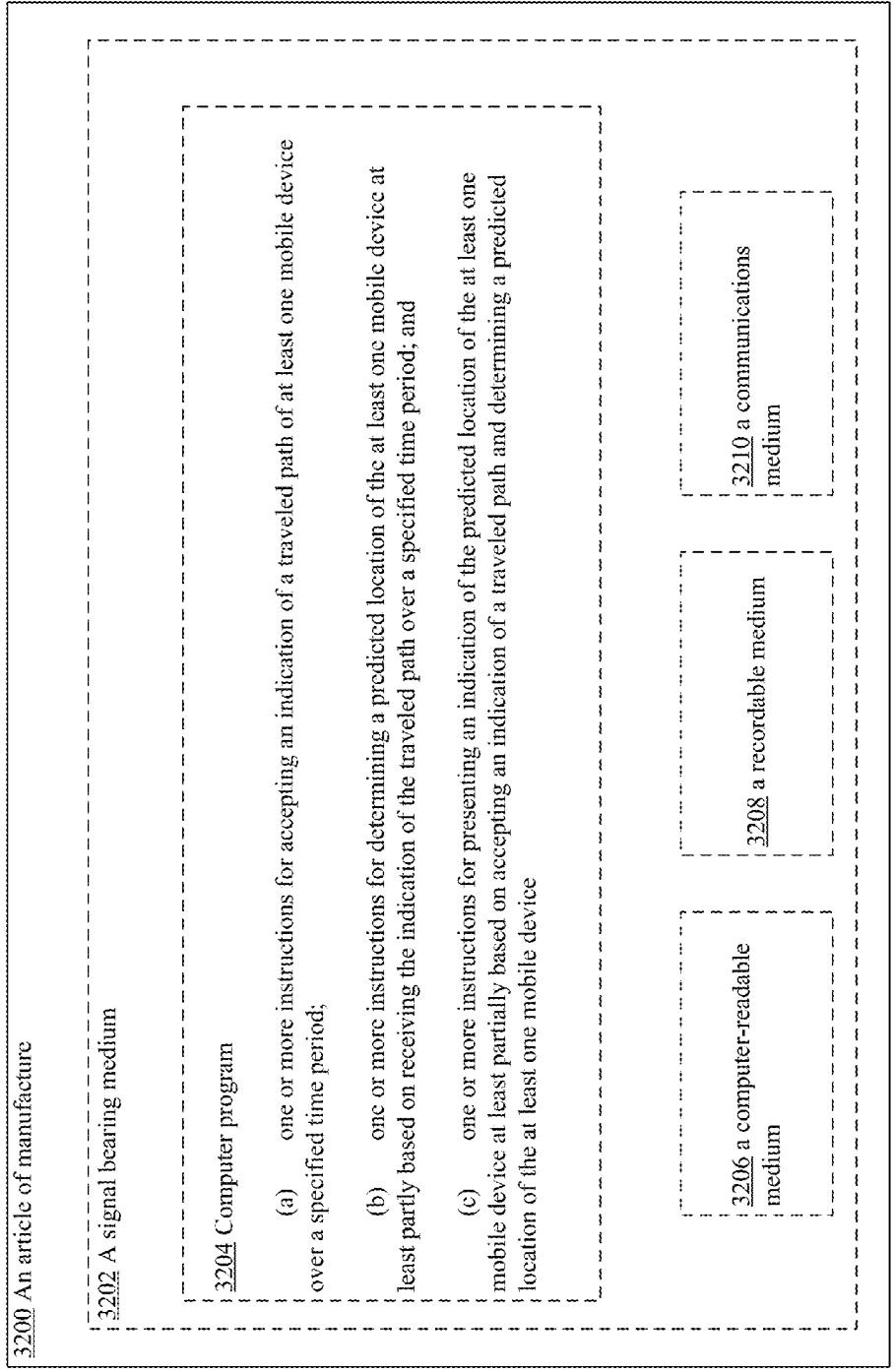

3200 An article of manufacture

3202 A signal bearing medium

3204 Computer program (a) one or more instructions for accepting an indication of a traveled path of at least one mobile device over a specified time period;

(b) one or more instructions for determining a predicted location of the at least one mobile device at least partly based on receiving the indication of the traveled path over a specified time period; and (c) one or more instructions for presenting an indication of the predicted location of the at least one mobile device at least partially based on accepting an indication of a traveled path and determining a predicted location of the at least one mobile device 3206 a computer-readable medium 3208 a recordable medium 3210 a communications medium

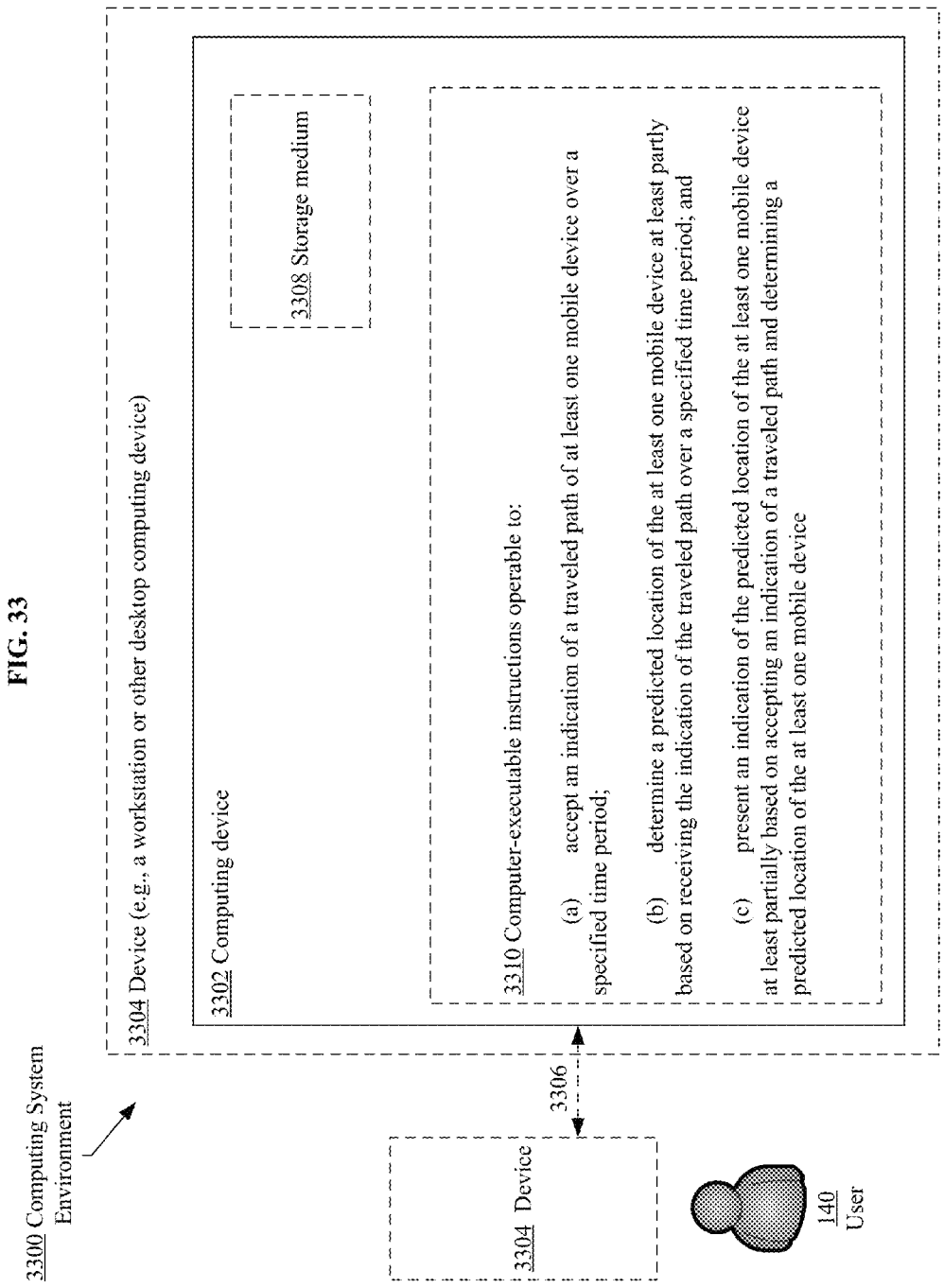

COMPUTATIONAL SYSTEMS AND METHODS FOR LOCATING A MOBILE DEVICE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 13/336,979, entitled COMPUTATIONAL SYSTEMS AND METHODS FOR LOCATING A MOBILE DEVICE, naming Paramvir Bahl, Doug Burger, Ranveer Chandra, Matthew G. Dyor, William Gates, Pablos Holman, Roderick A. Hyde, Muriel Y. Ishikawa, Jordin T. Kare, Royce A. Levien, Richard T. Lord, Robert W. Lord, Mark A. Malamud, Craig J. Mundie, Nathan P. Myhrvold, Timothy Paek, John D. Rinaldo, Jr., Desney S. Tan, Clarence T. Tegreene, Charles Whitmer, Lowell L. Wood, Jr., Victoria Y.H. Wood, and Lin Zhong, as inventors, filed 23 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/337,085, entitled COMPUTATIONAL SYSTEMS AND METHODS FOR LOCATING A MOBILE DEVICE, naming Paramvir Bahl, Doug Burger, Ranveer Chandra, Matthew G. Dyor, William Gates, Pablos Holman, Roderick A. Hyde, Muriel Y. Ishikawa, Jordin T. Kare, Royce A. Levien, Richard T. Lord, Robert W. Lord, Mark A. Malamud, Craig J. Mundie, Nathan P. Myhrvold, Timothy Paek, John D. Rinaldo, Jr., Desney S. Tan, Clarence T. Tegreene, Charles Whitmer, Lowell L. Wood, Jr., Victoria Y.H. Wood, and Lin Zhong, as inventors, filed 24 Dec. 2011 which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

This description relates to identifying the location of a mobile device.

SUMMARY

In one aspect, a method includes but is not limited to detecting an indication of a person within a specified proximity to at least one mobile device; and presenting an indication of location of the at least one mobile device at least partially based on the indication of the person within the specified proximity. In addition to the foregoing, other apparatus aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware configured to effect the herein referenced method aspects depending upon the design choices of the system designer.

In one aspect, a system includes but is not limited to means for detecting an indication of a person within a specified proximity to at least one mobile device; and means for presenting an indication of location of the at least one mobile device at least partially based on the indication of the person within the specified proximity. In addition to the foregoing, other apparatus aspects are described in the claims, drawings, and text forming a part of the present disclosure.

In one aspect, a system includes but is not limited to circuitry for detecting an indication of a person within a specified proximity to at least one mobile device; and circuitry for presenting an indication of location of the at least one mobile device at least partially based on the indication of the person within the specified proximity. In addition to the foregoing, other apparatus aspects are described in the claims, drawings, and text forming a part of the present disclosure.

In one aspect, a computer program product includes but is not limited to a signal-bearing medium bearing one or more instructions for detecting an indication of a person within a specified proximity to at least one mobile device; and one or more instructions for presenting an indication of location of the at least one mobile device at least partially based on the indication of the person within the specified proximity. In addition to the foregoing, other method aspects are described in the claims, drawings, and text forming a part of the present disclosure.

In one aspect, a system includes but is not limited to a computing device and instructions that when executed on the computing device cause the computing device to detect an indication of a person within a specified proximity to at least one mobile device; and present an indication of location of the at least one mobile device at least partially based on the indication of a person within the specified proximity. In addition to the foregoing, other method aspects are described in the claims, drawings, and text forming a part of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 32 illustrates a partial view of an example article of manufacture including a computer program product that includes a computer program for executing a computer process on a computing device related to mobile device location, which may serve as a context for introducing one or more processes and/or devices described herein.

FIG. 33 illustrates an example device in which embodiments may be implemented related to mobile device location, which may serve as a context for introducing one or more processes and/or devices described herein.

DETAILED DESCRIPTION

Figure 1:
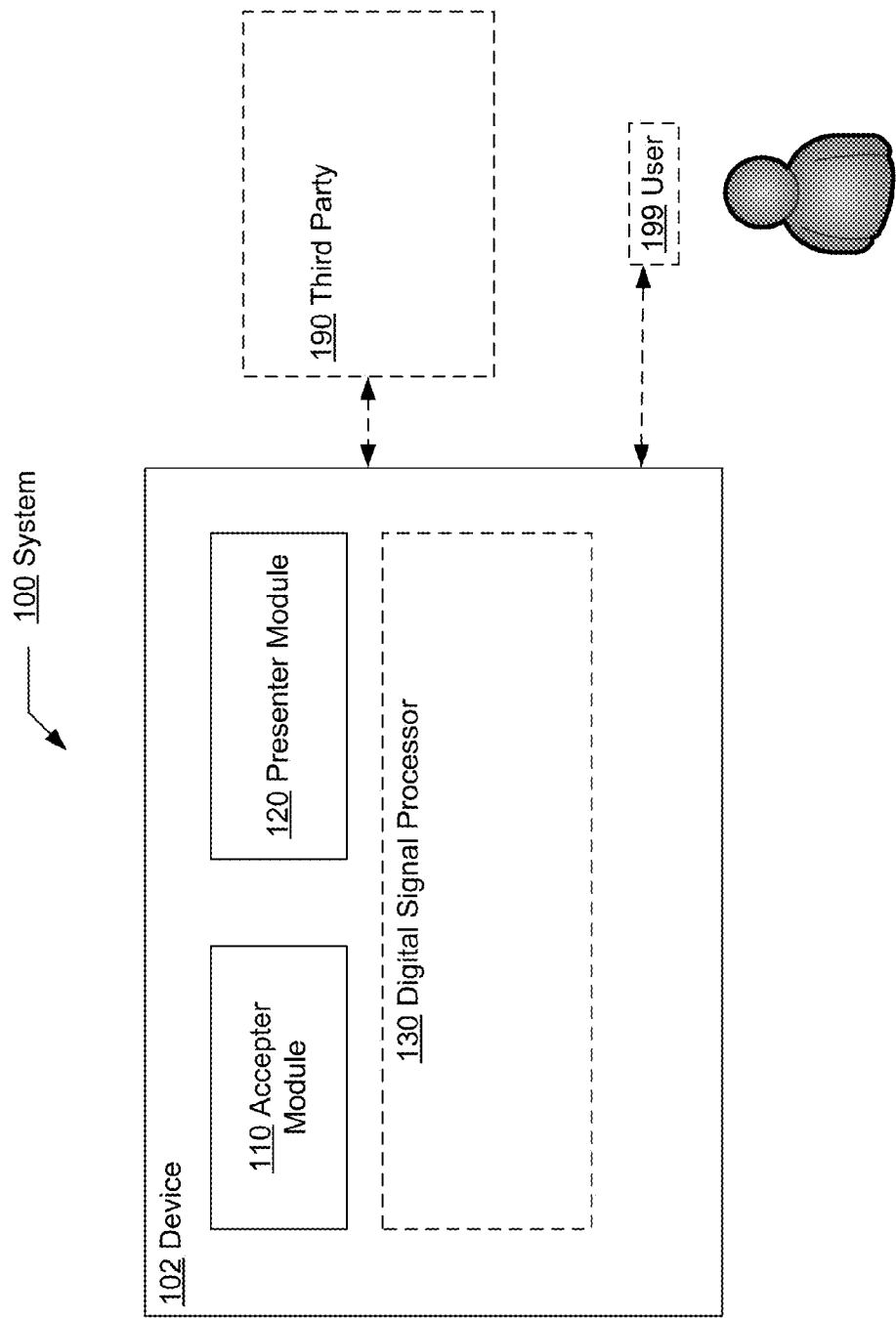
FIG. 1 illustrates an example of a mobile device location system in which embodiments may be implemented, perhaps in a device and/or through a network, which may serve as a context for introducing one or more processes and/or devices described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system 100 in which embodiments may be implemented. The system 100 includes a device 102. The device 102 may contain, for example, accepter module 110, presenter module 120, and/or digital signal processor 130. User 199 may interact directly or through a user interface with device 102. Additionally, device 102 may communicate with third party 190.

Figure 2:
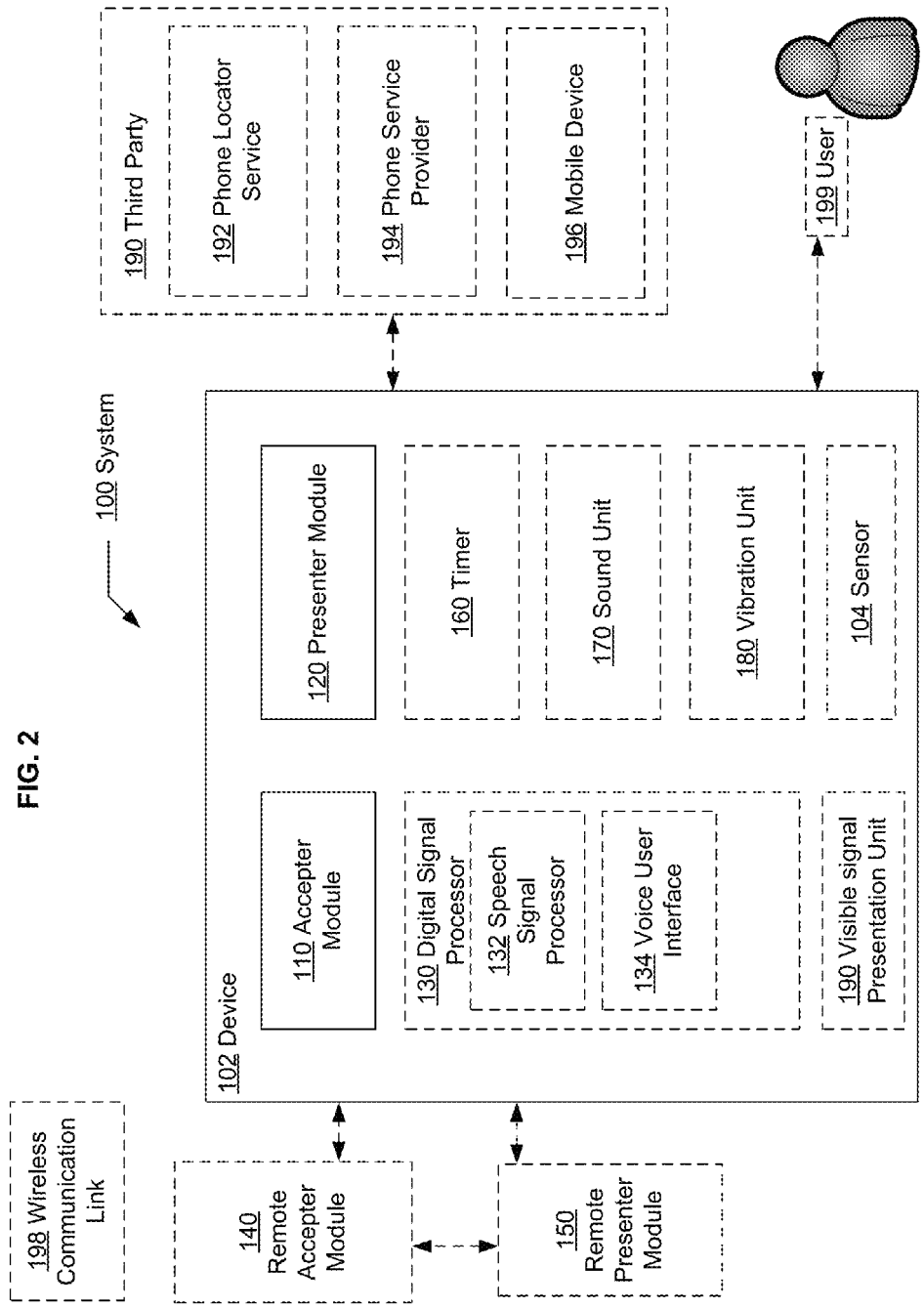
FIG. 2 illustrates certain alternative embodiments of the mobile device location system of FIG. 1.

FIG. 2 further illustrates an example system 100 in which embodiments may be implemented. The system 100 includes a device 102. The device 102 may contain, for example, sensor 104, accepter module 110, presenter module 120, digital signal processor 130, timer 160, sound unit 170, vibration unit 180, and visible signal presentation unit 190. Further, digital signal processor 130 may include, for example, speech signal 132 and/or voice user interface 134. The device 102 may communicate over a network or directly with remote accepter module 140 and/or remote presenter unit 150. User 199 may interact directly or through a user interface with device 102. Device 102 may communicate with third party 190, which may include phone locator service 192, phone service provider 194, and/or mobile device 196, and/or wireless communication link 198.

In FIG. 2, the device 102 is illustrated as possibly being included within a system 100. Of course, virtually any kind of computing device may be used to implement the sensor 104, accepter module 110, and/or presenter module 120, such as, for example, a programmed workstation, a programmed desktop computer, a programmed networked computer, a programmed server, a collection of programmed servers and/or databases, a programmed virtual machine running inside a computing device, a programmed mobile computing device, or a programmed tablet PC.

Additionally, not all of the sensor 104, accepter module 110, and/or presenter module 120 need be implemented on a single computing device. For example, the sensor 104, accepter module 110, and/or presenter module 120 may be implemented and/or operable on a remote computer, while a user interface and/or local instance of the sensor 104, accepter module 110, and/or presenter module 120 are implemented and/or occur on a local computer. Further, aspects of the sensor 104, accepter module 110, and/or presenter module 120 may be implemented in different combinations and implementations than that shown in FIG. 1. For example, functionality of a user interface may be incorporated into the sensor 104, accepter module 110, and/or presenter module 120. The sensor 104, accepter module 110, and/or presenter module 120 may perform simple data relay functions and/or complex data analysis, including, for example, fuzzy logic and/or traditional logic steps. Further, many methods of searching health care and/or service provider databases known in the art may be used, including, for example, unsupervised pattern discovery methods, coincidence detection methods, and/or entity relationship modeling. In some embodiments, the sensor 104, accepter module 110, and/or presenter module 120 may process user input data according to health care options and/or service provider information available as updates through a network.

Accepter module 110 and/or presenter module 120 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

Figure 3:
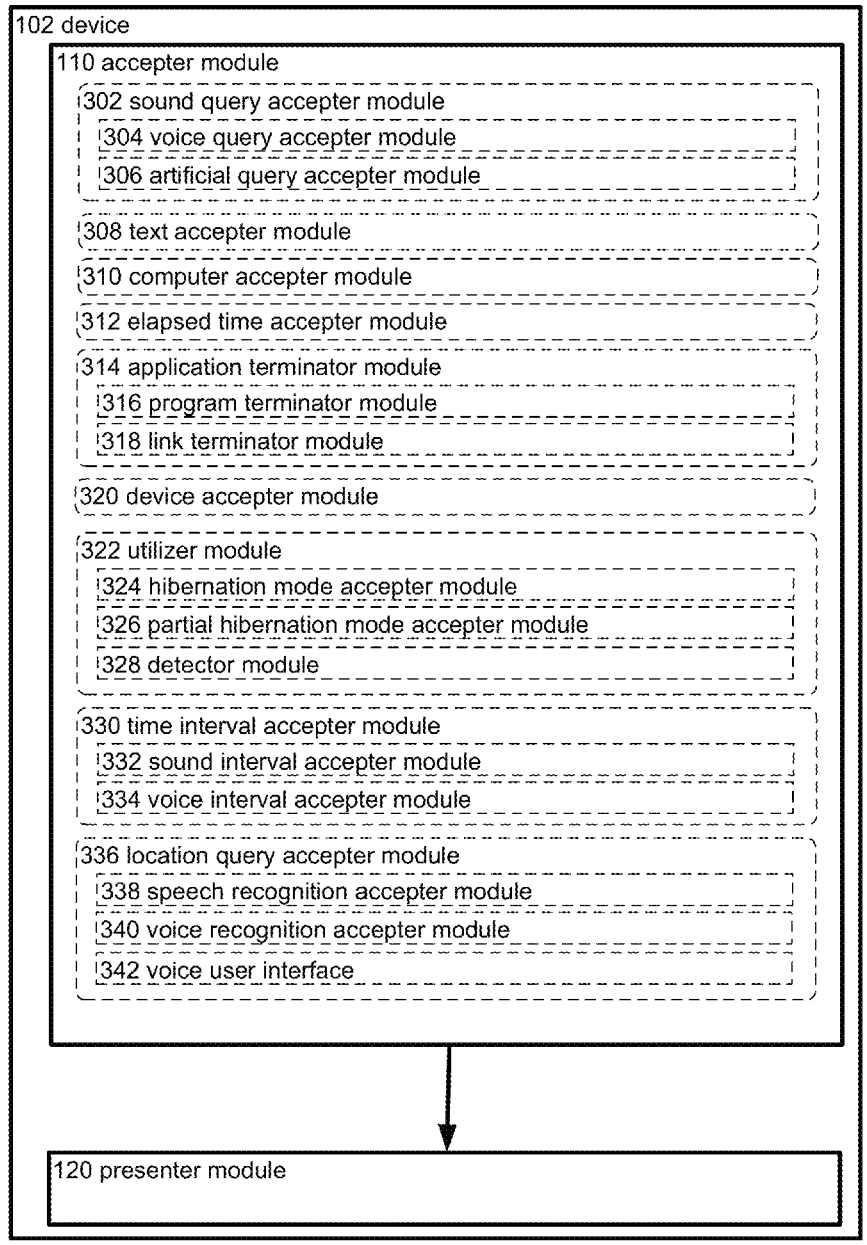
FIG. 3 illustrates certain alternative embodiments of the mobile device location system of FIG. 1.

FIG. 3 illustrates device 102, which may further include accepter module 110 and presenter module 120. Accepter module 110 may include sound query accepter module 302, text accepter module 308, computer accepter module 310, elapsed time accepter module 312, application terminator module 314, device accepter module 320, utilizer module 322, time interval accepter module 330, and/or location query accepter module 336. Sound query accepter module 302 may include voice query accepter module 304 and/or artificial query accepter module 306. Application terminator module 314 may include program terminator module 316 and/or link terminator module 318. Utilizer module 322 may include hibernation mode accepter moudle 324, partial hibernation mode accepter module 326, and/or detector moudle 328. Time interval accepter moudle 330 may include sound interval accepter moudle 332 and/or voice interval accepter module 334. Location query accepter module 336 may include speech recognition accepter module 338, voice recognition accepter module 340, and/or voice user interface 342.

Figure 4:
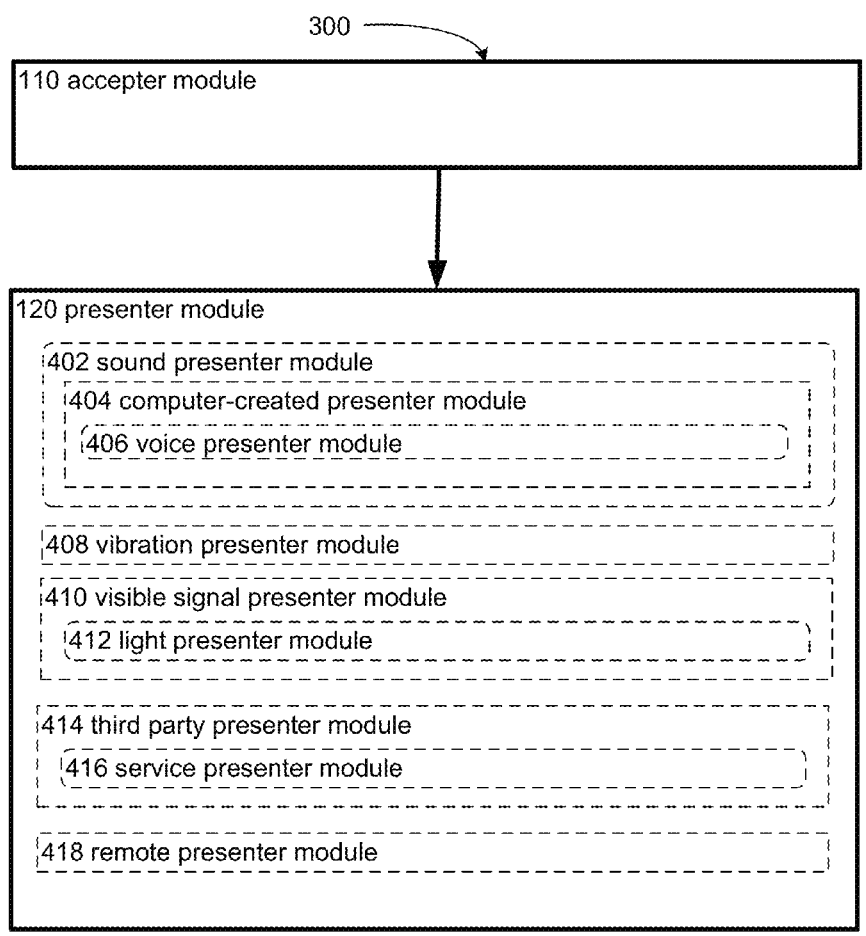
FIG. 4 illustrates certain alternative embodiments of the mobile device location system of FIG. 1.

FIG. 4 illustrates device 102, which may further include accepter module 110 and/or presenter module 120. Presenter module 120 may include sound presenter module 402, vibration presenter module 408, visible signal presenter module 410, third party presenter module 414, and/or remote presenter module 418. Sound presenter module 402 may include computer-created presenter module 404. Computer-created presenter module 404 may include voice presenter module 406. Visible signal presenter module 410 may include light presenter module 412. Third party presenter module 414 may include service presenter module 416.

Many examples of databases and database structures may be used in connection with the accepter module 110 and/or presenter module 120. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for information and/or for gathering and/or compiling data from the relational database(s). For example, SQL or SQL-like operations over one or more reference health attribute and/or reference service provider may be performed, or Boolean operations using a reference health attribute and/or or reference service provider may be performed.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation used herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
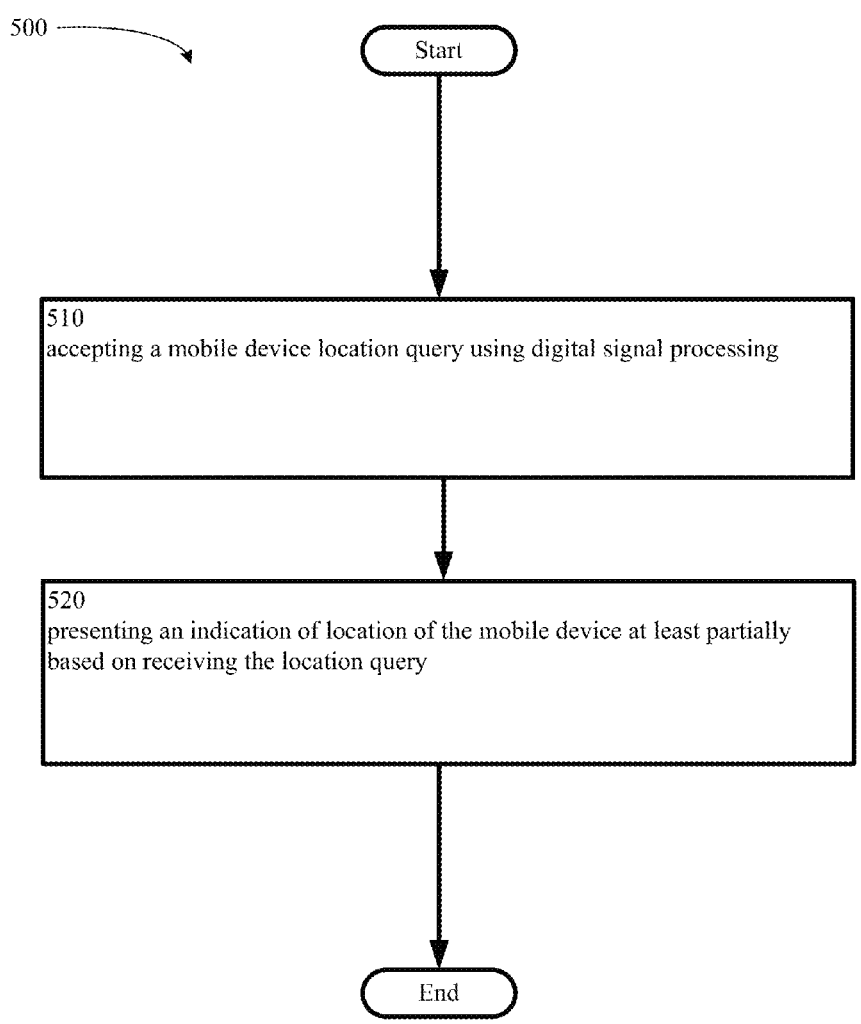
FIG. 5 illustrates an example of an operational flow representing example operations related to mobile device location, which may serve as a context for introducing one or more processes and/or devices described herein.

FIG. 5 illustrates an operational flow 500 representing example operations related to accepting a mobile device location query using digital signal processing and presenting an indication of location of the mobile device at least partially based on receiving the location query. In FIG. 5 and in following figures that include various examples of operational flows, discussion and explanation may be provided with respect to the above-described examples of FIGS. 1 through 4, and/or with respect to other examples and contexts. However, it should be understood that the operational flows may be executed in a number of other environments and contexts, and/or in modified versions of FIGS. 1 through 4. Also, although the various operational flows are presented in the sequence(s) illustrated, it should be understood that the various operations may be performed in other orders than those which are illustrated, or may be performed concurrently.

After a start operation, the operational flow 500 moves to an operation 510. Operation 510 depicts accepting a mobile device location query using digital signal processing. For example, as shown in FIGS. 1 through 4, the accepter module 110 can accept a mobile device location query using digital signal processing. In an embodiment, accepter module 110 can accept a mobile device location query in the form of an individual speaking the words, "Phone, where are you?" using digital signal processing. Some examples of a location query may include human-made sounds, such as a voice or a hand clap, or computer created sounds, such as dual-tone multi-frequency signaling (DTMF) and the use of a DTMF keypad to create a specific sequence of sound frequencies, for example. In an embodiment, accepter module 110 may accept a mobile device location query in the form of a series of four signal tones created using dual-tone multi-frequency signaling. In this embodiment, accepter module 110 may include a analog-to-digital converter. Additionally, the mobile device may include a device and/or programming to conserve battery power after detecting inactivity after a predetermined period of time.

Digital signal processing may include the representation of discrete time signals by a sequence of numbers or symbols and the processing of these signals. Some examples of digital signal processing may include audio or speech signal processing, sonar and radar signal processing, sensor array processing, spectral estimation, statistical signal processing, digital image processing, signal processing for communications, control of systems, and/or biomedical signal processing. Digital signal processing may include converting the signal(s) from an analog to a digital form, by sampling and then digitizing it using an analog-to-digital converter (ADC), which turns the analog signal into a stream of numbers. Sometimes, the required output signal is another analog output signal, which requires a digital-to-analog converter (DAC). device 100 and/or accepter module 110 may include an analog-to-digital converter (ADC) and/or a digital-to-analog converter (DAC). In some instances, accepter module 110 may include a computer processor programmed to accept a mobile device location query using digital signal processing, a digital-to-analog converter (DAC), an analog-to-digital converter (ADC), and/or a microphone.

Then, operation 520 depicts presenting an indication of location of the mobile device at least partially based on receiving the location query. For example, as shown in FIGS. 1 through 4, the presenter module 120 can present an indication of location of the mobile device at least partially based on receiving the location query. In an embodiment, presenter module 120 may present an indication of location of the mobile device location in the form of sending GPS coordinates to a second mobile device at least partially based on accepting a location query in the form of a text message to the first mobile device. Some examples of presenting an indication of location may include making a sound or a series of sounds, activating a light, and/or transmitting information, such as GPS coordinates. Other examples of presenting an indication of location may include transmitting a signal to another mobile device and/or presenting an indication of location to a printer coupled to a computer in a central location, such as the mobile device owner's home office.

Figure 6:
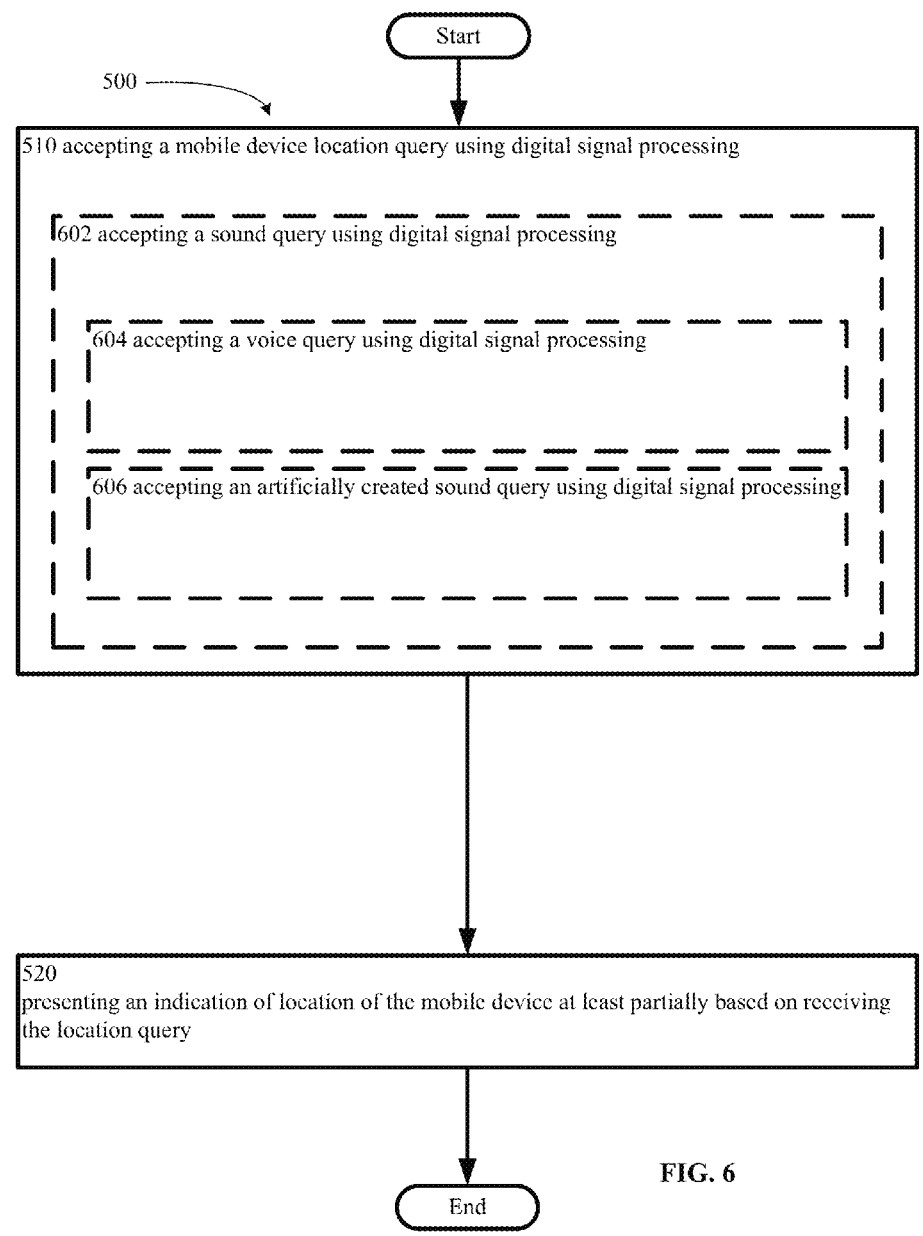
FIG. 6 illustrates certain alternative embodiments of the mobile device location system of FIG. 5.

FIG. 6 illustrates alternative embodiments of the example operational flow 500 of FIG. 5. FIG. 6 illustrates example embodiments where the operation 510 may include at least one additional operation. Additional operations may include an operation 602, an operation 604, and/or an operation 606.

The operation 602 illustrates accepting a sound query using digital signal processing. For example, as shown in FIGS. 1 through 4, the sound query accepter module 302 can accept a sound query using digital signal processing. In an embodiment, sound query accepter module 302 may accept a sound query in the form of an audible digitally-created signal. Some examples of a sound query may include a voice, such as a word or a phrase, or sound played from a recording, such as a compact disk recording, for example. Another example of accepting a sound query may include audio signal processing, an example of which may be found in U.S. Pat. No. 8,027,477, which is incorporated herein by reference. In some instances, sound query accepter module 302 may include a computer processor programmed to accept a sound query.

Further, the operation 604 illustrates accepting a voice query using digital signal processing. For example, as shown in FIGS. 1 through 4, the voice query accepter module 304 can accept a voice query using digital signal processing. In an embodiment, voice query accepter module 304 may accept the voice query, "Phone, state your location." Some examples of a voice query may include a word or a series of words. Additionally, a voice query may include a recorded voice, such as a compact disk recording. In an embodiment, voice query accepter module 304 may accept a voice query in the form of a recorded voice from a compact disk with a voice that speaks the word "locate" in a frequency specifically recognizable by the voice query accepter module 304. Accepting a voice query using digital signal processing may include speech signal processing, such as speech recognition. Speech recognition, or voice recognition, converts a spoken word to a digital signal, such as text. In some instances, voice recognition may include a recognition system that is trained to recognize the voice of a particular speaker. An example of voice and speech recognition may be found in U.S. Pat. No. 8,056,070, which is incorporated herein by reference. In some instances, voice query accepter module 304 may include a computer processor.

Further, the operation 606 illustrates accepting an artificially-created sound query using digital signal processing. For example, as shown in FIGS. 1 through 4, the artificial query accepter module 306 can accept an artificially created query using digital signal processing. In an embodiment, the artificial query accepter module 306 may accept a series of computer-created sounds in a high frequency sound range that a human may not be able to detect. In this embodiment, the high frequency sound range may be only detectable by the mobile device. Other usable sound ranges may be used, for example ultrasonic, very high, or very low sound frequency ranges. An example of using a very high audio frequency range may be found in U.S. Pat. No. 5,159,703, which is incorporated herein by reference. Further, the artificially-created sound query may be recorded and/or stored on mechanical, optical, or magnetic media for repeated or delayed transmission to the mobile device. In some instances, artificial query accepter module 306 may include a computer processor.

Figure 7:
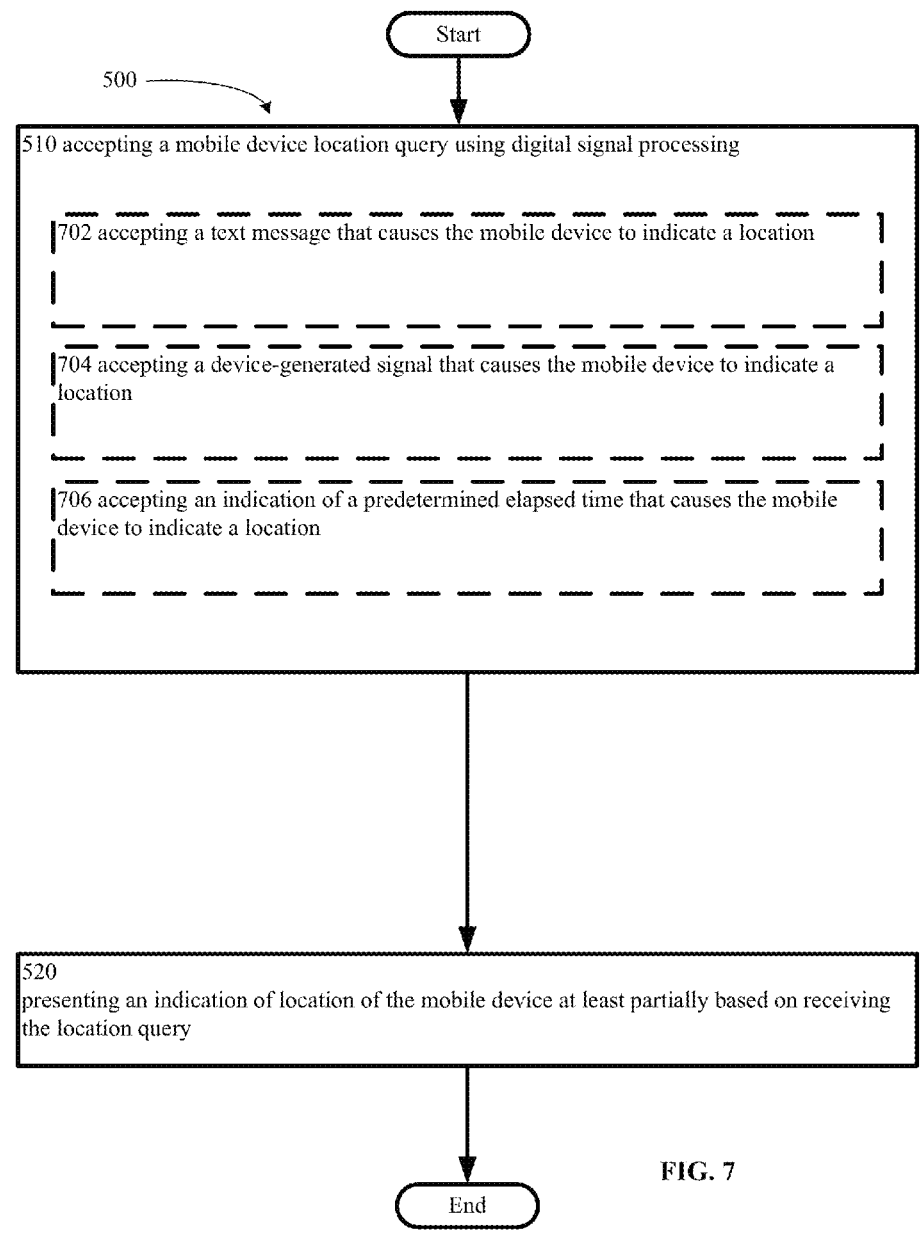
FIG. 7 illustrates certain alternative embodiments of the mobile device location system of FIG. 5.

FIG. 7 illustrates alternative embodiments of the example operational flow 500 of FIG. 5. FIG. 7 illustrates example embodiments where the operation 510 may include at least one additional operation. Additional operations may include an operation 702, an operation 704, and/or an operation 706.

The operation 702 illustrates accepting a text message that causes the mobile device to indicate a location. For example, as shown in FIGS. 1 through 4, the text accepter module 308 can accept a text message that causes the mobile device to indicate a location. In an embodiment, text accepter module 308 may accept a text message from a smart phone. For example, the text message may be a specified word or phrase, such as "LOCATION" which may be a predetermined command for the mobile device to send an indication of location, for example, GPS coordinates. A text message may include a message utilizing the Short Message Service (SMS). One example of using the Short Message Service (SMS) may be found in U.S. Patent Publication No. 2008/0248821, which is incorporated herein by reference. In some instances, text accepter module 308 may include a computer processor.

The operation 704 illustrates accepting a device-generated signal that causes the mobile device to indicate a location. For example, as shown in FIGS. 1 through 4, the computer accepter module 310 can accept a device-generated signal that causes the mobile device to indicate a location. In one embodiment, computer accepter module 310 may accept an infrared signal from a Wii remote. The infrared signal from the Wii remote may be accepted by and/or detected by the mobile device causing the mobile device to indicate a location, for example override a silent mode and choose a ring tone to be presented. In an additional embodiment, computer accepter module 310 may accept a query from a universal remote control using infrared technology. The universal remote control may include a universal remote control that an individual regularly uses for changing channels and controlling a television, such as the universal remote control disclosed in U.S. Pat. No. 6,587,067, which is incorporated herein by reference. In some instances, computer accepter module 310 may include a computer processor.

The operation 706 illustrates accepting an indication of a predetermined elapsed time that causes the mobile device to indicate a location. For example, as shown in FIGS. 1 through 4, the elapsed time accepter module 312 can accept an indication of a predetermined elapsed time that causes the mobile device to indicate a location. In an embodiment, elapsed time accepter module 312 may accept an indication of a twenty-four hour time period that has passed without any activity, such as a phone call, a data message, or an SMS message, for example from a smartphone. In an additional embodiment, elapsed time accepter module 312 may accept an indication of a three day period that a computer tablet has not been moved. For example, the computer tablet may include an accelerometer for detecting movement, inactivity or non-movement, which may indicate to an elapsed time accepter module 312. In some instances, elapsed time accepter module 312 may include a computer processor.

Figure 8:
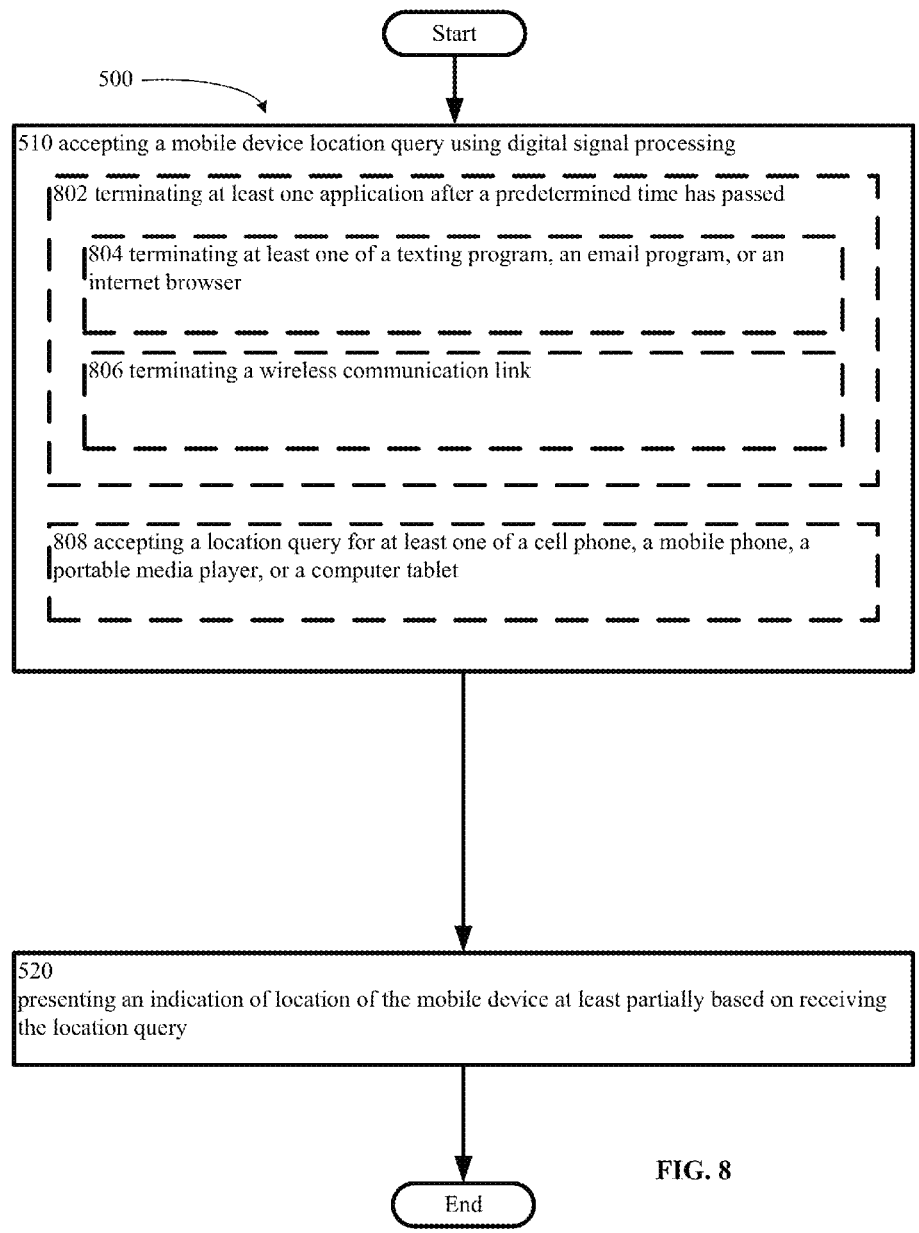
FIG. 8 illustrates certain alternative embodiments of the mobile device location system of FIG. 5.

FIG. 8 illustrates alternative embodiments of the example operational flow 500 of FIG. 5. FIG. 8 illustrates example embodiments where the operation 510 may include at least one additional operation. Additional operations may include an operation 802, an operation 804, an operation 806, and/or an operation 808.

The operation 802 illustrates terminating at least one application after a predetermined time has passed. For example, as shown in FIGS. 1 through 4, the application terminator module 314 can terminate at least one application after a predetermined time has passed. In an embodiment, application terminator module 314 may terminate a browser application after a twenty four hour time period has passed. Terminating at least one application may serve to preserve battery and processing power in the case of an extended period of time that the mobile device may be lost or missing. Some examples of applications that may be closed include any non-essential applications (e.g., a browsing application, a game, a texting application, a mapping application, and/or a calendar application). In some instances, application terminator module 314 may include a computer processor.

Further, the operation 804 illustrates terminating at least one of a texting program, an email program, or an internet browser. For example, as shown in FIGS. 1 through 4, the program terminator module 316 can terminate at least one of a texting program, an email program, or an internet browser. In an embodiment, program terminator module 316 may terminate an email program. In this embodiment, this may serve to reduce computer processing time and in turn reduce battery consumption. This may be advantageous to prolong battery life in the event of a lost mobile device. In some instances, program terminator module 316 may include a computer processor.

Further, the operation 806 illustrates terminating a wireless communication link. For example, as shown in FIGS. 1 through 4, the link terminator module 318 can terminate a wireless communication link. In an embodiment, link terminator module 318 may terminate a link between a mobile device and a wireless router. This may serve to further preserve battery power. Some examples of a wireless communications link may include a wireless personal area network (WPAN), a wireless local area network (WLAN), or a mobile device network, for example a base station system in a cell network or a Personal Communications Service (PCS). In some instances, a link terminator module 318 may include a computer processor.

The operation 808 illustrates accepting a location query for at least one of a cell phone, a smartphone, a portable media player, or a tablet computer. For example, as shown in FIGS. 1 through 4, the device accepter module 320 can accept a query for at least one of a cell phone, a mobile phone, a portable media player, or a tablet computer. In an embodiment, device accepter module 320 may accept a location query for a cell phone. A cell phone may include a device which can make and receive telephone calls over a radio link while moving around a wide geographic area by connecting to a cellular network provided by a mobile network provider. A smartphone may include a mobile phone and/or a cell phone that can support a variety of applications and services including text messaging, E-mail programs, multimedia messaging service, Internet browsing, infrared or Bluetooth communications, gaming, photography, and/or business applications. A portable media player may include a consumer electronics device capable of storing and playing digital media such as audio, images, video, documents, etc. A portable media player may include a hard drive, a microdrive, and/or flash memory. Some examples of a portable media player may include an Apple iPod, a Diamond Rio from Diamond Multimedia, or a Microsoft Zune. A tablet computer may include a mobile computer integrated onto a flat screen and operated primarily by touching the screen. Some examples of a tablet computer may include an Apple iPad or a Microsoft Tablet PC. In some instances, device accepter module 320 may include a computer processor.

Figure 9:
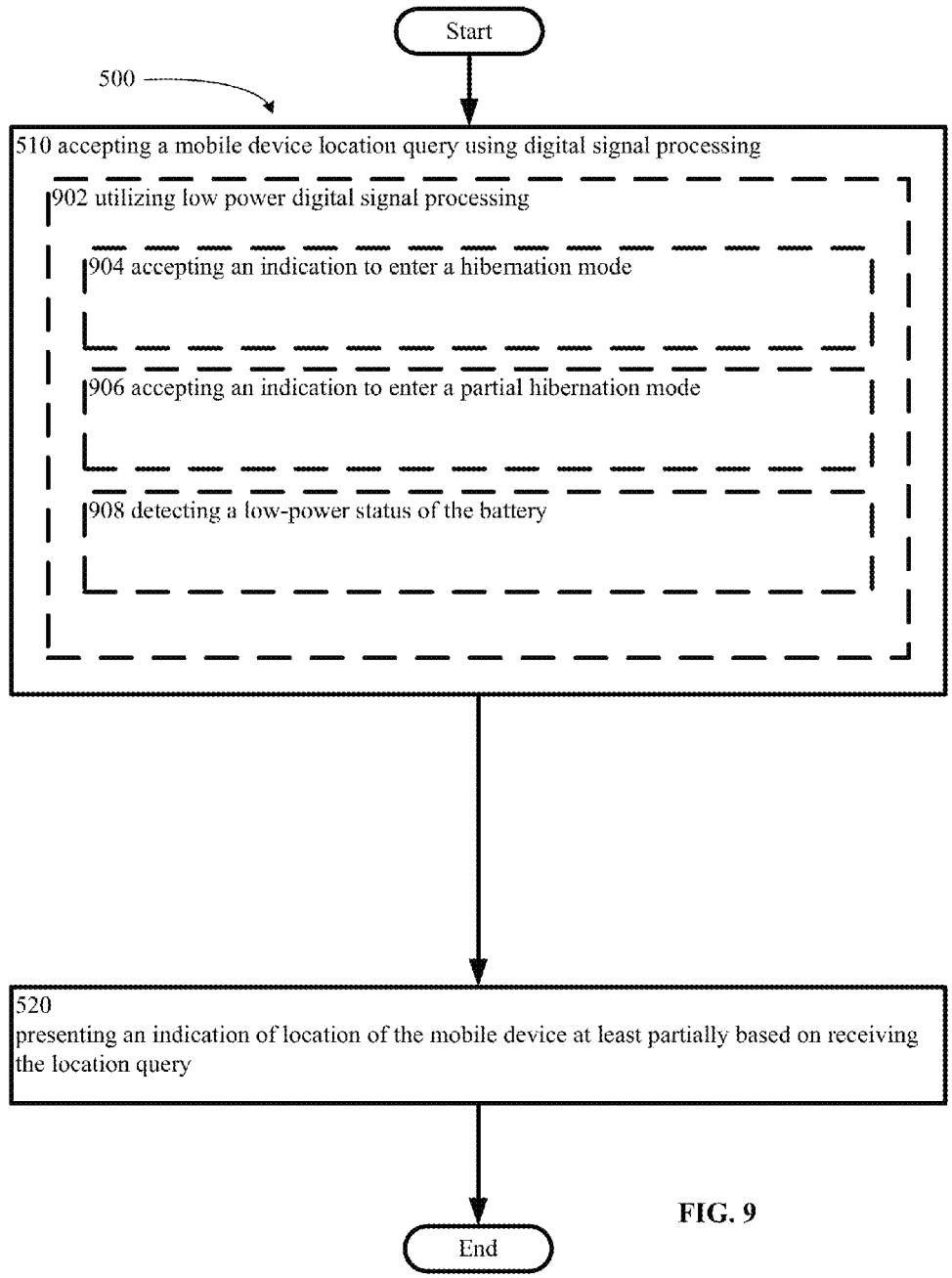
FIG. 9 illustrates certain alternative embodiments of the mobile device location system of FIG. 5.

FIG. 9 illustrates alternative embodiments of the example operational flow 500 of FIG. 5. FIG. 9 illustrates example embodiments where the operation 510 may include at least one additional operation. Additional operations may include an operation 902, an operation 904, an operation 906, and/or an operation 908.

The operation 902 illustrates utilizing low power digital signal processing. For example, as shown in FIGS. 1 through 4, the utilizer module 322 can utilize low power digital signal processing. In an embodiment, utilizer module 322 may utilize digital signal processing designed to use reduced battery power. In this embodiment, using reduced battery power may serve to prolong the amount of time that a misplaced mobile device may be capable of receiving or transmitting a location signal. Another example of utilizing low power digital signal processing may include the device disclosed in U.S. Pat. No. 6,141,761, which is incorporated herein by reference. In some instances, utilizer module 322 may include a computer processor.

Further, the operation 904 illustrates accepting an indication to enter a hibernation mode. For example, as shown in FIGS. 1 through 4, the hibernation mode accepter module 324 can accept an indication to enter a hibernation mode. In an embodiment, hibernation mode accepter module 324 may accept an indication to enter a misplaced mobile phone into a hibernation mode. For example, the misplaced mobile device may include an accelerometer that may indicate that the mobile device has not been moved within the past twenty four hours. A signal may be sent from the accelerometer to hibernation mode accepter module 324, which may initiate a hibernation mode in the mobile device. Hibernation mode may include powering down at least a portion of a computing system while retaining at least part of its computing state. Hibernation may serve to conserve electrical power, for example in the battery of the mobile device. In another embodiment, hibernation mode accepter module 324 may accept and indication to enter hibernation mode upon the activation of a low-battery alarm. One example of using a low-battery alarm may be found in U.S. Patent Publication 2009/0117949, which is incorporated herein by reference. In some instances, hibernation mode accepter module 324 may include a computer processor.

Further, the operation 906 illustrates accepting an indication to enter a partial hibernation mode. For example, as shown in FIGS. 1 through 4, the partial hibernation mode accepter module 326 can accept an indication to enter a partial hibernation mode. In an embodiment, partial hibernation mode accepter module 326 may accept an indication to enter a mobile device into a partial hibernation mode. A partial hibernation mode may be similar to a hibernation mode, discussed above, but may include more running applications and/or services. In some instances, partial hibernation mode accepter module 326 may include a computer processor.

Further, the operation 908 illustrates detecting a low-power status of the battery. For example, as shown in FIGS. 1 through 4, the detector module 328 can detect a low-power status of the battery. In an embodiment, detector module 328 may detect a low-power status of a tablet computer battery. For example, a low-power detecting device may be implemented that can calculate the time until a battery is completely discharged or may need to be replaced and/or recharged. An example of a similar device may be found in U.S. Patent Publication No. 2008/0018306, which is incorporated herein by reference. In some instances, detector module 328 may include a computer processor.

Figure 10:
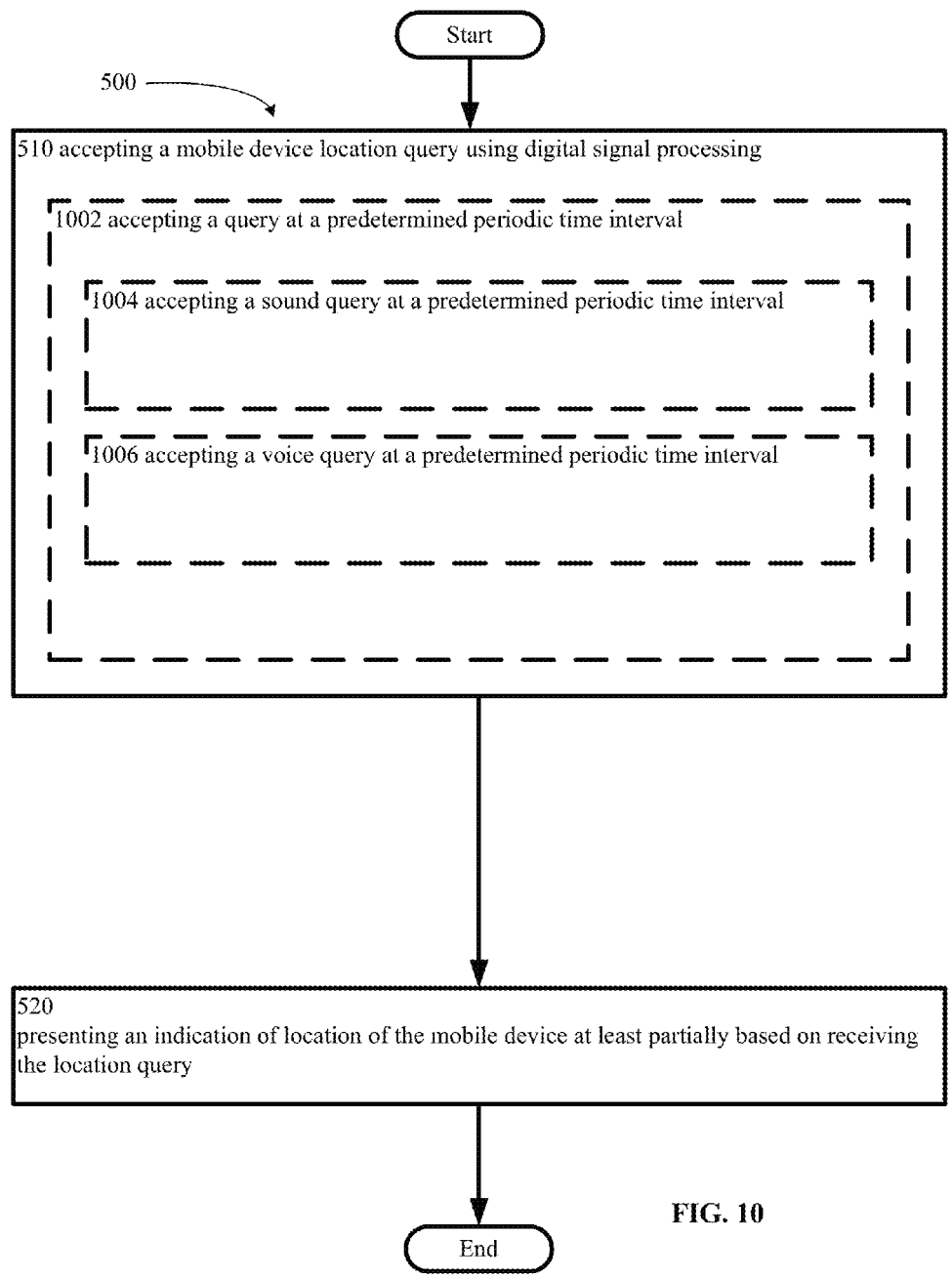
FIG. 10 illustrates certain alternative embodiments of the mobile device location system of FIG. 5.

FIG. 10 illustrates alternative embodiments of the example operational flow 500 of FIG. 5. FIG. 10 illustrates example embodiments where the operation 510 may include at least one additional operation. Additional operations may include an operation 1002, an operation 1004, and/or an operation 1006.

The operation 1002 illustrates accepting a query at a predetermined periodic time interval. For example, as shown in FIGS. 1 through 4, the time interval accepter module 330 can accept a query at a predetermined periodic time interval. In an embodiment, time interval accepter module 330 may be programmed to accept a query regarding location at a specific time or at a specific time period. For example, at 10:00 P.M. every evening the mobile device may turn on from a hibernation mode and may be ready to receive a voice query. In this example, the mobile device may be programmed to return to the hibernation mode to save on battery power if a voice query is not detected within five minutes. This may serve to function as a method for locating a misplaced mobile device while saving battery power and may increase the likelihood that the device may be found even an extended period of time after misplacement. In some instances, time interval accepter module 330 may include a computer processor.

Further, the operation 1004 illustrates accepting a sound query at a predetermined periodic time interval. For example, as shown in FIGS. 1 through 4, the sound interval accepter module 332 can accept a sound query at a predetermined periodic time interval. In an embodiment, sound interval accepter module 332 may accept a recording of a computer-created series of tones that are recognizable by a specific mobile device every hour. Some examples of a sound query may include a computer-created sound, a sound played from a recordable medium, such as a compact disk, or a human voice. In some instances, sound interval accepter module 332 may include a computer processor.

Further, the operation 1006 illustrates accepting a voice query at a predetermined periodic time interval. For example, as shown in FIGS. 1 through 4, the voice interval accepter module 334 can accept a voice query at a predetermined periodic time interval. In an embodiment, voice interval accepter module 334 may accept a sound query in the form of a voice command, for example "phone indicate location" every hour in the hour. The mobile device may be in hibernation mode or in an otherwise power saving mode in order to conserve battery power. In some instances, voice interval accepter module 334 may include a computer processor.

Figure 11:
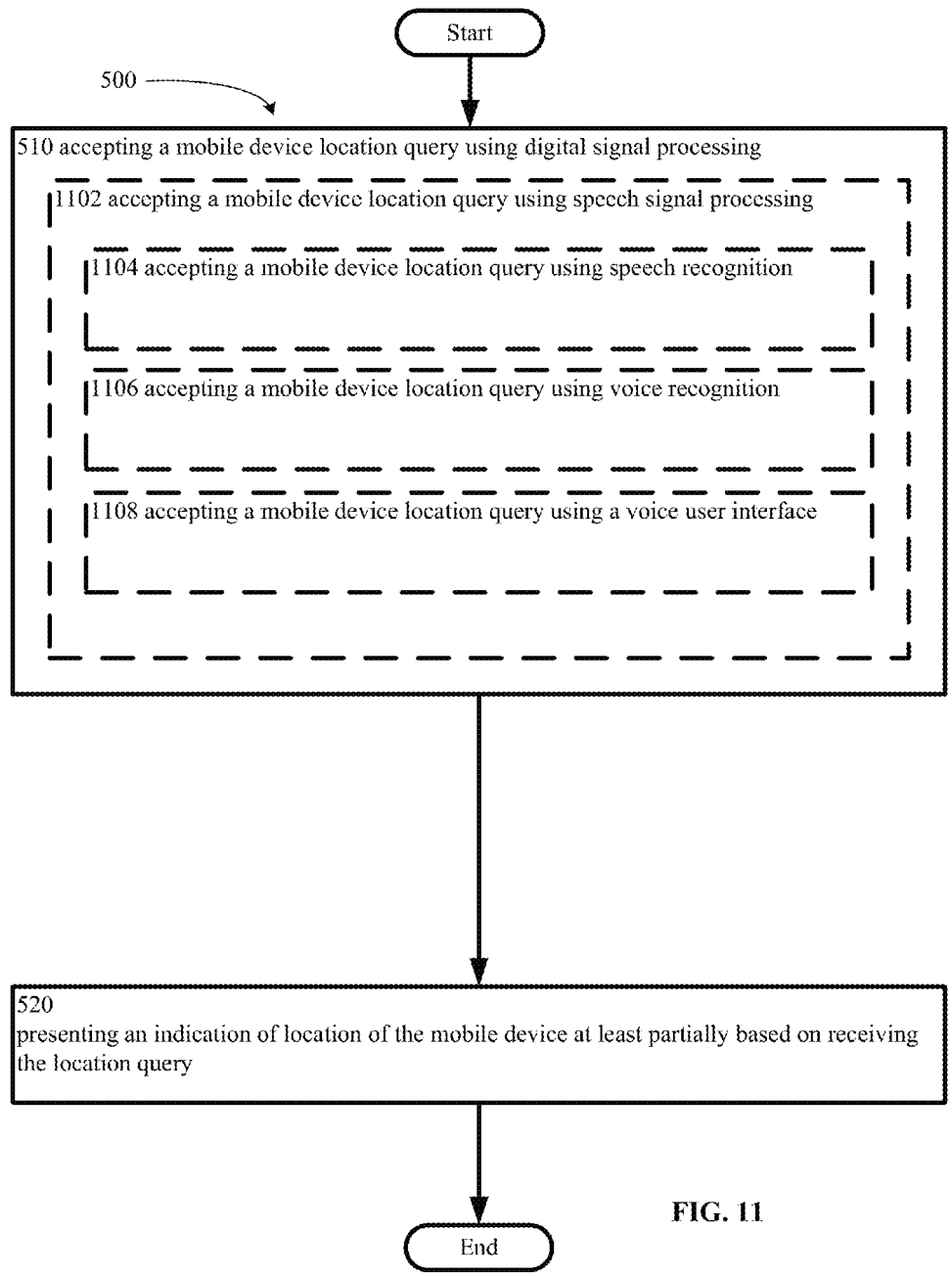
FIG. 11 illustrates certain alternative embodiments of the mobile device location system of FIG. 5.

FIG. 11 illustrates alternative embodiments of the example operational flow 500 of FIG. 5. FIG. 11 illustrates example embodiments where the operation 510 may include at least one additional operation. Additional operations may include an operation 1102, an operation 1104, an operation 1106, and/or an operation 1108.

The operation 1102 illustrates accepting a mobile device location query using speech signal processing. For example, as shown in FIGS. 1 through 4, the location query accepter module 336 can accept a mobile device location query using speech signal processing. In an embodiment, location query accepter module 336 may accept a smartphone location query using speech signal processing. Speech signal processing may include speech recognition and/or speech compression. In some instances, location query accepter module 336 may include a computer processor.

Further, the operation 1104 illustrates accepting a mobile device location query using speech recognition. For example, as shown in FIGS. 1 through 4, the speech recognition accepter module 338 can accept a mobile device location query using speech recognition. In an embodiment, speech recognition accepter module 338 may accept a computer tablet location query using speech recognition. Speech recognition may include converting at least one spoken word to text. Some examples of speech recognition may include voice recognition, which may include a recognition system that is trained to recognize a certain speaker. However, speech recognition generally refers to technology that can recognize speech without being targeted to any one specific speaker, for example a call system that can recognize an arbitrary voice. Other examples of speech recognition may include voice dialing (e.g., "Phone, where are you?"), call routing (e.g., "I would like to make a collect call"), domotic appliance control, search (e.g., find a podcast where particular words were spoken), simple data entry (e.g., entering a credit card number), preparation of structured documents (e.g., a radiology report), speech-to-text processing (e.g., word processors or emails), and/or aircraft (usually termed Direct Voice Input). Another example of speech recognition may include the example found in U.S. Pat. No. 5,903,864, which is incorporated herein by reference. In some instances, speech recognition accepter module 338 may include a computer processor.

Further, the operation 1106 illustrates accepting a mobile device location query using voice recognition. For example, as shown in FIGS. 1 through 4, the voice recognition accepter module 340 can accept a mobile device location query using voice recognition. In an embodiment, voice recognition accepter module 340 may accept a smartphone location query using voice recognition. As discussed above, voice recognition may include a recognition system that is trained to recognize a certain speaker. An example of a voice recognition system may include the example discussed in U.S. Patent Publication No. 2011/0166859, which is incorporated herein by reference. In some instances, voice recognition accepter module 340 may include a computer processor, Further, the operation 1108 illustrates accepting a mobile device location query using a voice user interface. For example, as shown in FIGS. 1 through 4, the voice user interface 342 can accept a mobile device location query using a voice user interface. In an embodiment, voice user interface 342 may accept a mobile device location query using a voice user interface used by a speech application on the mobile device. The mobile device may include a speech application where an individual may speak a word or phrase, such as "phone, beep." Then, the voice user interface would take the spoken word or phrase and utilize the speech application to compute the word or phrase. The mobile phone may then be prompted to present and indication of location of the mobile device. A further example of a voice user interface may include the distributed voice user interface discussed in U.S. Patent Publication 2002/0072918, which is incorporated herein by reference. In some instances, voice user interface 342 may include a computer processor.

Figure 12:
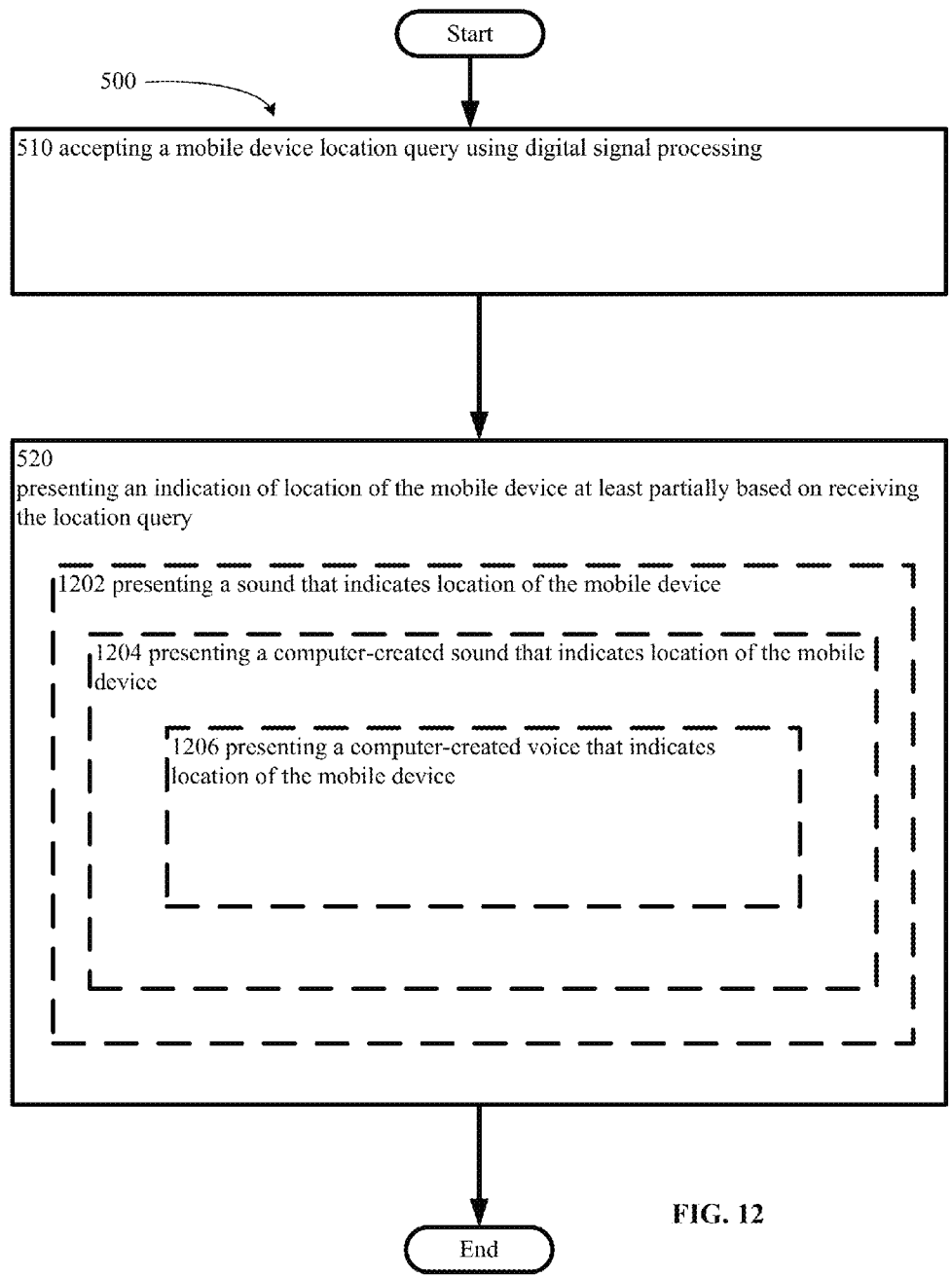
FIG. 12 illustrates certain alternative embodiments of the mobile device location system of FIG. 5.

FIG. 12 illustrates alternative embodiments of the example operational flow 500 of FIG. 5. FIG. 12 illustrates example embodiments where the operation 520 may include at least one additional operation. Additional operations may include an operation 1202, an operation 1204, and/or an operation 1206.

The operation 1202 illustrates presenting a sound that indicates location of the mobile device. For example, as shown in FIGS. 1 through 4, the sound presenter module 402 can present a sound that indicates location of the mobile device. In an embodiment, sound presenter module 402 may present a predetermined ringtone sound that indicates location of the mobile device. Some examples of a sound that may indicate location of the mobile device may include a ringtone, an audible beep, a jingle, or other sounds or combinations of sound. An example of creating and purchasing ringtones may be found in U.S. Patent Publication No. 2008/0167968, which is incorporated herein by reference. In some instances, sound presenter module 402 may include a computer processor.

Further, the operation 1204 illustrates presenting a computer-created sound that indicates location of the mobile device. For example, as shown in FIGS. 1 through 4, the computer-created sound presenter module 404 can present a computer-created sound that indicates location of the mobile device. In an embodiment, computer-created sound presenter module 404 may present a computer-created song that indicates location of the mobile device. This may serve to let an individual know where a misplaced mobile device may be, for example a cell phone that has been lost behind a furniture cushion. Some examples of a computer-created sound may include computer or electronic music, a ringtone, a beep, or a recorded message. An example of creating a computer-created custom ringtone may be found in U.S. Pat. No. 7,546,148. In some instances, computer-created sound presenter module 404 may include a computer processor.

Further, the operation 1206 illustrates presenting a computer-created voice that indicates location of the mobile device. For example, as shown in FIGS. 1 through 4, the voice presenter module 406 can present a computer-created voice that indicates location of the mobile device. In an embodiment, voice presenter module 406 may present a computer created voice that includes a voice repeatedly stating "alert." This may serve to alert an individual of the location of the mobile device in the event of misplacement. In one embodiment, a computer-created voice may be interactive, such as the example found in U.S. Pat. No. 7,778,833, which is incorporated herein by reference. In some instances, voice presenter module 406 may include a computer processor.

Figure 13:
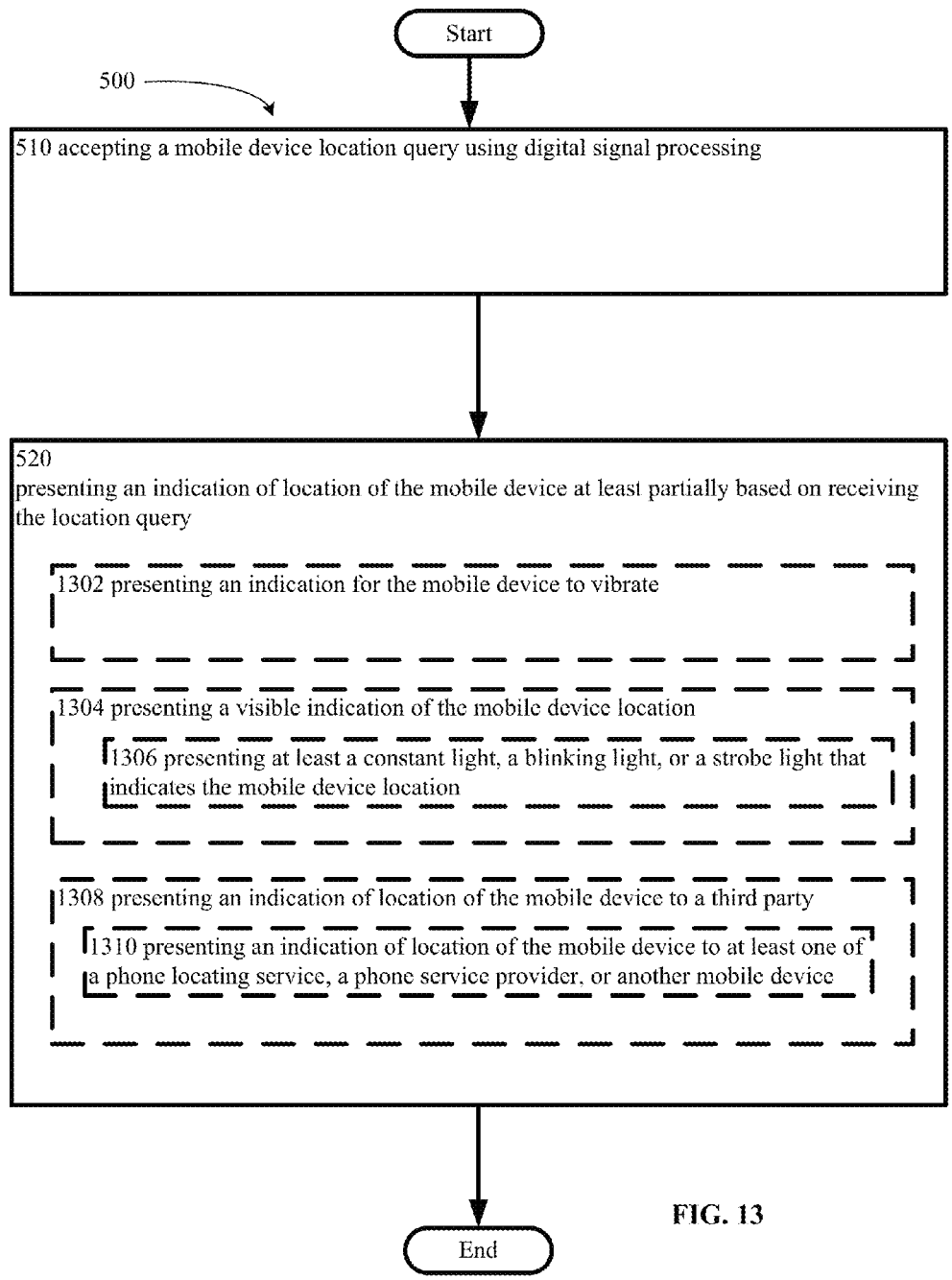
FIG. 13 illustrates certain alternative embodiments of the mobile device location system of FIG. 5.

FIG. 13 illustrates alternative embodiments of the example operational flow 500 of FIG. 5. FIG. 13 illustrates example embodiments where the operation 520 may include at least one additional operation. Additional operations may include an operation 1302, an operation 1304, an operation 1306, an operation 1308, and/or an operation 1310.

The operation 1302 illustrates presenting an indication for the mobile device to vibrate. For example, as shown in FIGS. 1 through 4, the vibration presenter module 408 can present a trigger for the mobile device to vibrate. In an embodiment, vibration presenter module 408 may present an indication for the mobile device to trigger a vibrating alert. In this embodiment, a vibrating alert motor may be included in the mobile device. the vibrating alert motor may include a small electric motor coupled to an eccentric, or unbalanced weight. Utilizing a vibration may generally serve to alert an individual in the case of a noisy environment or in the case of a hearing impaired user. An additional reason may include increased sound, such as when the mobile device with a vibrating alert motor is placed on a firm or hard surface. In this case, the vibration may often be as loud or louder than a regular sound or ringtone because of the vibration against the firm of hard surface. An example of a mobile device including a vibrating alert motor may include a cell phone with a vibrating alert motor, such as the example described in U.S. Patent Publication No. 2008/0242287, which is incorporated herein by reference. In some instances, vibration presenter module 408 may include a computer processor.

The operation 1304 illustrates presenting a visible indication of the mobile device location. For example, as shown in FIGS. 1 through 4, the visible signal presenter module 410 can present a visible indication of the mobile device location. In an embodiment, visible signal presenter module 410 may present an LED light to indicate the mobile device location. Presenting a visible indication of the mobile device may serve to locate a misplaced mobile device and may be especially helpful, for example, to an individual that may be hearing impaired. Some examples of a visible indication may include a light, such as an LED or an incandescent bulb, a strobe light, a backlit display, or a lit screen display. In one embodiment, visible signal presenter module 410 may present a strobe light in order to indicate to an individual a misplaced tablet computer. In this embodiment, the strobe light may be included with the tablet computer, for example as part of a camera flash where the camera flash is utilized as the strobe light. Another example of a light mechanism for a cell phone may be found in U.S. Pat. No. 6,341,871, which is incorporated herein by reference. In some instances, visible signal presenter module 410 may include a computer processor.

Further, the operation 1306 illustrates presenting at least a constant light, a blinking light, or a strobe light that indicates the mobile device location. For example, as shown in FIGS. 1 through 4, the light presenter module 412 can present at least a constant light, a blinking light, or a strobe light that indicates the mobile device location. In an embodiment, light presenter module 412 may present a blinking light that may indicate a misplaced smartphone to an individual. Presenting a blinking light may serve to be more visible and more effectively alert an individual to the location of a mobile device. A constant light may include an LED light source, an incandescent light source, or a flourescent light source, for example. A light that is constantly illuminated may serve to be more visible to an individual in a darkened setting, such as a room without any other light or solely ambient light. A strobe light may include a stroboscopic light, or a light that may be used to produce regular flashes of light, for example ten to twelve flashes of light per second. In an embodiment, light presenter module 412 may present a strobe light that discharges light in a continuous mode for five minute intervals. Another example of a mobile device presenting a strobe light may include a cell phone with a built in flash, such as the device disclosed in U.S. Pat. No. 7,428,016, which is incorporated herein by reference. In some instances, light presenter module 412 may include a computer processor.

The operation 1308 illustrates presenting an indication of location of the mobile device to a third party. For example, as shown in FIGS. 1 through 4, the third party presenter module 414 can present an indication of location of the mobile device to a third party. In an embodiment, third party presenter module 414 may present an indication of location of the mobile device to an off location computer. In this embodiment, the mobile device may transmit an indication of location, such as a router web address or GPS coordinates, for example, to a computer programmed to receive GPS coordinates and alert the mobile device owner as to the location. Some examples of a third party may include an off location or remote computer, a mobile service provider, or a second mobile device. In some instances, third party presenter module 414 may include a computer processor.

Further, the operation 1310 illustrates presenting an indication of location of the mobile device to at least one of a phone locating service, a phone service provider, or another mobile device. For example, as shown in FIGS. 1 through 4, the service presenter module 416 can present an indication of location of the mobile device to at least one of a phone locating service, a phone service provider, or another mobile device. In an embodiment, service presenter module 416 may present a set of GPS coordinates to a second mobile device. In this embodiment, an individual that has misplaced a first mobile device, a cell phone for example, may additionally possess a second mobile device, a computer tablet for example, that may be configured to accept an indication of location of the first mobile device, such as GPS coordinates. In a specific embodiment, an individual may misplace or lose a cell phone at a local store while shopping and upon arriving home, may realize the cell phone has been lost. In this example, the service presenter module 416 may be configured to present a set of location coordinates to a tablet computer possessed by the individual where the individual can retrieve the lost cell phone according to the location coordinates. A phone locating service may include a service that uses computers, for example, configured to accept an indication of a mobile device and further report location of the mobile device. In some instances, the phone locating service may be for-profit and may offer a subscription service. A phone service provider may include a provider of network service and may include data and/or voice plans to a mobile device. Some examples of a phone service provider may include Sprint, AT&T, and Verizon as well as other similar providers. Some examples of another mobile device may include a tablet computer, a cell phone, or a smartphone. In some instances, service presenter module 416 may include a computer processor.

Figure 14:
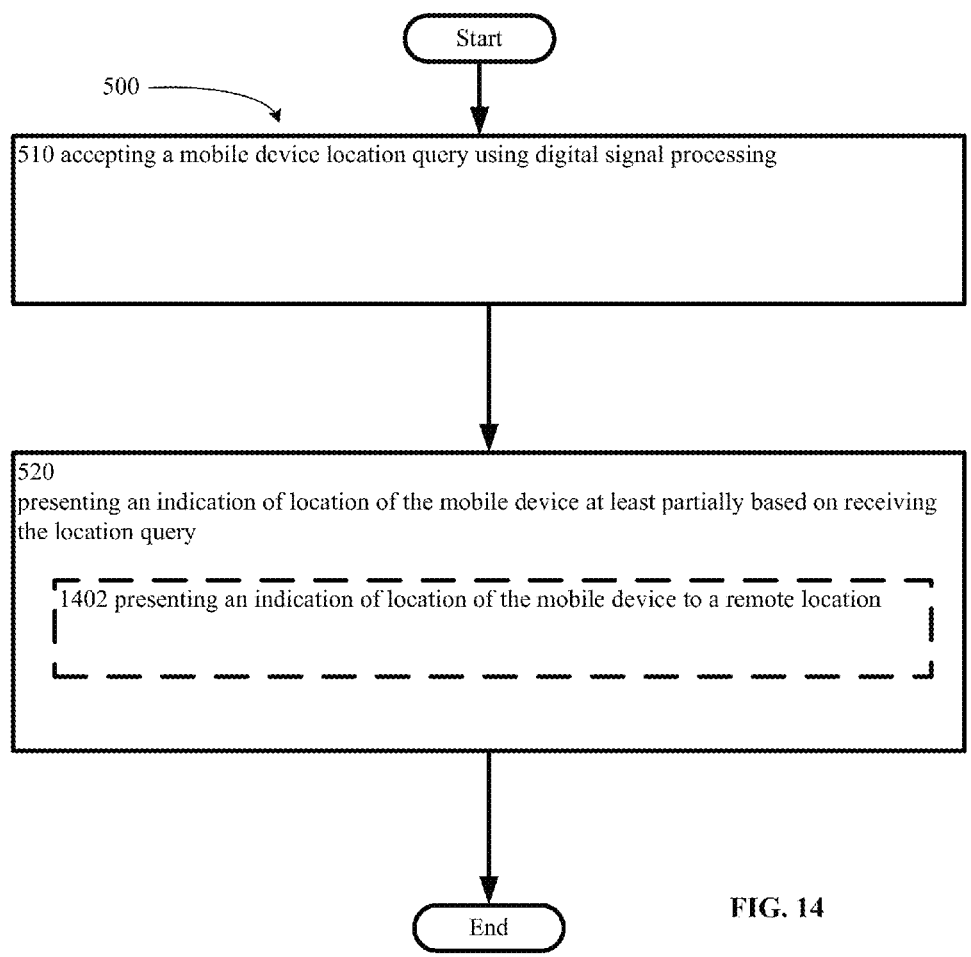
FIG. 14 illustrates certain alternative embodiments of the mobile device location system of FIG. 5.

FIG. 14 illustrates alternative embodiments of the example operational flow 500 of FIG. 5. FIG. 14 illustrates example embodiments where the operation 520 may include at least one additional operation. Additional operations may include an operation 1402.

The operation 1402 illustrates presenting an indication of location of the mobile device to a remote location. For example, as shown in FIGS. 1 through 4, the remote presenter module 418 can present an indication of location of the mobile device to a remote location. In an embodiment, remote presenter module 418 may present an indication of location of the mobile device, which is located in Phoenix, Ariz., to a computer in Los Angeles, Calif. The computer in Los Angeles may serve as an off-location service provider, for example. Additionally, presenting an indication of location of a mobile device to a remote location may serve as a backup location providing service. In some instances, remote presenter module 418 may include a computer processor.

Figure 15:
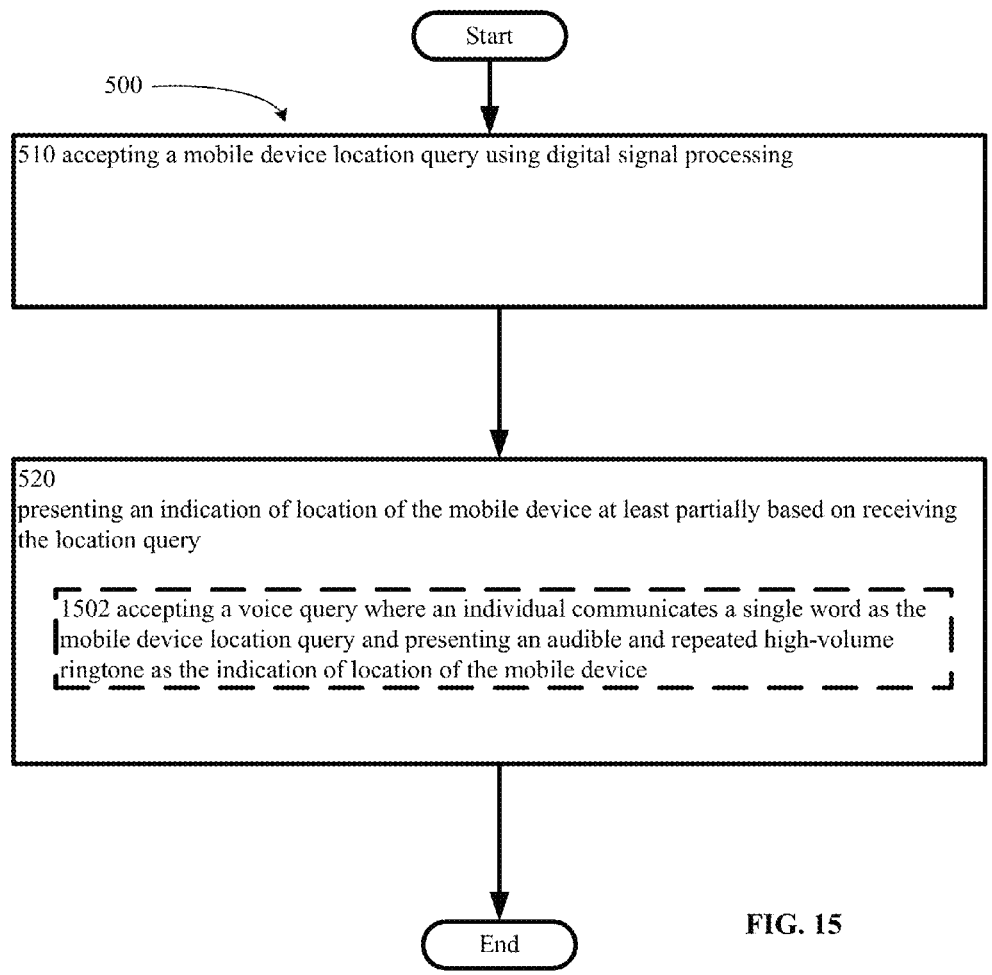
FIG. 15 illustrates certain alternative embodiments of the mobile device location system of FIG. 5.

FIG. 15 illustrates alternative embodiments of the example operational flow 500 of FIG. 5. FIG. 15 illustrates example embodiments where the operation 520 may include at least one additional operation. Additional operations may include an operation 1502.

The operation 1502 illustrates accepting a voice query where an individual communicates a single word as the mobile device location query and presenting an audible and repeated high-volume ringtone as the indication of location of the mobile device. For example, as shown in FIGS. 1 through 4, the accepter module 110 and the presenter module 120 can accept a voice query where an individual communicates a single word as the mobile device location query and present an audible and repeated high-volume ringtone as the indication of location of the mobile device. In an embodiment, accepter module 110 may accept a voice query where an individual communicates a single word as the mobile device location query and presenter module 120 may present an audible and repeated high-volume ringtone as the indication of location of the mobile device. In some instances, accepter module 110 may include a computer processor. In some instances, presenter module 120 may include a computer processor.

Figure 16:
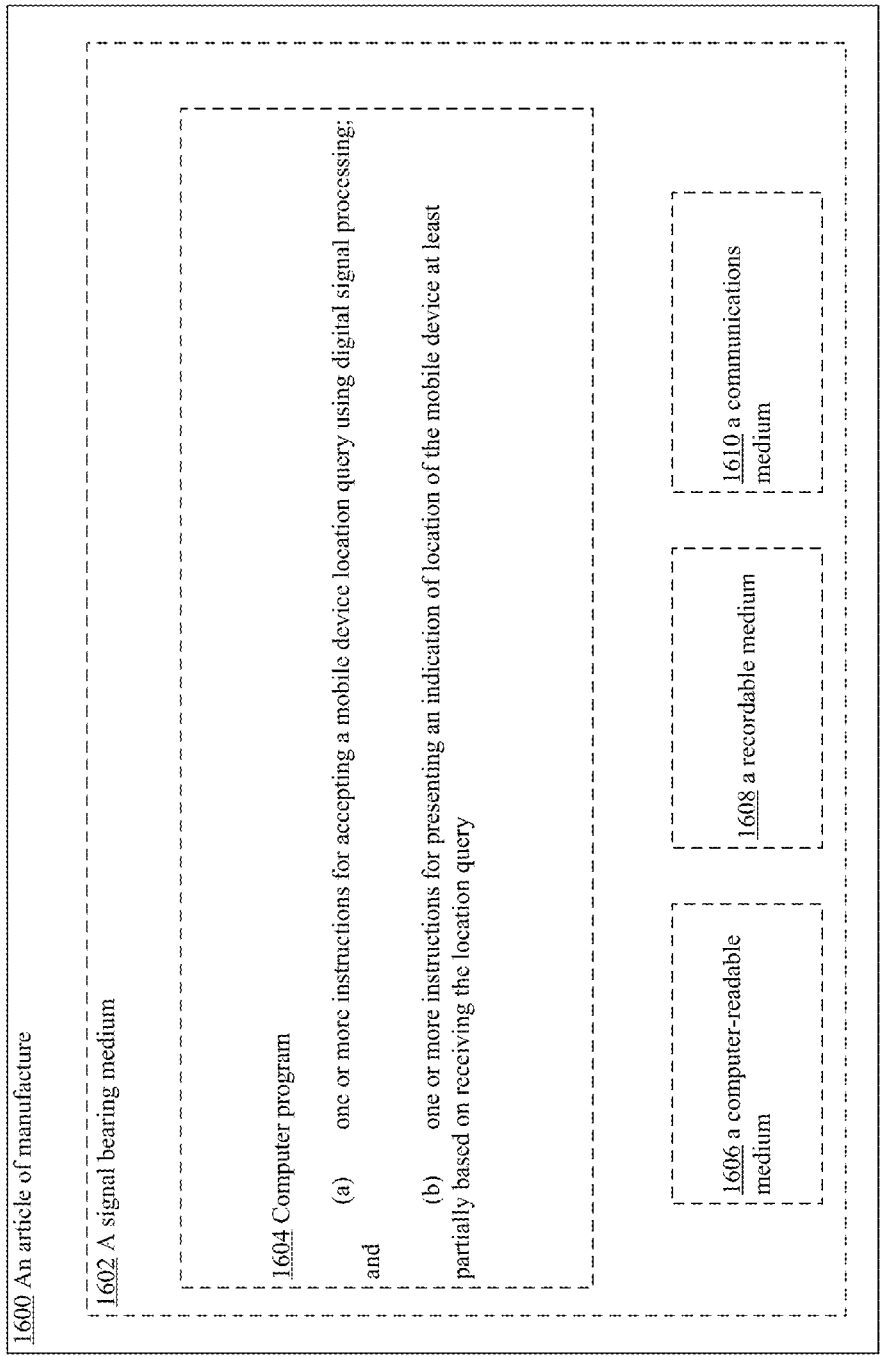
FIG. 16 illustrates a partial view of an example article of manufacture including a computer program product that includes a computer program for executing a computer process on a computing device related to mobile device location, which may serve as a context for introducing one or more processes and/or devices described herein.

FIG. 16 illustrates a partial view of an example computer program product 1600 that includes a computer program 1604 for executing a computer process on a computing device. An embodiment of the example computer program product 1600 is provided using a signal-bearing medium 1602, and may include one or more instructions for accepting a mobile device location query using digital signal processing and one or more instructions for presenting an indication of location of the mobile device at least partially based on receiving the location query. The one or more instructions may be, for example, computer executable and/or logic-implemented instructions. In one implementation, the signal-bearing medium 1602 may include a computer-readable medium 1606. In one implementation, the signal bearing medium 1602 may include a recordable medium 1608. In one implementation, the signal bearing medium 1602 may include a communications medium 1610.

Figure 17:
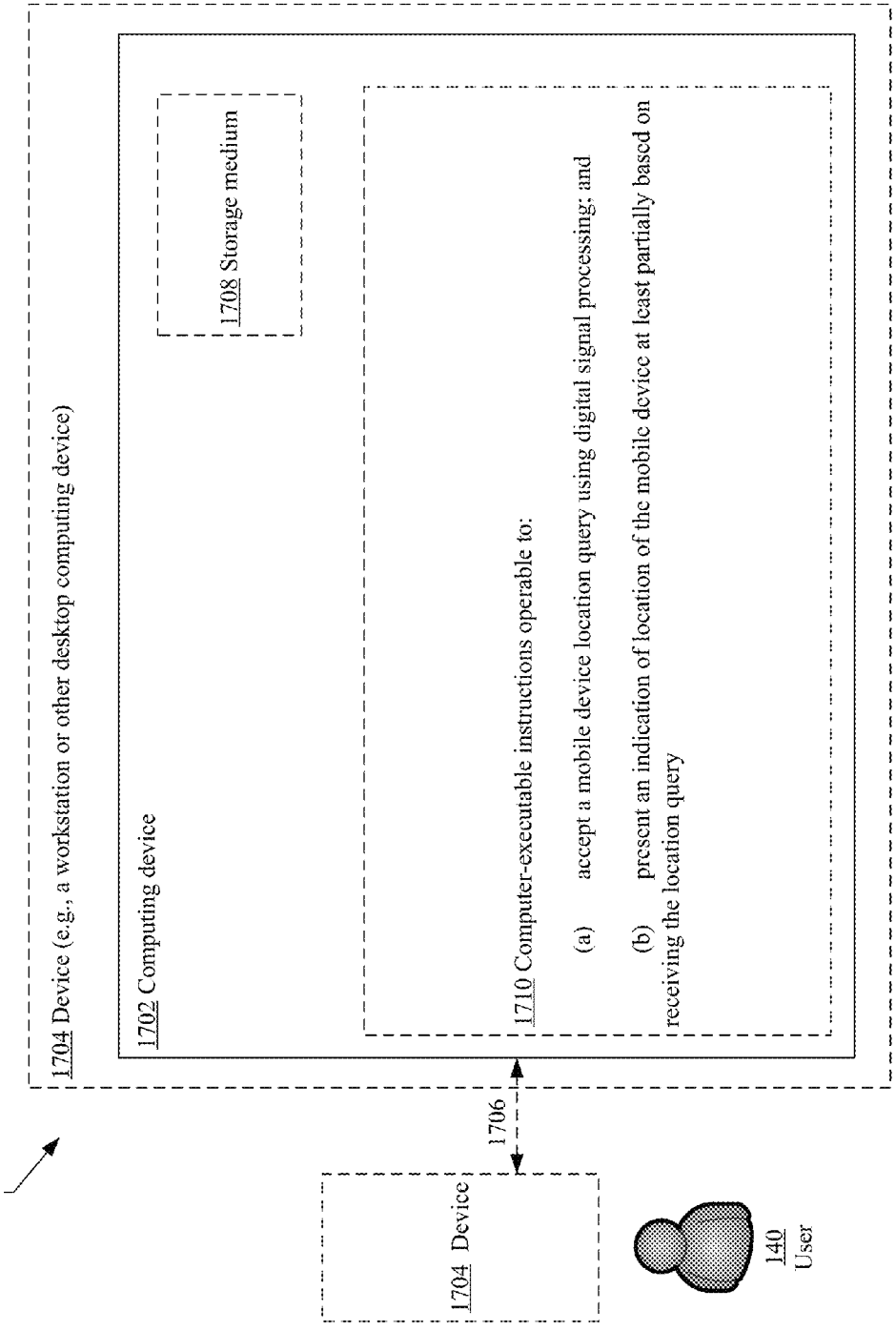
FIG. 17 illustrates an example device in which embodiments may be implemented related to mobile device location, which may serve as a context for introducing one or more processes and/or devices described herein.

FIG. 17 illustrates an example system 1700 in which embodiments may be implemented. The system 1700 includes a computing system environment. The system 1700 also illustrates the user 118 using a device 1704, which is optionally shown as being in communication with a computing device 1702 by way of an optional coupling 1706. The optional coupling 1706 may represent a local, wide-area, or peer-to-peer network, or may represent a bus that is internal to a computing device (e.g., in example embodiments in which the computing device 1702 is contained in whole or in part within the device 1704). A storage medium 1708 may be any computer storage media.

The computing device 1702 includes computer-executable instructions 1710 that when executed on the computing device 1702 cause the computing device 1702 to accept a mobile device location query using digital signal processing and present an indication of location of the mobile device at least partially based on receiving the location query. As referenced above and as shown in FIG. 17, in some examples, the computing device 1702 may optionally be contained in whole or in part within the device 1704.

In FIG. 17, then, the system 1700 includes at least one computing device (e.g., 1702 and/or 1704). The computer-executable instructions 1710 may be executed on one or more of the at least one computing device. For example, the computing device 1702 may implement the computer-executable instructions 1710 and output a result to (and/or receive data from) the computing device 1704. Since the computing device 1702 may be wholly or partially contained within the computing device 1704, the device 1704 also may be said to execute some or all of the computer-executable instructions 1710, in order to be caused to perform or implement, for example, various ones of the techniques described herein, or other techniques.

The device 1704 may include, for example, a portable computing device, workstation, or desktop computing device. In another example embodiment, the computing device 1702 is operable to communicate with the device 1704 associated with the user 118 to receive information about the input from the user 118 for performing data access and data processing and presenting an output of the user-health test function at least partly based on the user data.

Although a user 199 is shown/described herein as a single illustrated figure, those skilled in the art will appreciate that a user 199 may be representative of a human user, a robotic user (e.g., computational entity), and/or substantially any combination thereof (e.g., a user may be assisted by one or more robotic agents). In addition, a user 199, as set forth herein, although shown as a single entity may in fact be composed of two or more entities. Those skilled in the art will appreciate that, in general, the same may be said of "sender" and/or other entity-oriented terms as such terms are used herein.

Figure 18:
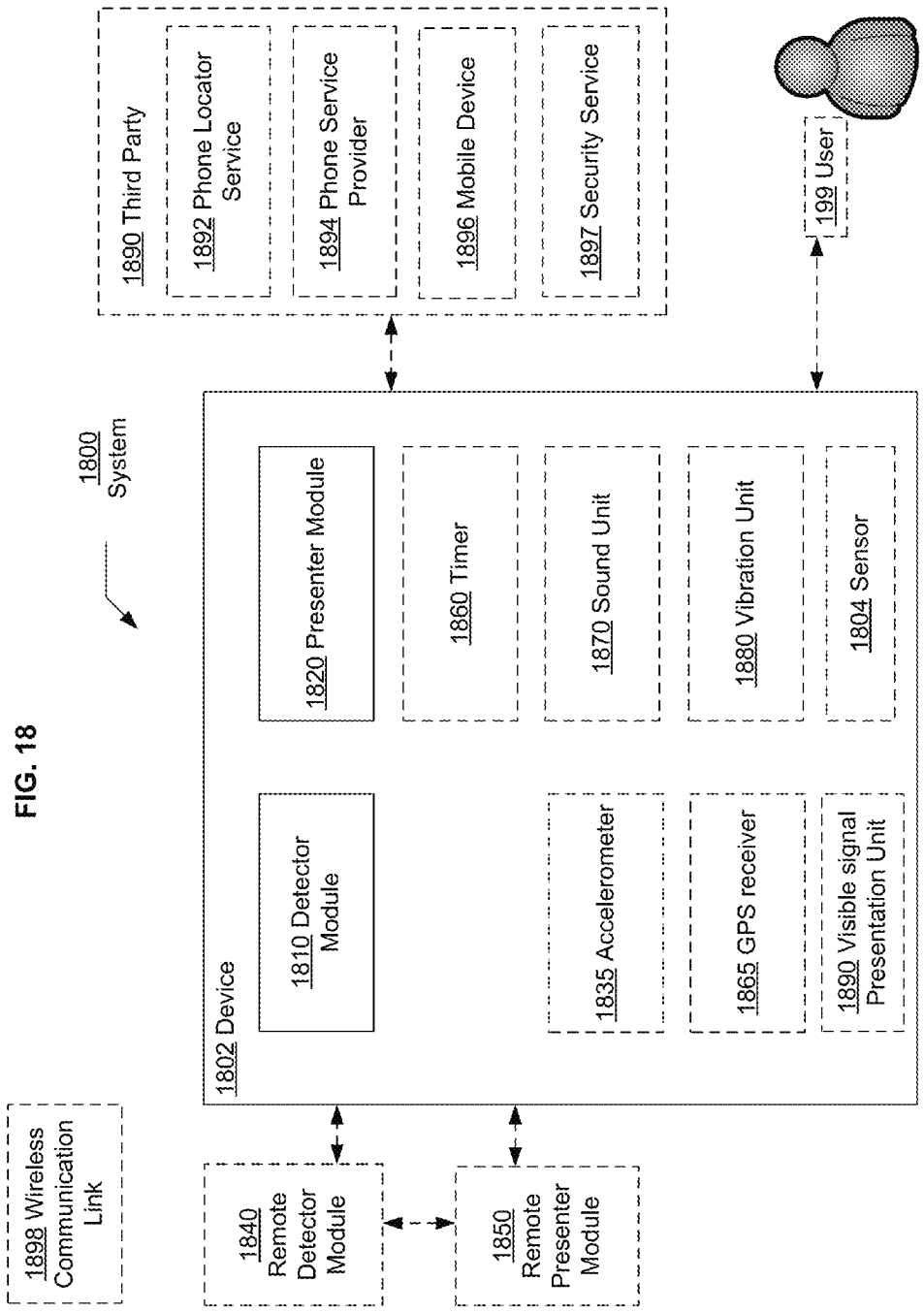
FIG. 18 illustrates an example of a mobile device location system in which embodiments may be implemented, perhaps in a device and/or through a network, which may serve as a context for introducing one or more processes and/or devices described herein.

FIG. 18 illustrates an example system 1800 in which embodiments may be implemented. The system 1800 includes a device 102. The device 102 may contain, for example, sensor 1804, detector module 1810, presenter module 1820, timer 1860, sound unit 1870, vibration unit 1880, accelerometer 1835, GPS receiver 1865, and visible signal presentation unit 1890. The device 1802 may communicate over a network or directly with remote detector module 1840 and/or remote presenter module 1850. User 199 may interact directly or through a user interface with device 1802. Device 1802 may communicate with a third party 1890, which may include phone locator service 1892, phone service provider 1894, security service 1897, mobile device 1896, and/or wireless communication link 1898.

In FIG. 18, the device 1802 is illustrated as possibly being included within a system 1800. Of course, virtually any kind of computing device may be used to implement the sensor 1804, detector module 1810 and/or presenter module 1820, such as, for example, a programmed workstation, a programmed desktop computer, a programmed networked computer, a programmed server, a collection of programmed servers and/or databases, a programmed virtual machine running inside a computing device, a programmed mobile computing device, or a programmed tablet PC.

Additionally, not all of the sensor 1804, detector module 1810 and/or presenter module 1820 need be implemented on a single computing device. For example, the sensor 1804, detector module 1810 and/or presenter module 1820 may be implemented and/or operable on a remote computer, while a user interface and/or local instance of the sensor 1804, detector module 1810 and/or presenter module 1820 are implemented and/or occur on a local computer. Further, aspects of the sensor 1804, detector module 1810 and/or presenter module 1820 may be implemented in different combinations and implementations than that shown in FIG. 1. For example, functionality of a user interface may be incorporated into the sensor 1804, detector module 1810 and/or presenter module 1820. The sensor 1804, detector module 1810 and/or presenter module 1820 may perform simple data relay functions and/or complex data analysis, including, for example, fuzzy logic and/or traditional logic steps. Further, many methods of searching health care and/or service provider databases known in the art may be used, including, for example, unsupervised pattern discovery methods, coincidence detection methods, and/or entity relationship modeling. In some embodiments, the sensor 1804, detector module 1810 and/or presenter module 1820 may process user input data according to health care options and/or service provider information available as updates through a network.

Detector module 1810 and/or presenter module 1820 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

Figure 19:
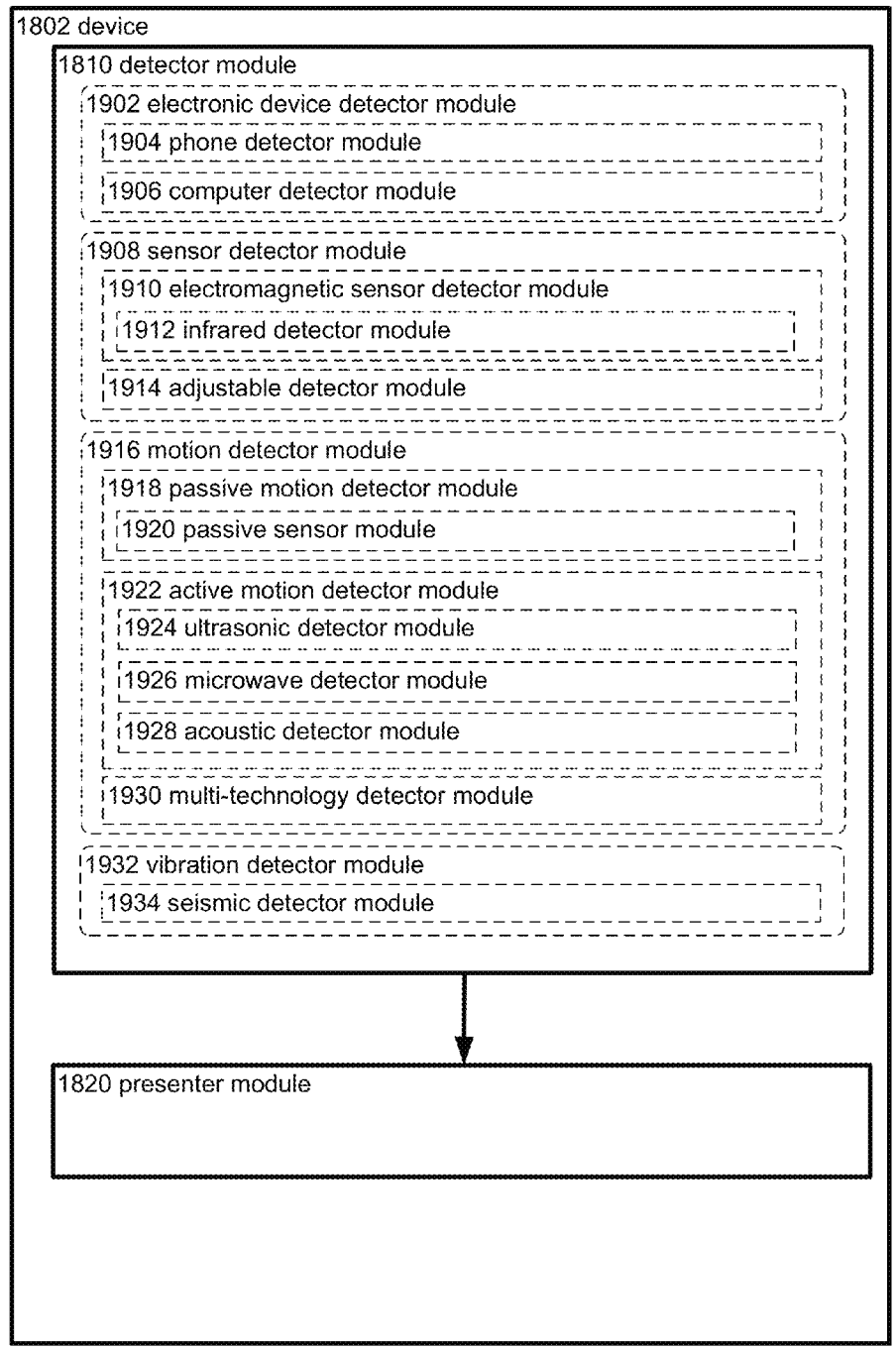
FIG. 19 illustrates certain alternative embodiments of the mobile device location system of FIG. 18.

FIG. 19 illustrates device 1802, which may further include detector module 1810 and/or presenter module 1820. Detector module 1810 may include electronic device detector module 1902, sensor detector module 1908, motion detector module 1916, and/or vibration detector module 1932. Electronic device detector module 1902 may include phone detector module 1904 and/or computer detector module 1906. Sensor detector module 1908 may include electromagnetic sensor detector module 1910 and/or adjustable detector module 1914. Electromagnetic sensor detector module 1910 may include infrared detector module 1912. Motion detector module 1916 may include passive motion detector module 1918, active motion detector module 1922, and/or multi-technology detector module 1930. Passive motion detector module 1918 may include passive sensor module 1920. Active motion detector module 1922 may include ultrasonic detector module 1920, microwave detector module 1926, and/or acoustic detector module 1928. Vibration detector module 1932 may include seismic detector module 1934.

Figure 20:
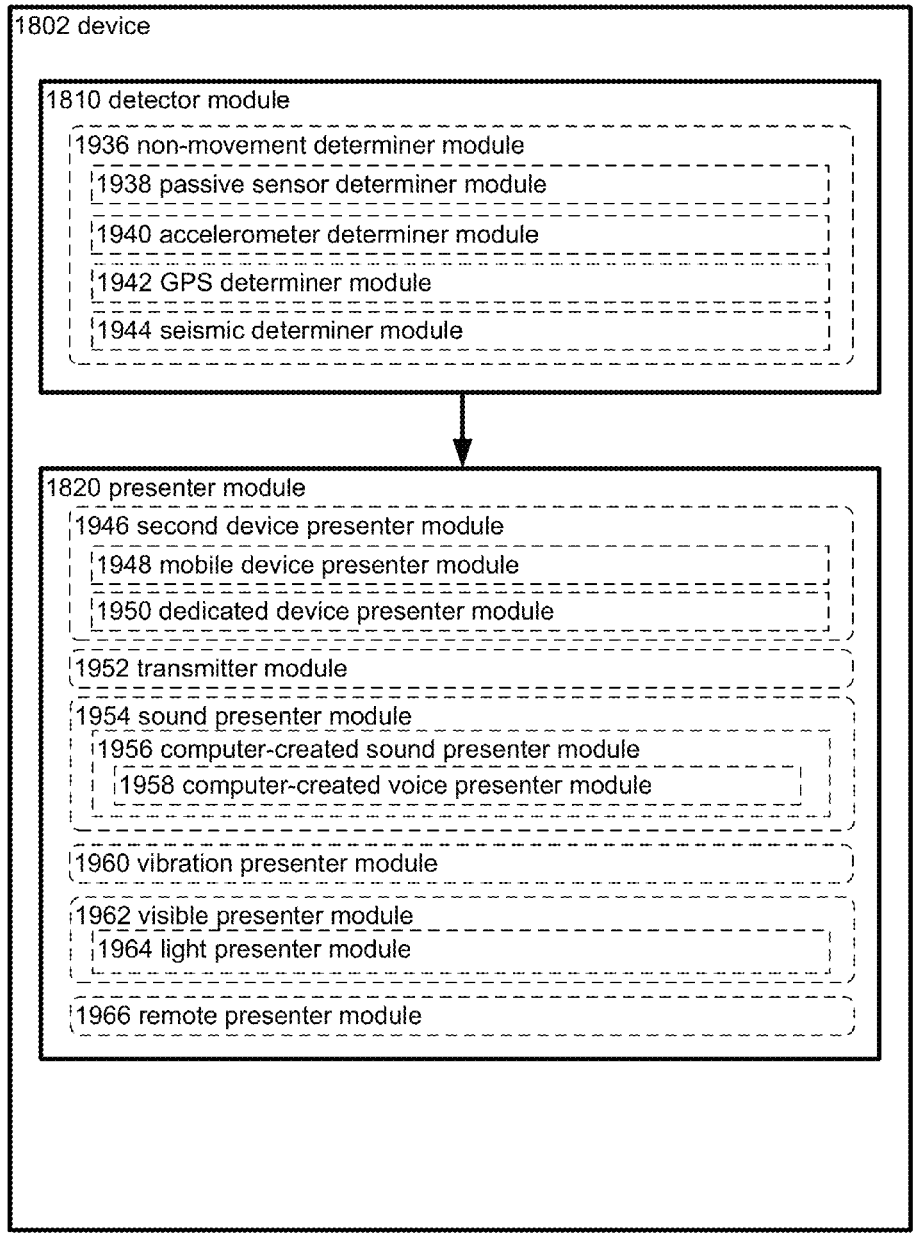
FIG. 20 illustrates certain alternative embodiments of the mobile device location system of FIG. 18.

FIG. 20 illustrates device 1802, which may further include detector module 1810 and/or presenter module 1820. Detector module 1810 may include inactivity determiner module 1936. Inactivity determiner module 1936 may include passive sensor determiner module 1938, accelerometer determiner module 1940, GPS determiner module 1942, and/or seismic determiner module 1944. Presenter module 1820 may include second device presenter module 1946, transmitter module 1952, sound presenter module 1954, vibration presenter module 1960, visible presenter module 1962, and/or remote presenter module 1966. Second device presenter module 1946 may include mobile device presenter module 1948 and/or dedicated device presenter module 1950. Sound presenter module 1954 may include computer-created sound presenter module 1956. Computer-created sound presenter module 1956 may include computer-created voice presenter module 1958. Visible presenter module 1962 may include light presenter module 1964.

Figure 21:
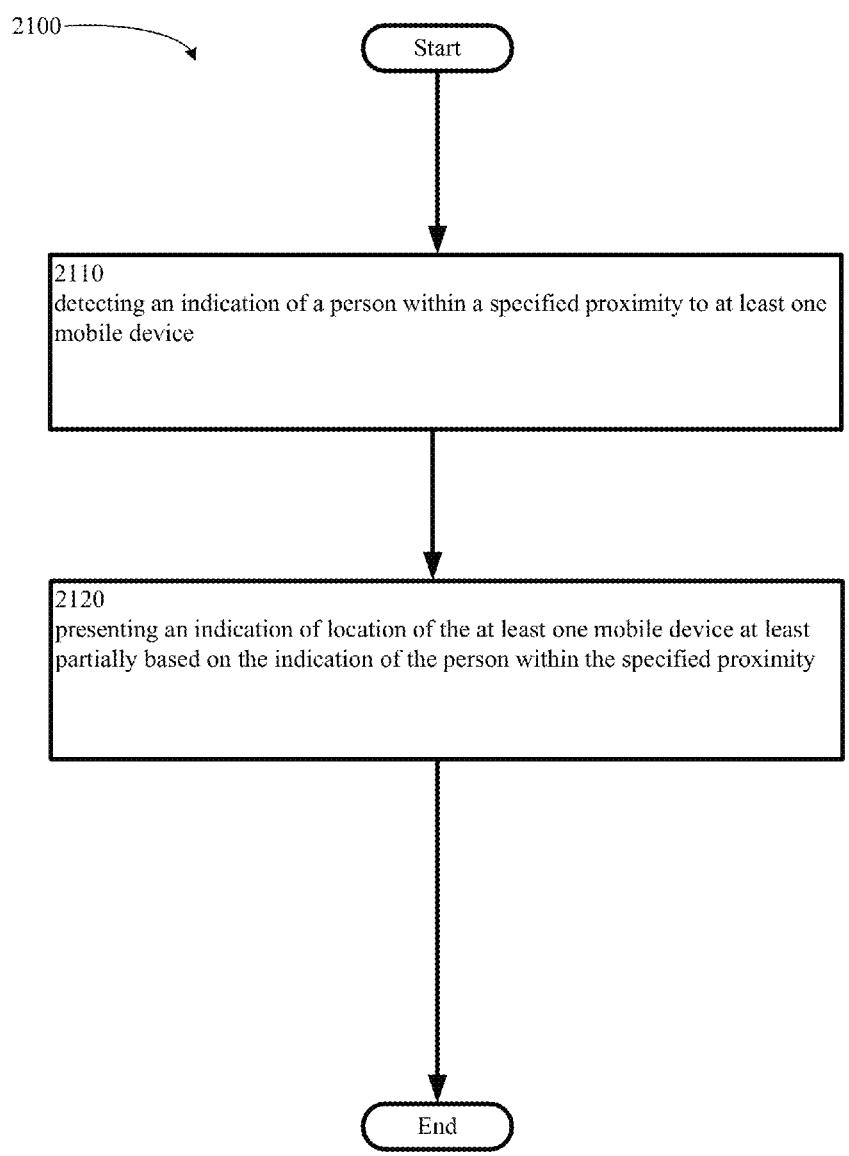
FIG. 21 illustrates an example of an operational flow representing example operations related to mobile device location, which may serve as a context for introducing one or more processes and/or devices described herein.

FIG. 21 illustrates an operational flow 2100 representing example operations related to detecting an indication of a person within a specified proximity to at least one mobile device and presenting an indication of location of the at least one mobile device at least partially based on the indication of the person within the specified proximity. In FIG. 21 and in following figures that include various examples of operational flows, discussion and explanation may be provided with respect to the above-described examples of FIGS. 18 through 20, and/or with respect to other examples and contexts. However, it should be understood that the operational flows may be executed in a number of other environments and contexts, and/or in modified versions of FIGS. 18 through 20. Also, although the various operational flows are presented in the sequence(s) illustrated, it should be understood that the various operations may be performed in other orders than those which are illustrated, or may be performed concurrently.

After a start operation, the operational flow 2100 moves to an operation 2110. Operation 2110 depicts detecting an indication of a person within a specified proximity to at least one mobile device. For example, as shown in FIGS. 18 through 20, the detector module 1810 can detect an indication of a person within a specified proximity to at least one mobile device. In an embodiment, detector module 1810 may the presence of a person within ten feet of a tablet computer. Detecting an indication of a person may utilize different methods and technologies, for example motion detection (e.g., a passive infrared detector), heat detection (e.g., an infrared camera), and/or vibration detection (e.g., seismic detection). A specified proximity may include a preset value an individual may program into a detection device, which may be coupled with the at least one mobile device. Additionally, a specified proximity may be specified to be within an effective range, depending on the effectiveness of the proximity detection device. Some examples of a mobile device may include a cell phone, a smartphone, a tablet computer, a personal digital assistant (PDA), an mp3 player, an enterprise digital assistants, as well as other small and/or hand-held computing devices. In some instances, detector module 1810 may include a computer processor.

Then, operation 2120 depicts presenting an indication of location of the at least one mobile device at least partially based on the indication of the person within the specified proximity. For example, as shown in FIGS. 18 through 20, the presenter module 1820 can present an indication of location of the at least one mobile device at least partially based on the indication of a person within the specified proximity. In an embodiment, presenter module 1820 may present an indication of location of a smartphone location in the form of sending predicted GPS coordinates to a website and presenting an audible beep at least partially based on the indication of a person within the specified proximity. An individual may then determine from the GPS coordinates sent to the website a location of, for example, the misplaced smartphone. Some additional examples of presenting a location of a mobile device may include transmitting other information, such as a location on a map or GPS coordinates. Other examples of presenting an indication of location may include transmitting a signal to another mobile device and/or presenting an indication of location to a printer coupled to a computer in a central location, such as the mobile device owner's home office. In some instances, presenter module 1830 may include a computer processor.

Figure 22:
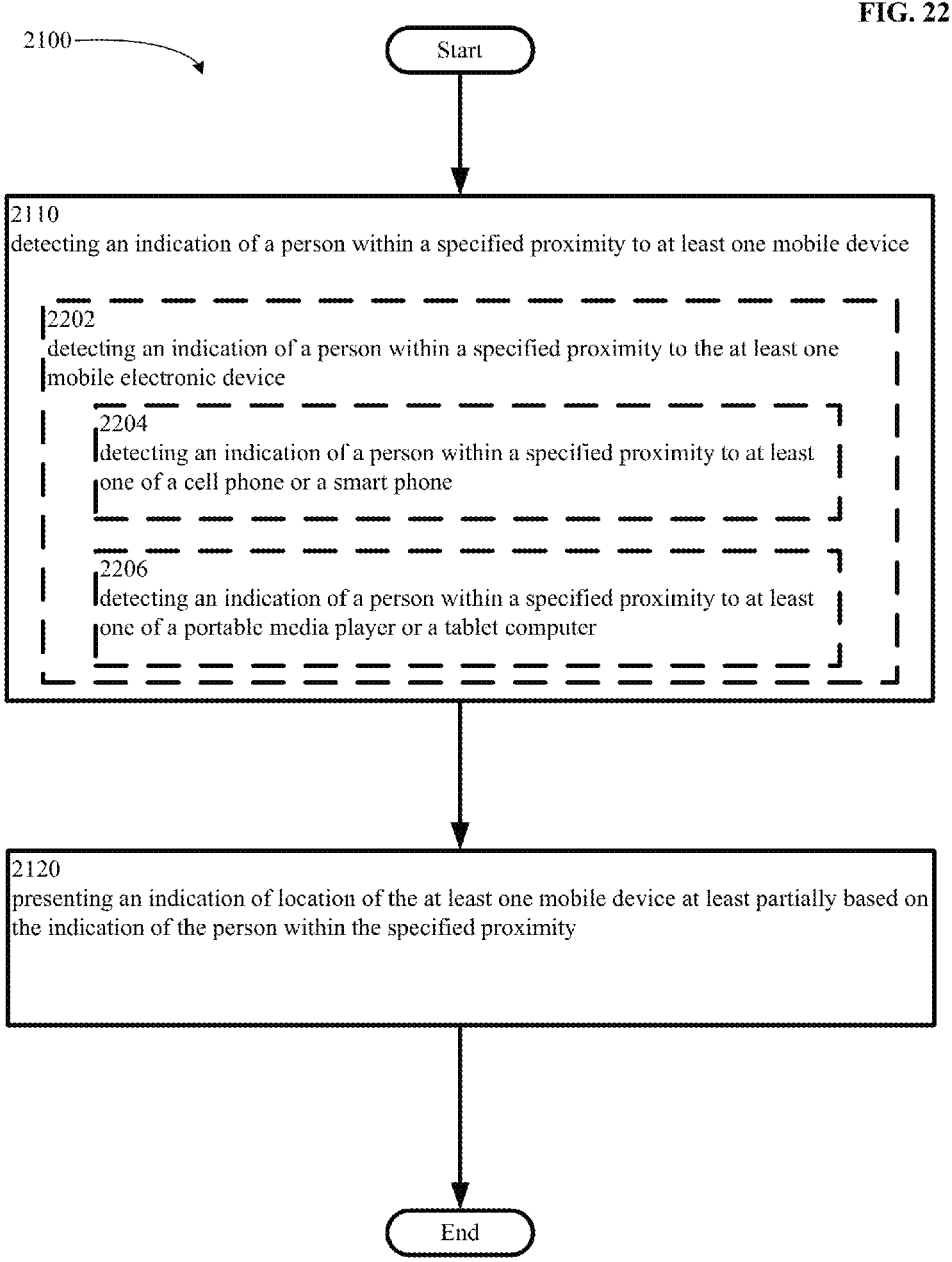
FIG. 22 illustrates certain alternative embodiments of the mobile device location system of FIG. 21.

FIG. 22 illustrates alternative embodiments of the example operational flow 2100 of FIG. 21. FIG. 22 illustrates example embodiments where the operation 2110 may include at least one additional operation. Additional operations may include an operation 2202, an operation 2204, and/or an operation 2206.

The operation 2202 illustrates detecting an indication of a person within a specified proximity to the at least one mobile electronic device. For example, as shown in FIGS. 18 through 20, the electronic device detector module 1902 can detect an indication of a person within a specified proximity to the at least one mobile electronic device. In an embodiment, electronic device detector module 1902 may detect a person within twenty feet (e.g., within a bedroom) of a tablet computer. Some examples of a mobile electronic device may include a cell phone, a smartphone, an enterprise digital assistant, and/or a tablet computer. Another example of an electronic mobile device may include the example found in U.S. Patent Publication No. 2004/0049743, which is incorporated herein by reference. In some instances, electronic device detector module 1902 may include a computer processor.

Further, the operation 2204 illustrates detecting an indication of a person within a specified proximity to at least one of a cell phone or a smart phone. For example, as shown in FIGS. 18 through 20, the phone detector module 1904 can detect an indication of a person within a specified proximity to at least one of a cell phone or a smart phone. In an embodiment, phone detector module 1904 may detect an indication of a person within a five foot radius of a smartphone. This may serve to alert an individual, such as the person within the specified proximity (e.g., the five foot radius) of the location of the smartphone or other mobile device. A cell phone may include a device that may make and/or receive telephone calls over a radio link while moving about a wide geographic area. A smart phone may include a high-end mobile phone built on a mobile computing platform with advanced computing capability and connectivity that a contemporary feature phone. In some instances, phone detector module 1904 may include a computer processor.

Further, the operation 2206 illustrates detecting an indication of a person within a specified proximity to at least one of a portable media player or a tablet computer. For example, as shown in FIGS. 18 through 20, the computer detector module 1906 can detect an indication of a person within a specified proximity to at least one of a portable media player or a tablet computer. In an embodiment, computer detector module 1906 may detect a person within a ten foot radius of a tablet computer. A tablet computer may include a mobile computer integrated into a flat touch screen and primarily operated by touching the screen and often uses an onscreen virtual keyboard. The term may also apply to a variety of form factors that differ in position of the screen with respect to a keyboard. The standard form is called slate, which does not have an integrated keyboard but may be connected to one with a wireless link or a USB port. Convertible notebook computers have an integrated keyboard that can be hidden by a swivel joint or slide joint, exposing only the screen for touch operation. Hybrids have a detachable keyboard so that the touch screen can be used as a stand-alone tablet. Booklets include two touch screens, and can be used as a notebook by displaying a virtual keyboard in one of them. A portable media player may include a consumer electronics device that may be capable of storing and playing digital media such as audio, images, video, documents, etc. The data may be typically stored on a hard drive, microdrive, or flash memory. Additionally, other types of electronic devices like cellphones, internet tablets, and digital cameras may be sometimes referred as portable media players because of their playback capabilities. In some instances, computer detector module 1906 may include a computer processor.

Figure 23:
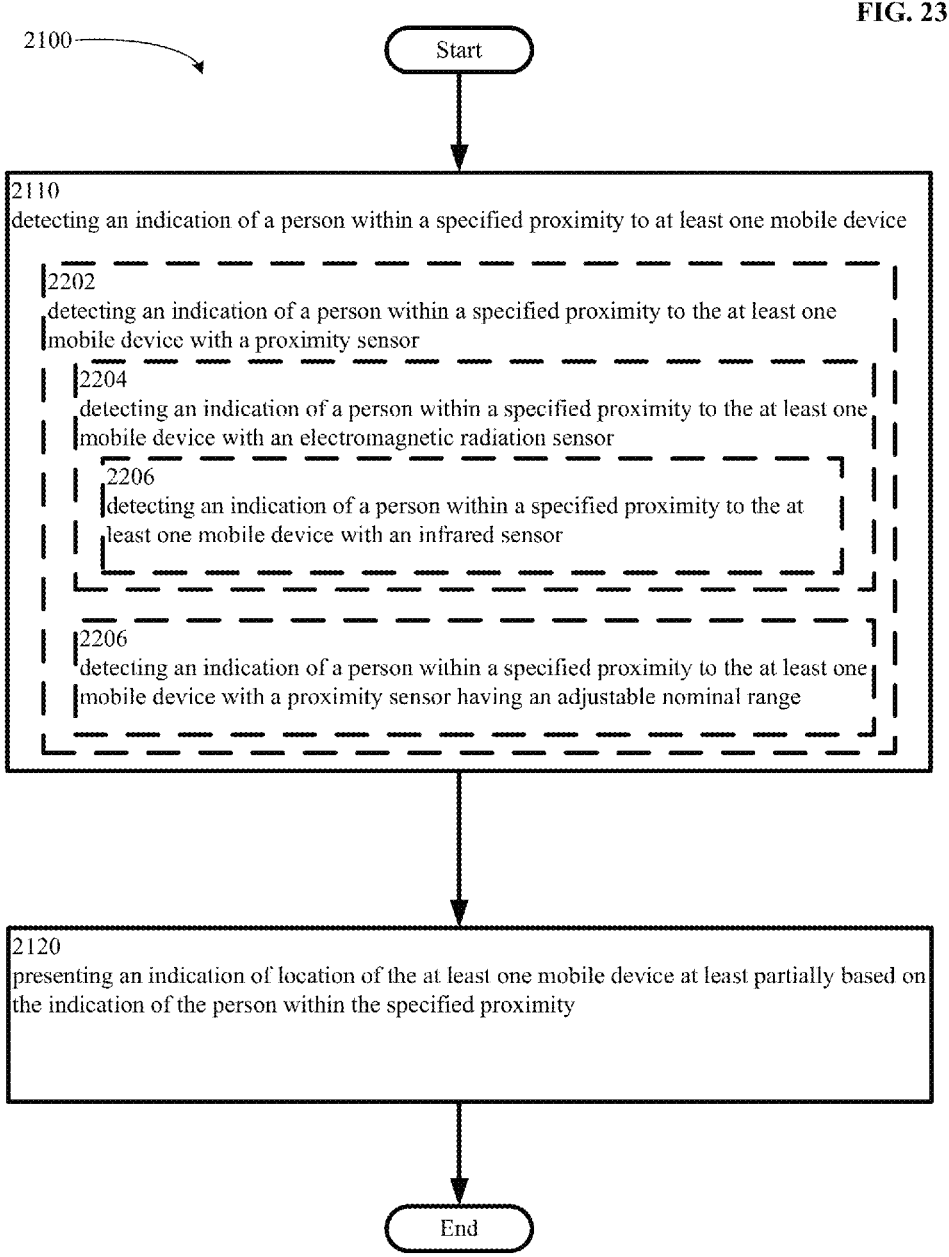
FIG. 23 illustrates certain alternative embodiments of the mobile device location system of FIG. 21.

FIG. 23 illustrates alternative embodiments of the example operational flow 2100 of FIG. 21. FIG. 23 illustrates example embodiments where the operation 2110 may include at least one additional operation. Additional operations may include an operation 2302, an operation 2304, an operation 2306, and/or an operation 2308.

The operation 2302 illustrates detecting an indication of a person within a specified proximity to the at least one mobile device with a proximity sensor. For example, as shown in FIGS. 18 through 20, the sensor detector module 1908 can detect a person's presence within a twenty foot radius of a smartphone with a proximity sensor. A proximity sensor may include a sensor able to detect the presence of nearby objects without any physical contact. A proximity sensor may often emit an electromagnetic or a beam of electromagnetic radiation (e.g., infrared, for instance), and look for changes in the field or return signal. The object being sensed may often be referred to as the proximity sensor target. Different proximity sensor targets may demand different sensors. Some examples of a proximity sensor may include the proximity sensor in a computer input device, U.S. Pat. No. 6,456,275, which is incorporated herein by reference. In some instances, sensor detector module 1908 may include a computer processor.

Further, the operation 2304 illustrates detecting an indication of a person within a specified proximity to the at least one mobile device with an electromagnetic radiation sensor. For example, as shown in FIGS. 18 through 20, the electromagnetic sensor detector module 1910 can detect an indication of a person within a specified proximity to the at least one mobile device with an electromagnetic radiation sensor. In an embodiment, electromagnetic sensor detector module 1910 may detect the presence of an individual within a forty foot radius of a smartphone using a sensor that uses electromagnetic radiation. Electromagnetic radiation (often abbreviated E-M radiation or EMR) is a form of energy that exhibits wave-like behavior as it travels through space. EMR has both electric and magnetic field components, which oscillate in phase perpendicular to each other and perpendicular to the direction of energy propagation. An example of a selectable field motion detector that uses electromagnetic radiation may be found in U.S. Pat. No. 7,902,508, which is incorporated herein by reference. In some instances, electromagnetic sensor detector module 1910 may include a computer processor.

Further, the operation 2306 illustrates detecting an indication of a person within a specified proximity to the at least one mobile device with an infrared sensor. For example, as shown in FIGS. 18 through 20, the infrared detector module 1912 can detect an indication of a person within a specified proximity to the at least one mobile device with an infrared sensor. In an embodiment, infrared detector module 1912 may detect the presence of an individual within a fifteen foot radius of a tablet computer with an infrared motion sensor. An infrared sensor may include a sensor using infrared light. Infrared (IR) light may include electromagnetic radiation with a wavelength longer than that of visible light, measured from the nominal edge of visible red light at 0.74 micrometres (μm), and extending conventionally to 300 μm. These wavelengths correspond to a frequency range of approximately 1 to 400 THz, and include most of the thermal radiation emitted by objects near room temperature, such as body heat. Microscopically, IR light is typically emitted or absorbed by molecules when they change their rotational-vibrational movements. One example of an infrared sensor may include U.S. Patent Publication No. 2011/0210253, which is incorporated herein by reference. In some instances, infrared detector module 1912 may include a computer processor.

Further, the operation 2308 illustrates detecting an indication of a person within a specified proximity to the at least one mobile device with a proximity sensor having an adjustable nominal range. For example, as shown in FIGS. 18 through 20, the adjustable detector module 1914 can detect an indication of a person within a specified proximity to the at least one mobile device with a proximity sensor having an adjustable nominal range. In an embodiment, adjustable detector module 1914 may detect a person that enters a room in a house (e.g., a bedroom) with a proximity sensor that includes an adjustable nominal range. The maximum distance that a sensor can detect is defined as the nominal range. Some sensors may be capable of having an adjustable nominal range or means to report a graduated detection distance. An example of a device having an adjustable nominal range may include an optical signal control apparatus discussed in U.S. Pat. No. 4,988,169, which is incorporated herein by reference. In some instances, adjustable detector module 1914 may include a computer processor.

Figure 24:
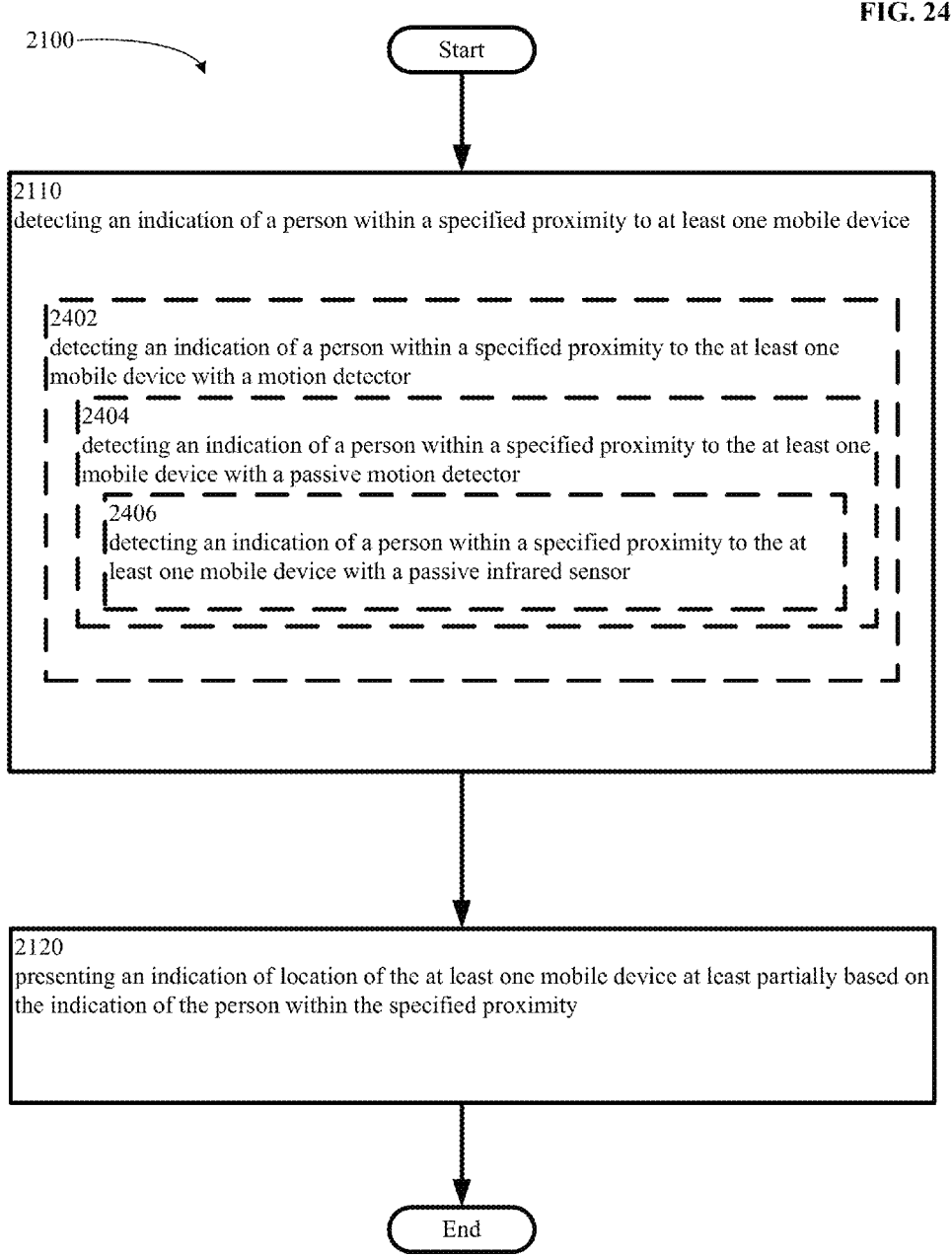
FIG. 24 illustrates certain alternative embodiments of the mobile device location system of FIG. 21.

FIG. 24 illustrates alternative embodiments of the example operational flow 2100 of FIG. 21. FIG. 24 illustrates example embodiments where the operation 2110 may include at least one additional operation. Additional operations may include an operation 2402, an operation 2404, and/or an operation 2406.

The operation 2402 illustrates detecting an indication of a person within a specified proximity to the at least one mobile device with a motion detector. For example, as shown in FIGS. 18 through 20, the motion detector module 1916 can detect an indication of a person within a specified proximity to the at least one mobile device with a motion detector. In an embodiment, motion detector module 1916 may detect a person within a ten foot radius of a cell phone with a motion detector. A motion detector may include a device for motion detection. For example, it may include a device that may contain a physical mechanism and/or electronic sensor that quantifies motion that may be either integrated with or connected to devices that may alert the user of the presence of a moving object within the field of view. An example of a motion detector may include an electronic motion detector that contains a motion sensor that transforms the detection of motion into an electric signal. This may be achieved by measuring optical or acoustical changes in the field of view. Many motion detectors can detect up to 15-25 meters (50-80 ft). In some instances, motion detector module 1916 may include a computer processor.

Further, the operation 2404 illustrates detecting an indication of a person within a specified proximity to the at least one mobile device with a passive motion detector. For example, as shown in FIGS. 18 through 20, the passive motion detector module 1918 can detect an indication of a person within a specified proximity to the at least one mobile device with a passive motion detector. In an embodiment, passive motion detector module 1918 may detect an individual within a living room in a house, where a cell phone phoneis in the same room. The cell phone may be coupled to a passive motion detector. In this example, when an individual is detected, the passive motion sensor may send a signal to another device, such as a speaker coupled to the same cell phone, to create an audible sound and indicate the location of the cell phone. In this instance, detecting the individual and creating an audible sound may indicate to the person the location of the cell phone, such as in the case of a misplaced cell phone. In some instances, passive motion detector module 1918 may include a computer processor.

Further, the operation 2406 illustrates detecting an indication of a person within a specified proximity to the at least one mobile device with a passive infrared sensor. For example, as shown in FIGS. 18 through 20, the passive sensor module 1920 can detect an indication of a person within a specified proximity to the at least one mobile device with a passive infrared sensor. In an embodiment, passive sensor module 1920 may detect an individual within a fifty foot radius of a smartphone with a passive infrared motion detector. A Passive Infrared sensor (PIR sensor) may include an electronic device that measures infrared (IR) light radiating from objects in its field of view. In a PIR-based motion detector (often called a PID, for Passive Infrared Detector), the PIR sensor may typically be mounted on a printed circuit board containing the necessary electronics required to interpret the signals from the pyroelectric sensor chip. The complete assembly may be contained within a housing mounted in a location where the sensor can view the area to be monitored. Infrared energy may be able to reach the pyroelectric sensor through the window because the plastic used is transparent to infrared radiation (but only translucent to visible light). One example of a passive infrared motion detector may be found in U.S. Pat. No. 6,215,399, which is incorporated herein by reference. In some instances, passive sensor module 1920 may include a computer processor.

Figure 25:
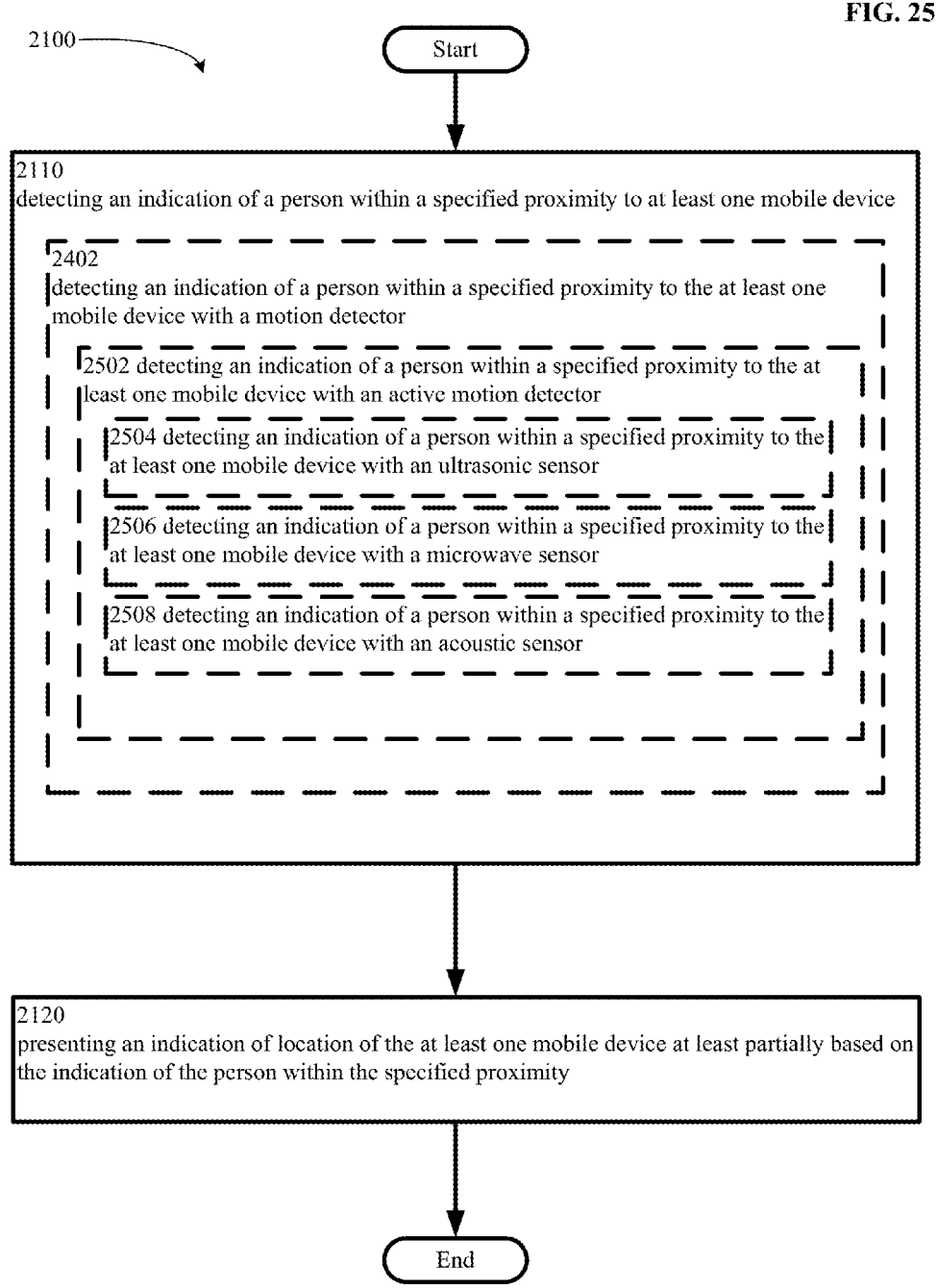
FIG. 25 illustrates certain alternative embodiments of the mobile device location system of FIG. 21.

FIG. 25 illustrates alternative embodiments of the example operational flow 2100 of FIG. 21. FIG. 25 illustrates example embodiments where the operation 2110 may include at least one additional operation. Additional operations may include an operation 2502, an operation 2504, an operation 2506, and/or an operation 2508.

Further, the operation 2502 illustrates detecting an indication of a person within a specified proximity to the at least one mobile device with an active motion detector. For example, as shown in FIGS. 18 through 20, the active motion detector module 1922 can detect an indication of a person within a specified proximity to the at least one mobile device with an active motion detector. In an embodiment, active motion detector module 1922 may detect an individual within a fifty foot radius of a smartphone with an active motion detector. An active motion detector may include a sensor used in the spectrum of motion detectors that emits energy from the sensor in order to detect movement. Some examples of an active motion detector may include an ultrasonic motion detector, a microwave motion detector, and/or a tomographic motion detector. In some instances, active motion detector module 1922 may include a computer processor.

Further, the operation 2504 illustrates detecting an indication of a person within a specified proximity to the at least one mobile device with an ultrasonic sensor. For example, as shown in FIGS. 18 through 20, the ultrasonic detector module 1924 can detect an indication of a person within a specified proximity to the at least one mobile device with an ultrasonic sensor. In an embodiment, ultrasonic detector module 1924 may detect a person within a radius of twenty five feet of a tablet computer with an ultrasonic sensor. An ultrasonic sensor may include a sensor that sends out pulses of ultrasonic waves and measures the reflection off a moving object (e.g., a person). An example of a broad field motion detector that uses an ultrasonic sensor may include the sensor discussed in U.S. Pat. No. 6,885,300, which is incorporated herein by reference. In some instances, ultrasonic detector module 1924 may include a computer processor.

Further, the operation 2506 illustrates detecting an indication of a person within a specified proximity to the at least one mobile device with a microwave sensor. For example, as shown in FIGS. 18 through 20, the microwave detector module 1926 can detect an indication of a person within a specified proximity to the at least one mobile device with a microwave sensor. In an embodiment, ultrasonic detector module 1924 may detect a person within a radius of twenty five feet of a tablet computer with an microwave motion sensor. A microwave motion sensor may include a sensor that sends out microwave pulses and measures the reflection off a moving object. For example, a mobile device may be coupled to a microwave motion sensor that periodically sends a microwave signal in order to determine if an object in close proximity to the mobile device is moving. An example of an anti-interference microwave motion sensor may be found in U.S. Pat. No. 7,852,257, which is incorporated herein by reference. In some instances, microwave detector module 1926 may include a computer processor.

Further, the operation 2508 illustrates detecting an indication of a person within a specified proximity to the at least one mobile device with an acoustic sensor. For example, as shown in FIGS. 18 through 20, the acoustic detector module 1928 can detect an indication of a person within a specified proximity to the at least one mobile device with an acoustic sensor. In an embodiment, acoustic detector module 1928 may detect a person within a radius of twenty five feet of a tablet computer with an acoustic motion sensor. An acoustic motion sensor may include a sensor that may be based on electret effect, inductive coupling, capacitive coupling, triboelectric effect, piezoelectric effect, and/or fiber optic transmission. An example of an acoustic motion sensor may include the electric device control apparatus discussed in U.S. Pat. No. 7,861,188, which is incorporated herein by reference. In some instances, acoustic detector module 1928 may include a computer processor.

Figure 26:
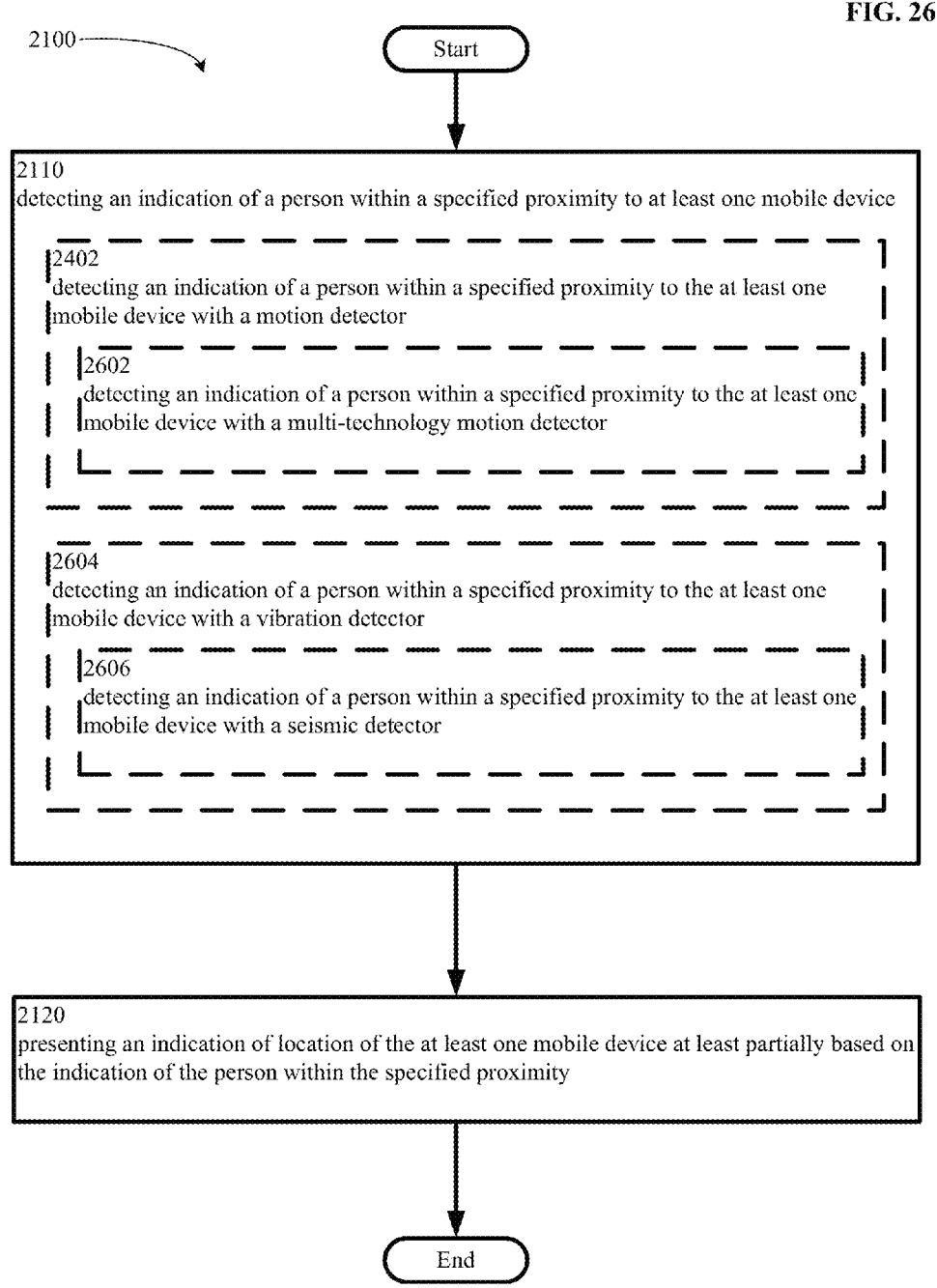
FIG. 26 illustrates certain alternative embodiments of the mobile device location system of FIG. 21.

FIG. 26 illustrates alternative embodiments of the example operational flow 2100 of FIG. 21. FIG. 26 illustrates example embodiments where the operation 2110 may include at least one additional operation. Additional operations may include an operation 2602, an operation 2604, and/or an operation 2606.

Further, the operation 2602 illustrates detecting an indication of a person within a specified proximity to the at least one mobile device with a multi-technology motion detector. For example, as shown in FIGS. 18 through 20, the multi-technology detector module 1930 can detect an indication of a person within a specified proximity to the at least one mobile device with a multi-technology motion detector. In an embodiment, multi-technology detector module 1930 may detect a person within a radius of thirty five feet of a smartphone with a multi-technology motion sensor. A multi-technology motion detector may utilize a combination of different motion sensing and/or detecting technologies. A dual-technology detector benefits with each type of sensor and false alarms may be reduced. Often, passive infrared technology is paired with another type of detector to maximize accuracy and reduce energy usage. For example passive infrared technology draws less energy than microwave detection. Many dual-technology sensors that include passive infrared technology are calibrated so that when the passive infrared technology sensor is tripped, it activates, for example, a microwave sensor. If the latter also picks up an intruder, then the alarm is sounded. An example of using a dual-technology sensor may include the dual technology occupancy sensor discussed in U.S. Pat. No. 6,791,458, which is incorporated herein by reference. In some instances, multi-technology detector module 1930 may include a computer processor.

The operation 2604 illustrates detecting an indication of a person within a specified proximity to the at least one mobile device with a vibration detector. For example, as shown in FIGS. 18 through 20, the vibration detector module 1932 can detect an indication of a person within a specified proximity to the at least one mobile device with a vibration detector. In an embodiment, vibration detector module 1932 may detect a person that enters a room in a house where a smartphone is located with vibration technology (such as seismology), which may indicate movement or absence of movement of the mobile device. Vibration technology, or movement technology, may include, for example, seismic technology (e.g., seismic displacement transducers), optical techniques (e.g., a scale, calipers, a camera, a laser interferometer, or a measuring microscope), electromagnetic and capacitive sensors, electrodynamic sensors, laser vibrometers and/or laser velocimeters, as well as accelerometers (e.g., piezoelctric, integral electronics piezoelectric, piezoresistive, variable capacitance, servo force balance). In some instances, vibration detector module 1932 may include a computer processor.

Further, the operation 2606 illustrates detecting an indication of a person within a specified proximity to the at least one mobile device with a seismic detector. For example, as shown in FIGS. 18 through 20, the seismic detector module 1934 can detect an indication of a person within a specified proximity to the at least one mobile device with a seismic detector. In an embodiment, seismic detector module 1934 may detect an indication of a person within a five foot distance with a seismic sensor. For example, an individual may have misplaced a smartphone, and the seismic detector module 1934 may determine from seismic activity that the smartphone may have been dropped or misplaced. Seismic technology may include the utilization of a device and/or a sensor configured to sense seismic waves and/or vibration, for example a seismometer, a geophone, and/or an accelerometer. A seismometer may include an inertial seismometer, which may include a weight, or some type of internal mass that can move relative to an instrument frame, and/or a means for recording motion of the internal mass relative to the instrument frame. Another example of a seismometer may include an electronic negative feedback loop. In this example, the motion of the internal mass relative to the instrument frame may be measured, and the feedback loop may apply a magnetic and/or electrostatic force to keep the mass nearly motionless. The voltage needed to produce this force is the output of the seismometer, which may be recorded digitally, for example the seismic detector module 1934. In other systems, the weight may be allowed to move, and its motion may produce a voltage in a coil attached to the mass and move through the magnetic field of a magnet attached to the frame. An example of a seismic activity detection device may be found in U.S. Patent Publication No. 2010/0169021, which is incorporated herein by reference. In some instances, seismic detector module 1934 may include a computer processor.

Figure 27:
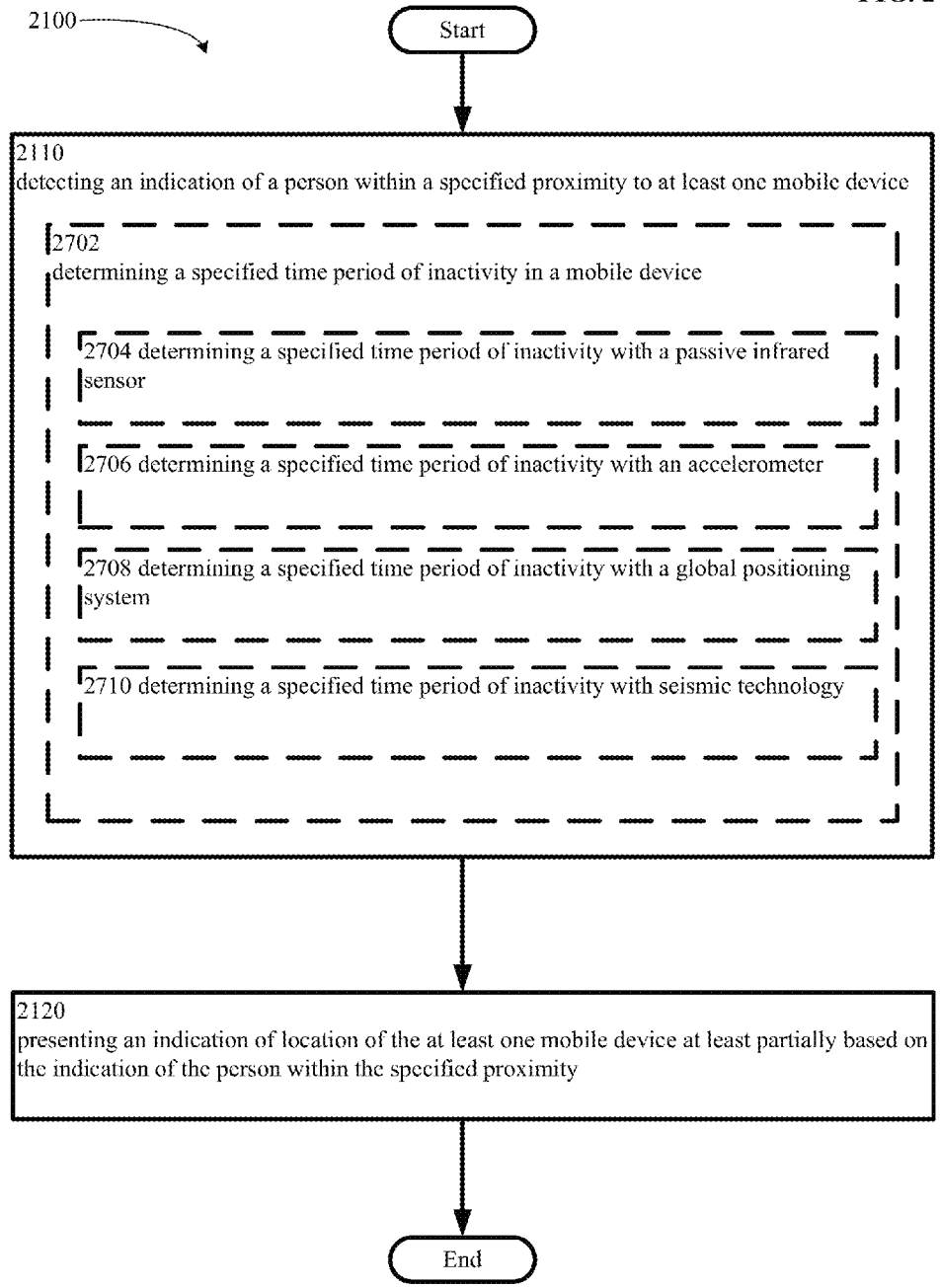
FIG. 27 illustrates certain alternative embodiments of the mobile device location system of FIG. 21.

FIG. 27 illustrates alternative embodiments of the example operational flow 2100 of FIG. 21. FIG. 27 illustrates example embodiments where the operation 2110 may include at least one additional operation. Additional operations may include an operation 2702, an operation 2704, an operation 2706, an operation 2708, and/or an operation 2710.

The operation 2702 illustrates determining a specified time period of inactivity in a mobile device. For example, as shown in FIGS. 18 through 20, the inactivity determiner module 1936 can determine a specified time period of inactivity in a mobile device. In an embodiment, the inactivity determiner module 1936 may determine that a mobile device, such as a smartphone, has not moved for a period of twenty four hours. Some examples of inactivity may include non-movement of the device as well as an absence of sending and/or receiving data. In this embodiment, inactivity determiner module 1936 may use a device, such as an accelerometer 1830, to detect movement or absence of movement. An inactivity determiner module 1936 may detect non-movement by detecting the absence of acceleration where acceleration may indicate at least short-term movement. In another embodiment, inactivity determiner module 1936 may detect non-movement using triangulation, for example. In some instances, inactivity determiner module 1936 may include a computer processor and/or equipment coupled to the computer processor, such as an accelerometer.

Further, the operation 2704 illustrates determining a specified time period of inactivity with a passive infrared sensor. For example, as shown in FIGS. 18 through 20, the passive sensor determiner module 1938 can determine a specified time period of inactivity with a passive infrared sensor. In an embodiment, passive sensor determiner module 1938 may determine a specified time period utilizing a passive infrared sensor. A passive infrared sensor may include an electronic device that measures infrared (IR) light radiating from at least one object in the field of view of the sensor. Apparent motion may be detected when an infrared source with one temperature (e.g., a human) passes in front of an infrared source (e.g., a wall). One example of a device utilizing a passive infrared sensor may include a user interface with a motion detector such as the device discussed in U.S. Patent Publication No. 2011/0050643, which is incorporated herein by reference. The passive sensor determiner module 1938 may determine a time period of non-movement of a mobile device by using a passive infrared sensor to detect movement or non-movement. A specified period of time of non-movement (the specified time determined by a user) may indicate to an individual that a mobile device has been misplaced and/or lost. In some instances, passive sensor determiner module 1938 may include a computer processor.

Further, the operation 2706 illustrates determining a specified time period of inactivity with an accelerometer. For example, as shown in FIGS. 18 through 20, the accelerometer determiner module 1940 can determine a specified time period of inactivity with an accelerometer. In an embodiment, accelerometer determiner module 1940 may determine a four hour time period utilizing a smart device including an accelerometer. A smart device may include an electronic device that is cordless (unless while being charged), mobile (easily transportable), always connected (via WiFi, 3G, 4G etc.) and/or is capable of voice and video communication, internet browsing, "geo-location" (for search purposes) and that can operate to some extent autonomously. Some examples of a smart device may include an Apple iPhone, an Apple iPad, a Motorola Droid, and/or a Blackberry device. An accelerometer may include a device that measures acceleration and may, in the case of a smart device coupled with an accelerometer, indicate that the smart device has been misplaced if the accelerometer has not indicated movement and/or acceleration for a certain amount of time determined by an individual. In another embodiment, accelerometer determiner module 1940 may determine that a smart device has not been moved for twenty four hours because no movement has been detected by an accelerometer coupled to the smart device. In some instances, accelerometer determiner module 1940 may include a computer processor and/or instrumentation that may be configured to be coupled to the computer processor and/or a smart device, such as an accelerometer.

Further, the operation 2708 illustrates determining a specified time period of inactivity with a global positioning system. For example, as shown in FIGS. 18 through 20, the GPS determiner module 1942 can determine a specified time period of inactivity with a global positioning system. In an embodiment, GPS determiner module 1942 may determine a 24 hour period that a mobile device has not been moved according to information regarding no change in global positioning coordinates. Information regarding global positioning coordinates and a lack of change in the coordinates may serve to indicate a misplaced mobile device, for example. The Global Positioning System (GPS) includes a space-based satellite navigation system that provides location and time information. A GPS receiver, which may be included as part of the mobile device and/or GPS determiner module 1942, may calculate position by precisely timing signals sent by GPS satellites and thereby calculate position of the GPS receiver. The postion information may then be utilized to locate a misplaced mobile device, for example. An example of a mobile device including a GPS receiver may be found in U.S. Pat. No. 7,956,801, which is incorporated herein by reference. In some instances, GPS determiner module 1942 may include a computer processor.

Further, the operation 2710 illustrates determining a specified time period of inactivity with seismic technology. For example, as shown in FIGS. 18 through 20, the seismic determiner module 1944 can determine a specified time period of inactivity with seismic technology. In an embodiment, seismic determiner module 1944 may determine an eight hour time period in which a smartphone has not been moved by utilizing seismic technology. Inactivity may include physical inactivity (e.g., the mobile device not being moved) and/or informational or electrical activity (e.g., receiving no data, signals, etc.). Determining whether a mobile device has been moved may serve to indicate to and/or alert an individual that the mobile device has been misplaced and/or lost. For example, an individual may have misplaced a tablet computer, and the seismic determiner module 1944 may determine from an absence of seismic activity, which may indicate an absence of movement, that the tablet computer may be misplaced. Seismic technology may include the utilization of a device configured to sense seismic waves and/or vibration, for example a seismometer, a geophone, and/or an accelerometer. A seismometer may include an inertial seismometer, which may include a weight, or some type of internal mass that can move relative to an instrument frame, and/or a means for recording motion of the internal mass relative to the instrument frame. Another example of a seismometer may include an electronic negative feedback loop. In this example, the motion of the internal mass relative to the instrument frame may be measured, and the feedback loop may apply a magnetic and/or electrostatic force to keep the mass nearly motionless. The voltage needed to produce this force is the output of the seismometer, which may be recorded digitally, for example the seismic determiner module 1944. In other systems, the weight may be allowed to move, and its motion may produce a voltage in a coil attached to the mass and move through the magnetic field of a magnet attached to the frame. An example of a seismic activity detection device may be foind in U.S. Patent Publication No. 2010/0169021, which is incorporated herein by reference. In some instances, seismic determiner module 1944 may include a computer processor.

Figure 28:
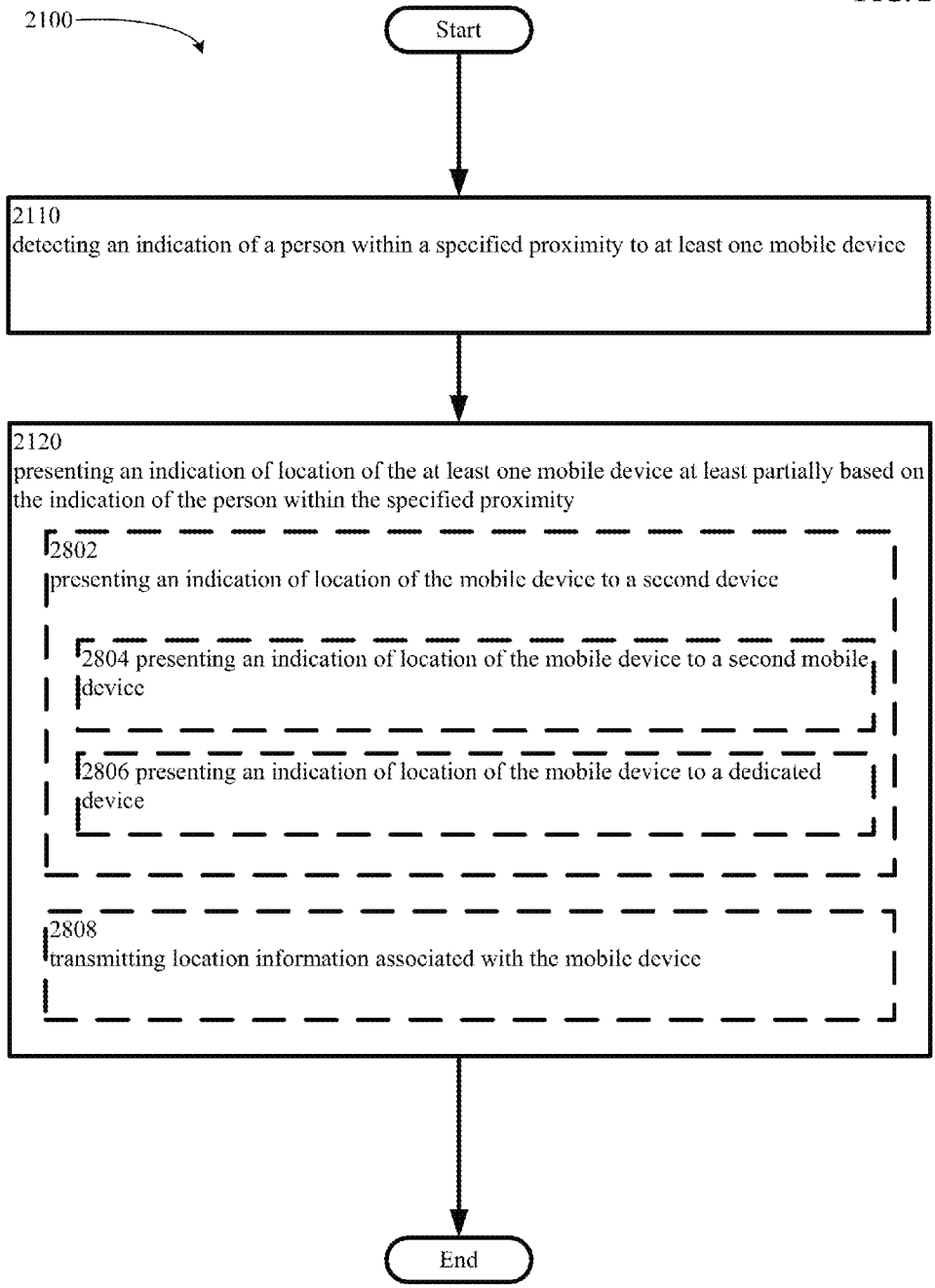
FIG. 28 illustrates certain alternative embodiments of the mobile device location system of FIG. 21.

FIG. 28 illustrates alternative embodiments of the example operational flow 2100 of FIG. 21. FIG. 28 illustrates example embodiments where the operation 2120 may include at least one additional operation. Additional operations may include an operation 2802, an operation 2804, an operation 2806, and/or an operation 2808.

The operation 2802 illustrates presenting an indication of location of the mobile device to a second device. For example, as shown in FIGS. 18 through 20, the second device presenter module 1946 can present an indication of location of the mobile device to a second device. In an embodiment, second device presenter module 1946 may present a set of GPS coordinates of a cell phone that has been misplaced to a tablet computer where an individual may use the GPS coordinates from the tablet computer to locate the cell phone. Presenting an indication of location of a misplaced mobile device may serve to provide a convenient and/or efficient process for locating a misplaced and/or lost mobile device. In some instances, second device presenter module 1946 may include a computer processor.

Further, the operation 2804 illustrates presenting an indication of location of the mobile device to a second mobile device. For example, as shown in FIGS. 18 through 20, the mobile device presenter module 1948 can present an indication of location of the mobile device to a second mobile device. In an embodiment, mobile device presenter module 1948 may present a set of GPS coordinates of a cell phone that has been misplaced to a tablet computer where an individual may use the GPS coordinates from the tablet computer to locate the cell phone. Presenting an indication of location of a misplaced mobile device may serve to provide a convenient and/or efficient process for locating a misplaced and/or lost mobile device. In some instances, mobile device presenter module 1948 may include a computer processor.

Further, the operation 2806 illustrates presenting an indication of location of the mobile device to a dedicated device. For example, as shown in FIGS. 18 through 20, the dedicated device presenter module 1950 can present an indication of location of the mobile device to a dedicated device. In an embodiment, dedicated device presenter module 1950 may present a set of GPS coordinates to a dedicated cell phone. A dedicated device, such as the dedicated cell phone in the previous embodiment, may serve to receive location information for at least one mobile device, for example in the case of a misplaced mobile device. Some examples of a dedicated device may include a PC or laptop computer, another mobile device, (e.g., cell phone, smartphone, tablet computer, a PDA, a pager, a digital reader, a personal navigation device, and/or a digital camera), and/or a cable television receiver box. In another embodiment, an individual may have lost a tablet computer where the tablet computer is configured to detect misplacement (e.g., the tablet computer may include an accelerometer that is configured to detect an absence of movement for eight hours, in this case indicating misplacement) and present an indication of location by automatically sending location coordinates (e.g., GPS coordinates) to a computer system configured and used to receive location information for the mobile device. An example of a dedicated device may include a dedicated microprocessor, such as the dedicated microprocessor described in U.S. Pat. No. 5,877,724, which is incorporated herein by reference. In some instances, dedicated device presenter module 1950 may include a computer processor.

The operation 2808 illustrates transmitting location information associated with the mobile device. For example, as shown in FIGS. 18 through 20, the transmitter module 1952 can transmit location information associated with the mobile device. In an embodiment, transmitter module 1952 may transmit location information, such as a set of GPS coordinates accurate to ±10 feet, where the location information is associated with a GPS receiver that is capable of transmitting the location to a secondary location, for example a personal computer. In this embodiment, an individual may determine the location of the GPS receiver from the location information transmitted to the personal computer. One example of transmitting location information may include transmitting a coordinate entry to a web page, for example. This example may be further discussed in U.S. Pat. No. 6,122,520, which is incorporated herein by reference. In some instances, transmitter module 1952 may include a computer processor.

Figure 29:
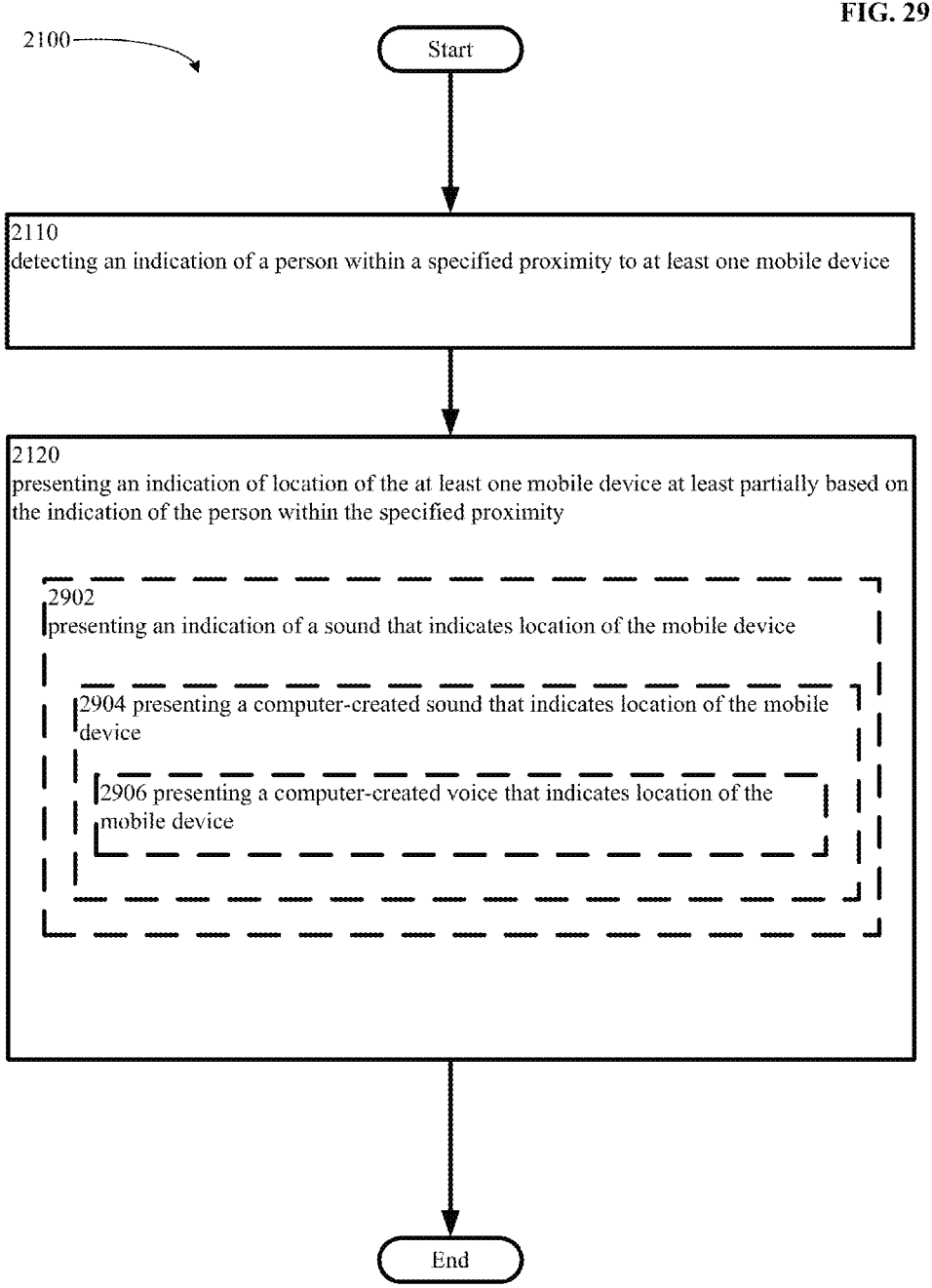
FIG. 29 illustrates certain alternative embodiments of the mobile device location system of FIG. 21.

FIG. 29 illustrates alternative embodiments of the example operational flow 2100 of FIG. 21. FIG. 29 illustrates example embodiments where the operation 2120 may include at least one additional operation. Additional operations may include an operation 2902, an operation 2904, and/or an operation 2906.

The operation 2902 illustrates presenting an indication of a sound that indicates location of the mobile device. For example, as shown in FIGS. 18 through 20, the sound presenter module 1954 can present an indication of a sound that indicates location of the mobile device. In an embodiment, sound presenter module 1954 may present a predetermined ringtone sound that indicates location of the mobile device. Some examples of a sound that may indicate location of the mobile device may include a ringtone, an audible beep, a jingle, or other sounds or combinations of sound. An example of creating and purchasing ringtones may be found in U.S. Patent Publication No. 2008/0167968, which is incorporated herein by reference. In some instances, sound presenter module 1954 may include a computer processor.

Further, the operation 2904 illustrates presenting a computer-created sound that indicates location of the mobile device. For example, as shown in FIGS. 18 through 20, the computer-created sound presenter module 1956 can present a computer-created sound that indicates location of the mobile device. In an embodiment, computer-created sound presenter module 1956 may present a computer-created song that indicates location of the mobile device. This may serve to let an individual know where a misplaced mobile device may be, for example a cell phone that has been lost behind a furniture cushion. Some examples of a computer-created sound may include computer or electronic music, a ringtone, a beep, or a recorded message. An example of creating a computer-created custom ringtone may be found in U.S. Pat. No. 7,546,148. In some instances, computer-created sound presenter module 1956 may include a computer processor.

Further, the operation 2906 illustrates presenting a computer-created voice that indicates location of the mobile device. For example, as shown in FIGS. 18 through 20, the computer-created voice presenter module 1958 can present a computer-created voice that indicates location of the mobile device. In an embodiment, computer-created voice presenter module 1958 may present a computer created voice that includes a voice repeatedly stating "alert." This may serve to alert an individual of the location of the mobile device in the event of misplacement. In one embodiment, a computer-created voice may be interactive, such as the example found in U.S. Pat. No. 7,778,833, which is incorporated herein by reference. In some instances, computer-created voice presenter module 1958 may include a computer processor.

Figure 30:
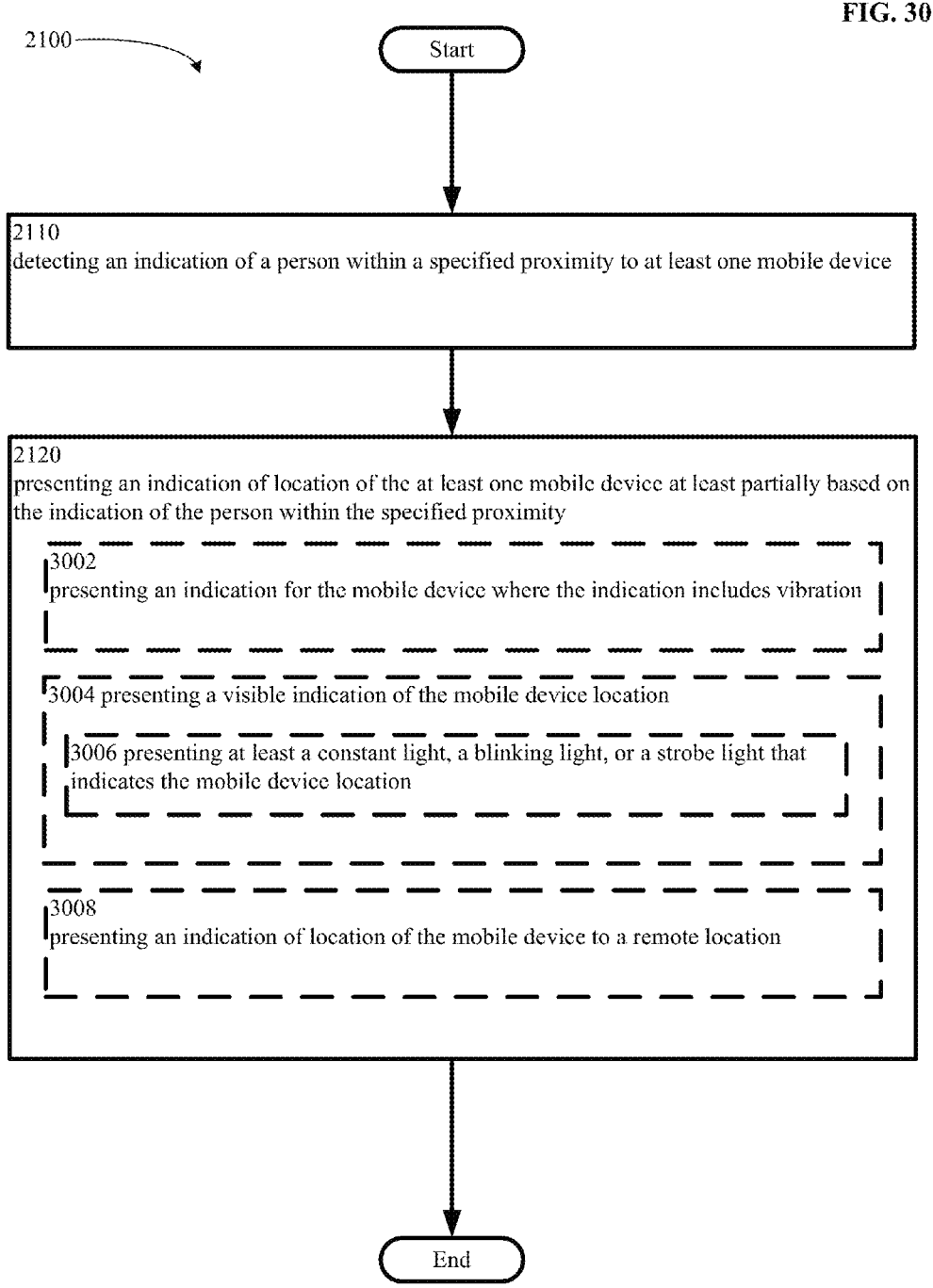
FIG. 30 illustrates certain alternative embodiments of the mobile device location system of FIG. 21.

FIG. 30 illustrates alternative embodiments of the example operational flow 2100 of FIG. 21. FIG. 30 illustrates example embodiments where the operation 2120 may include at least one additional operation. Additional operations may include an operation 3002, an operation 3004, an operation 3006, and/or an operation 3008.

The operation 3002 illustrates presenting an indication for the mobile device where the indication includes vibration. For example, as shown in FIGS. 18 through 20, the vibration presenter module 1960 can present an indication for the mobile device where the indication includes vibration. In an embodiment, vibration presenter module 1960 may present an indication for the mobile device to trigger a vibrating alert. In this embodiment, a vibrating alert motor may be included in the mobile device. The vibrating alert motor may include a small electric motor coupled to an eccentric, or unbalanced weight. Utilizing a vibration may generally serve to alert an individual in the case of a noisy environment or in the case of a hearing impaired user. An additional reason may include increased sound, such as when the mobile device with a vibrating alert motor is placed on a firm or hard surface. In this case, the vibration may often be as loud or louder than a regular sound or ringtone because of the vibration against the firm of hard surface. An example of a mobile device including a vibrating alert motor may include a cell phone with a vibrating alert motor, such as the example described in U.S. Patent Publication No. 2008/0242287, which is incorporated herein by reference. In some instances, vibration presenter module 1960 may include a computer processor.

The operation 3004 illustrates presenting a visible indication of the mobile device location. For example, as shown in FIGS. 18 through 20, the visible presenter module 1962 can present a visible indication of the mobile device location. In an embodiment, visible presenter module 1962 may present an LED light to indicate the mobile device location. Presenting a visible indication of the mobile device may serve to locate a misplaced mobile device and may be especially helpful, for example, to an individual that may be hearing impaired. Some examples of a visible indication may include a light, such as an LED or an incandescent bulb, a strobe light, a backlit display, or a lit screen display. In one embodiment, visible presenter module 1962 may present a strobe light in order to indicate to an individual a misplaced tablet computer. In this embodiment, the strobe light may be included with the tablet computer, for example as part of a camera flash where the camera flash is utilized as the strobe light. Another example of a light mechanism for a cell phone may be found in U.S. Pat. No. 6,341,871, which is incorporated herein by reference. In some instances, visible presenter module 1962 may include a computer processor.

Further, the operation 3006 illustrates presenting at least a constant light, a blinking light, or a strobe light that indicates the mobile device location. For example, as shown in FIGS. 18 through 20, the light presenter module 1964 can present at least a constant light, a blinking light, or a strobe light that indicates the mobile device location. In an embodiment, light presenter module 1964 may present a blinking light that may indicate a misplaced smartphone to an individual. Presenting a blinking light may serve to be more visible and more effectively alert an individual to the location of a mobile device. A constant light may include an LED light source, an incandescent light source, or a fluorescent light source, for example. A light that is constantly illuminated may serve to be more visible to an individual in a darkened setting, such as a room without any other light or solely ambient light. A strobe light may include a stroboscopic light, or a light that may be used to produce regular flashes of light, for example ten to twelve flashes of light per second. In an embodiment, light presenter module 1964 may present a strobe light that discharges light in a continuous mode for five minute intervals. Another example of a mobile device presenting a strobe light may include a cell phone with a built in flash, such as the device disclosed in U.S. Pat. No. 7,428,016, which is incorporated herein by reference. In some instances, light presenter module 1964 may include a computer processor.

The operation 3008 illustrates presenting an indication of location of the mobile device to a remote location. For example, as shown in FIGS. 18 through 20, the remote presenter module 1966 can present an indication of location of the mobile device to a remote location. In an embodiment, remote presenter module 1966 may present an indication of location of the mobile device, which is located in Phoenix, Ariz., to a computer in Los Angeles, Calif. The computer in Los Angeles may serve as an off-location service provider, for example. Additionally, presenting an indication of location of a mobile device to a remote location may serve as a backup location providing service. In some instances, remote presenter module 1966 may include a computer processor.

Figure 31:
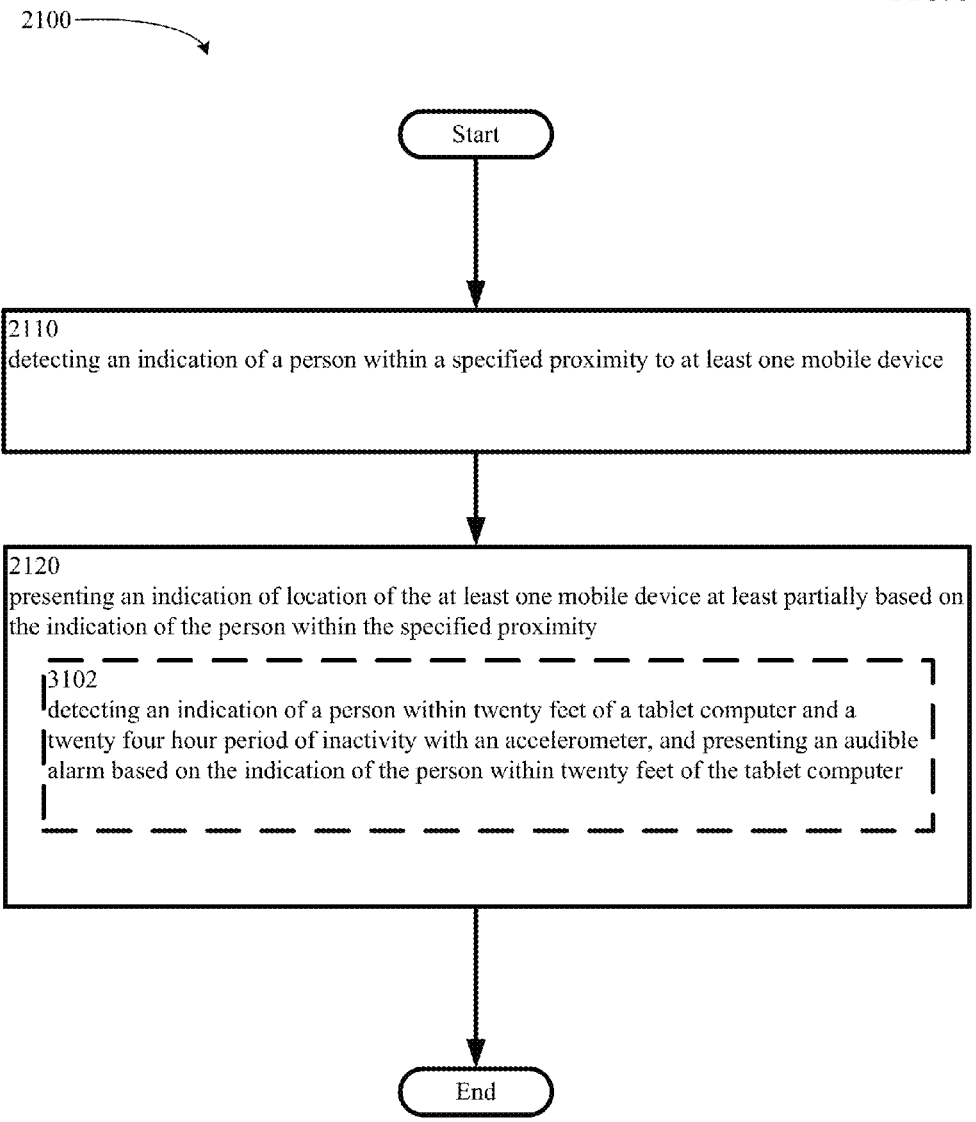
FIG. 31 illustrates certain alternative embodiments of the mobile device location system of FIG. 21.

FIG. 31 illustrates alternative embodiments of the example operational flow 2100 of FIG. 21. FIG. 31 illustrates example embodiments where the operation 2120 may include at least one additional operation. Additional operations may include an operation 3102.

The operation 3102 illustrates detecting an indication of a person within twenty feet of a tablet computer and a twenty four hour period of inactivity with an accelerometer, and presenting an audible alarm based on the indication of the person within twenty feet of the tablet computer. For example, as shown in FIGS. 18 through 20, the detector module 1910 and presenter module 1820 can detect an indication of a person within twenty feet of a tablet computer and a twenty four hour period of inactivity with an accelerometer and can present an audible beep based on the indication of the person within twenty feet of the tablet computer. In some instances detector module 1910 may include a computer processor. In some instances presenter module 1820 may include a computer processor.

FIG. 32 illustrates a partial view of an example computer program product 3200 that includes a computer program 3204 for executing a computer process on a computing device. An embodiment of the example computer program product 3200 is provided using a signal-bearing medium 3202, and may include one or more instructions for detecting an indication of a person within a specified proximity to at least one mobile device; and one or more instructions for presenting an indication of location of the at least one mobile device at least partially based on the indication of the person within the specified proximity. The one or more instructions may be, for example, computer executable and/or logic-implemented instructions. In one implementation, the signal-bearing medium 3202 may include a computer-readable medium 3206. In one implementation, the signal bearing medium 3202 may include a recordable medium 3208. In one implementation, the signal bearing medium 3202 may include a communications medium 3210.

FIG. 33 illustrates an example system 3300 in which embodiments may be implemented. The system 3300 includes a computing system environment. The system 3300 also illustrates the user 118 using a device 3304, which is optionally shown as being in communication with a computing device 3302 by way of an optional coupling 3306. The optional coupling 3306 may represent a local, wide-area, or peer-to-peer network, or may represent a bus that is internal to a computing device (e.g., in example embodiments in which the computing device 3302 is contained in whole or in part within the device 3304). A storage medium 3308 may be any computer storage media.

The computing device 3302 includes computer-executable instructions 3310 that when executed on the computing device 3302 cause the computing device 3302 to detect an indication of a person within a specified proximity to at least one mobile device; and present an indication of location of the at least one mobile device at least partially based on the indication of a person within the specified proximity. As referenced above and as shown in FIG. 33, in some examples, the computing device 3302 may optionally be contained in whole or in part within the device 3304.

In FIG. 33, then, the system 3300 includes at least one computing device (e.g., 3302 and/or 3304). The computer-executable instructions 3310 may be executed on one or more of the at least one computing device. For example, the computing device 3302 may implement the computer-executable instructions 3310 and output a result to (and/or receive data from) the computing device 3304. Since the computing device 3302 may be wholly or partially contained within the computing device 3304, the device 3304 also may be said to execute some or all of the computer-executable instructions 3310, in order to be caused to perform or implement, for example, various ones of the techniques described herein, or other techniques.

The device 3304 may include, for example, a portable computing device, workstation, or desktop computing device. In another example embodiment, the computing device 3302 is operable to communicate with the device 3304 associated with the user 118 to receive information about the input from the user 118 for performing data access and data processing and presenting an output of the user-health test function at least partly based on the user data.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A machine, comprising:
    means for sensing at least one specified time period of inactivity in at least one mobile device, including at least:
        means for receiving at least one selection of at least one specified time denoting at least one period of inactivity of the at least one mobile device;
        means for sensing at least one indication that the at least one mobile device is at rest; and
        means for providing one or more indications related to the at least one time period of inactivity in the at least one mobile device at least partially based on at least one received selection of at least one specified time denoting at least one period of inactivity and at least partially based on the at least one sensed indication that the at least one mobile device is at rest;
    means for initiating one or more detection modes at least partially based on the at least one sensed specified time period of inactivity, the one or more detection modes configured for detecting at least one indication of at least one person within at least one specified proximity to the at least one mobile device;
    means for detecting at least one indication of at least one person within at least one specified proximity to the at least one mobile device at least partially based on initiating the at least one detection mode; and
    means for presenting at least one indication of location of the at least one mobile device at least partially based on the at least one indication of the at least one person within the at least one specified proximity.

2. The machine of claim 1, wherein means for detecting at least one indication of at least one person within at least one specified proximity to the at least one mobile device at least partially based on initiating the at least one detection mode comprises:
    means for detecting at least one indication of at least one person within at least one specified proximity to at least one mobile electronic device.

3. The machine of claim 2, wherein means for detecting at least one indication of at least one person within at least one specified proximity to at least one mobile electronic device comprises:
    means for detecting at least one indication of at least one person within at least one specified proximity to one or more of at least one cell phone or at least one smart phone.

4. The machine of claim 2, wherein means for detecting at least one indication of at least one person within at least one specified proximity to at least one mobile electronic device comprises:
    means for detecting at least one indication of at least one person within at least one specified proximity to one or more of at least one portable media player or at least one tablet computer.

5. The machine of claim 1, wherein the means for detecting at least one indication of at least one person within at least one specified proximity to the at least one mobile device at least partially based on initiating the at least one detection mode comprises:
    means for detecting at least one indication of at least one person within at least one specified proximity to the at least one mobile device with at least one proximity sensor.

6. The machine of claim 5, wherein the means for detecting at least one indication of at least one person within at least one specified proximity to the at least one mobile device with at least one proximity sensor comprises:

means for detecting at least one indication of at least one person within at least one specified proximity to the at least one mobile device with at least one electromagnetic radiation sensor.

7. The machine of claim 6, wherein means for detecting at least one indication of at least one person within at least one specified proximity to the at least one mobile device with at least one electromagnetic radiation sensor comprises:

means for detecting at least one indication of at least one person within at least one specified proximity to the at least one mobile device with at least one infrared sensor.

8. The machine of claim 5, wherein means for detecting at least one indication of at least one person within at least one specified proximity to the at least one mobile device with at least one proximity sensor comprises:

means for detecting at least one indication of at least one person within at least one specified proximity to the at least one mobile device with a proximity sensor having an adjustable nominal range.

9. The machine of claim 1, wherein means for detecting at least one indication of at least one person within at least one specified proximity to the at least one mobile device at least partially based on initiating the at least one detection mode comprises:

means for detecting at least one indication of at least one person within at least one specified proximity to the at least one mobile device with at least one motion detector.

10. The machine of claim 9, wherein means for detecting at least one indication of at least one person within at least one specified proximity to the at least one mobile device with at least one motion detector comprises:

means for detecting at least one indication of at least one person within at least one specified proximity to the at least one mobile device with at least one passive motion detector.

11. The machine of claim 10, wherein means for detecting at least one indication of at least one person within at least one specified proximity to the at least one mobile device with at least one passive motion detector comprises:

means for detecting at least one indication of at least one person within at least one specified proximity to the at least one mobile device with at least one passive infrared sensor.

12. The machine of claim 9, wherein means for detecting at least one indication of at least one person within at least one specified proximity to the at least one mobile device with at least one motion detector comprises:

means for detecting at least one indication of at least one person within at least one specified proximity to the at least one mobile device with at least one active motion detector.

13. The system of claim 12, wherein means for detecting at least one indication of at least one person within at least one specified proximity to the at least one mobile device with at least one active motion detector comprises:

means for detecting at least one indication of at least one person within at least one specified proximity to the at least one mobile device with at least one ultrasonic sensor.

14. The machine of claim 12, wherein means for detecting at least one indication of at least one person within at least one specified proximity to the at least one mobile device with at least one active motion detector comprises:

means for detecting at least one indication of at least one person within at least one specified proximity to the at least one mobile device with at least one microwave sensor.

15. The machine of claim 12, wherein means for detecting at least one indication of at least one person within at least one specified proximity to the at least one mobile device with at least one active motion detector comprises:

means for detecting at least one indication of at least one person within at least one specified proximity to the at least one mobile device with at least one acoustic sensor.

16. The machine of claim 9, wherein means for detecting at least one indication of at least one person within at least one specified proximity to the at least one mobile device with at least one motion detector comprises:

means for detecting at least one indication of at least one person within at least one specified proximity to the at least one mobile device with at least one multi-technology motion detector.

17. The machine of claim 1, wherein means for detecting at least one indication of at least one person within at least one specified proximity to the at least one mobile device at least partially based on initiating the at least one detection mode comprises:

means for detecting at least one indication of at least one person within at least one specified proximity to the at least one mobile device with a vibration detector.

18. The machine of claim 17, wherein means for detecting at least one indication of at least one person within at least one specified proximity to the at least one mobile device with a vibration detector comprises:

means for detecting at least one indication of at least one person within at least one specified proximity to the at least one mobile device with at least one seismic detector.

19. The machine of claim 1, wherein means for sensing at least one specified time period of inactivity in at least one mobile device comprises:

means for determining at least one specified time period of inactivity in at least one mobile device.

20. The machine of claim 19, wherein means for determining at least one specified time period of inactivity in at least one mobile device comprises:

means for determining at least one specified time period of inactivity with at least one passive infrared sensor.

21. The machine of claim 19, wherein means for determining at least one specified time period of inactivity in at least one mobile device comprises:

means for determining at least one specified time period of inactivity with at least one accelerometer.

22. The machine of claim 19, wherein means for determining at least one specified time period of inactivity in at least one mobile device comprises:

means for determining at least one specified time period of inactivity with at least one global positioning system.

23. The machine of claim 19, wherein means for determining at least one specified time period of inactivity in at least one mobile device comprises:

means for determining at least one specified time period of inactivity with seismic technology.

24. The machine of claim 1, wherein means for presenting at least one indication of location of the at least one mobile device at least partially based on the at least one indication of the at least one person within the at least one specified proximity comprises:

means for presenting at least one indication of location of the at least one mobile device to a second device.

25. The machine of claim 1, wherein means for presenting at least one indication of location of the at least one mobile device at least partially based on the at least one indication of the at least one person within the at least one specified proximity comprises:
    means for presenting at least one indication of location of the at least one mobile device, including at least one of transmitting location information associated with the at least one mobile device, presenting at least one indication of at least one sound that indicates location of the mobile device, presenting at least one indication for the at least one mobile device where the at least one indication includes at least vibration, or presenting at least one visible indication of the at least one mobile device location.

26. The machine of claim 1, wherein means for initiating one or more detection modes at least partially based on the at least one sensed specified time period of inactivity and means for detecting at least one indication of at least one person within at least one specified proximity to the at least one mobile device at least partially based on initiating the at least one detection mode comprises:
    means for transmitting one or more instructions to at least one external motion detector, the at least one external motion detector in wireless communication with the at least one mobile device, to monitor at least one area within at least one specified proximity of the at least one mobile device and wirelessly receiving one or more indications associated with the at least one external motion detector of at least one person within the at least one specified proximity of the at least one mobile device.

27. The machine of claim 1, wherein means for providing one or more indications related to the at least one time period of inactivity in the at least one mobile device at least partially based on at least one received selection of at least one specified time denoting at least one period of inactivity and at least partially based on the at least one sensed indication that the at least one mobile device is at rest comprises:
    means for resetting at least one timer of the at least one mobile device at least partially based on at least one indication that the at least one mobile device is at rest; and
    means for determining, at least partially via the at least one timer, whether the at least one mobile device has remained at rest when the at least one timer indicates a value related to at least one received selection of at least one specified time denoting at least one period of inactivity.

28. The machine of claim 27, further comprising:
    means for detecting that the at least one mobile device is in motion; and
    means for resetting the at least one timer when the at least one mobile device is no longer in motion.

29. The machine of claim 1, wherein means for initiating one or more detection modes at least partially based on the at least one sensed specified time period of inactivity, the one or more detection modes configured for detecting at least one indication of at least one person within at least one specified proximity to the at least one mobile device comprises:
    means for initiating one or more detection modes in response to at least one sensed specified time period of inactivity.

30. The machine of claim 29, further comprising:
    means for deactivating the initiated one or more detection modes at least partially based on one or more indications that the at least one mobile device is in motion.

31. An article of manufacture comprising:
    at least one time-sequenced array of logic gates configured for sensing at least one specified time period of inactivity in at least one mobile device, including at least:
        at least one time-sequenced array of logic gates configured for receiving at least one selection of at least one specified time denoting at least one period of inactivity of the at least one mobile device;
        at least one time-sequenced array of logic gates configured for sensing at least one indication that the at least one mobile device is at rest; and
        at least one time-sequenced array of logic gates configured for providing one or more indications related to the at least one time period of inactivity in the at least one mobile device at least partially based on at least one received selection of at least one specified time denoting at least one period of inactivity and at least partially based on the at least one sensed indication that the at least one mobile device is at rest;
    at least one time-sequenced array of logic gates configured for initiating one or more detection modes at least partially based on the at least one sensed specified time period of inactivity, the one or more detection modes configured for detecting at least one indication of at least one person within at least one specified proximity to the at least one mobile device;
    at least one time-sequenced array of logic gates configured for detecting at least one indication of at least one person within at least one specified proximity to the at least one mobile device at least partially based on initiating the at least one detection mode; and
    at least one time-sequenced array of logic gates configured for presenting at least one indication of location of the at least one mobile device at least partially based on the at least one indication of the at least one person within the at least one specified proximity.

32. A machine, comprising:
    circuitry for sensing at least one specified time period of inactivity in at least one mobile device, including at least:
        circuitry for receiving at least one selection of at least one specified time denoting at least one period of inactivity of the at least one mobile device;
        circuitry for sensing at least one indication that the at least one mobile device is at rest; and
        circuitry for providing one or more indications related to the at least one time period of inactivity in the at least one mobile device at least partially based on at least one received selection of at least one specified time denoting at least one period of inactivity and at least partially based on the at least one sensed indication that the at least one mobile device is at rest;
    circuitry for initiating one or more detection modes at least partially based on the at least one sensed specified time period of inactivity, the one or more detection modes configured for detecting at least one indication of at least one person within at least one specified proximity to the at least one mobile device;
    circuitry for detecting at least one indication of at least one person within at least one specified proximity to the at least one mobile device at least partially based on initiating the at least one detection mode; and circuitry for presenting at least one indication of location of the at least one mobile device at least partially based on the at least one indication of the at least one person within the at least one specified proximity.

33. A machine, comprising:

circuitry for sensing at least one specified time period of inactivity in at least one mobile device;

circuitry for initiating one or more detection modes at least partially based on the at least one sensed specified time period of inactivity, the one or more detection modes configured for detecting at least one indication of at least one person within at least one specified proximity to the at least one mobile device, including at least:

circuitry for receiving at least one selection of at least one specified proximity for detecting a person, the receiving at least one selection of at least one specified proximity previous to sensing at least one specified time period of inactivity; and circuitry for activating at least one detector associated with the at least one mobile device at least partially based on at least one selection of at least one specified proximity and at least partially based on the at least one sensed specified time period of inactivity;

circuitry for detecting at least one indication of at least one person within at least one specified proximity to the at least one mobile device at least partially based on initiating the at least one detection mode; and circuitry for presenting at least one indication of location of the at least one mobile device at least partially based on the at least one indication of the at least one person within the at least one specified proximity.

34. A machine, comprising:

means for sensing at least one specified time period of inactivity in at least one mobile device;

means for initiating one or more detection modes at least partially based on the at least one sensed specified time period of inactivity, the one or more detection modes configured for detecting at least one indication of at least one person within at least one specified proximity to the at least one mobile device, including at least:

means for receiving at least one selection of at least one specified proximity for detecting a person, the receiving at least one selection of at least one specified proximity previous to sensing at least one specified time period of inactivity; and means for activating at least one detector associated with the at least one mobile device at least partially based on at least one selection of at least one specified proximity and at least partially based on the at least one sensed specified time period of inactivity;

means for detecting at least one indication of at least one person within at least one specified proximity to the at least one mobile device at least partially based on initiating the at least one detection mode; and means for presenting at least one indication of location of the at least one mobile device at least partially based on the at least one indication of the at least one person within the at least one specified proximity.

35. The machine of claim 34, wherein means for sensing at least one specified time period of inactivity in at least one mobile device comprises:

means for determining a specified time period of inactivity in a mobile device.

36. The machine of claim 34, wherein means for initiating one or more detection modes at least partially based on the at least one sensed specified time period of inactivity, the one or more detection modes configured for detecting at least one indication of at least one person within at least one specified proximity to the at least one mobile device comprises:

means for initiating one or more detection modes in response to at least one sensed specified time period of inactivity.

37. The machine of claim 34, wherein means for detecting at least one indication of at least one person within at least one specified proximity to the at least one mobile device at least partially based on initiating the at least one detection mode comprises:

means for detecting an indication of a person within a specified proximity to the at least one mobile device with a proximity sensor.

38. The machine of claim 34, wherein means for presenting at least one indication of location of the at least one mobile device at least partially based on the at least one indication of the at least one person within the at least one specified proximity comprises:

means for presenting at least one indication of location of the at least one mobile device, including at least one of transmitting location information associated with the mobile device, presenting at least one indication of a sound that indicates location of the mobile device, presenting at least one indication for the mobile device where the at least one indication includes at least vibration, or presenting at least one visible indication of the mobile device location.

* * * * *

UNITED STATES PATENT AND TRADEMARK OFFICE
CERTIFICATE OF CORRECTION

| | | |
|---|---|---|
| PATENT NO. | : 9,194,937 B2 | Page 1 of 1 |
| APPLICATION NO. | : 13/340531 | |
| DATED | : November 24, 2015 | |
| INVENTOR(S) | : Bahl et al. | |

It is certified that error appears in the above-identified patent and that said Letters Patent is hereby corrected as shown below:

In the Claims
In Column 39, Line 58, Claim 13: please delete "The system of claim 12, wherein means for detecting at" and replace with --The machine of claim 12, wherein means for detecting at--

Signed and Sealed this
Twenty-sixth Day of April, 2016

Michelle K. Lee
*Director of the United States Patent and Trademark Office*